US012601956B2

(12) United States Patent
Jung

(10) Patent No.: US 12,601,956 B2
(45) Date of Patent: Apr. 14, 2026

(54) LENS DRIVING DEVICE, AND CAMERA DEVICE AND OPTICAL INSTRUMENT THAT INCLUDE SAME

(71) Applicant: LG INNOTEK CO., LTD., Seoul (KR)

(72) Inventor: Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 278 days.

(21) Appl. No.: 18/254,650

(22) PCT Filed: Nov. 9, 2021

(86) PCT No.: PCT/KR2021/016251
§ 371 (c)(1),
(2) Date: May 26, 2023

(87) PCT Pub. No.: WO2022/114602
PCT Pub. Date: Jun. 2, 2022

(65) Prior Publication Data
US 2023/0418130 A1     Dec. 28, 2023

(30) Foreign Application Priority Data

Nov. 26, 2020     (KR) ........................ 10-2020-0161163

(51) Int. Cl.
*G03B 5/04*          (2021.01)
*H04N 23/55*         (2023.01)
*H04N 23/68*         (2023.01)

(52) U.S. Cl.
CPC .............. *G03B 5/04* (2013.01); *H04N 23/55* (2023.01); *H04N 23/687* (2023.01); *G03B 2205/0007* (2013.01); *G03B 2205/0069* (2013.01)

(58) Field of Classification Search
CPC .............. G03B 5/04; G03B 2205/0007; G03B 2205/0069; H04N 23/687; H04N 23/55
(Continued)

(56) References Cited

U.S. PATENT DOCUMENTS

| | | | | |
|---|---|---|---|---|
| 2012/0154614 A1* | 6/2012 | Moriya | .................. | H04N 23/54 348/208.5 |
| 2013/0194683 A1* | 8/2013 | Machida | .................. | G02B 7/08 359/814 |

(Continued)

FOREIGN PATENT DOCUMENTS

| | | |
|---|---|---|
| JP | 2015-129960 A | 7/2015 |
| KR | 10-1343197 B1 | 12/2013 |

(Continued)

OTHER PUBLICATIONS

International Search Report dated Feb. 16, 2022 in International Application No. PCT/KR2021/016251.
(Continued)

*Primary Examiner* — Sharrief I Broome
(74) *Attorney, Agent, or Firm* — Saliwanchik, Lloyd & Eisenschenk

(57)          ABSTRACT
An embodiment comprises: a housing including side portions and corner portions; a bobbin arranged in the housing; a first coil arranged on the bobbin; first magnets which are arranged in the corner portions of the housing and have first sides facing the first coil, and second sides opposite to the first sides; and second coils which are arranged to face the second sides of the first magnets and move the housing in a direction perpendicular to the optical axis by interaction with the first magnets.

20 Claims, 43 Drawing Sheets

(58) Field of Classification Search
    USPC ......................................................... 359/824
    See application file for complete search history.

(56)                      References Cited

U.S. PATENT DOCUMENTS

2015/0331251 A1 *  11/2015  Hu ............................ G02B 7/04
                                                                      359/824
2021/0396950 A1 *  12/2021  Park ........................ H04N 23/57

FOREIGN PATENT DOCUMENTS

| | | | |
|---|---|---|---|
| KR | 10-2015-0080367 A | 7/2015 | |
| KR | 10-2015-0128265 A | 11/2015 | |
| KR | 10-2019-0042213 A | 4/2019 | |
| KR | 10-2019-0061213 A | 6/2019 | |
| KR | 10-2019-0133368 A | 12/2019 | |
| KR | 10-2020-0045839 A | 5/2020 | |
| KR | 10-2179867 B1 | 11/2020 | |
| WO | 2020/111577 A1 | 6/2020 | |

OTHER PUBLICATIONS

Supplementary European Search Report dated Apr. 8, 2024 in European Application No. 21898428.4.

* cited by examiner

LENS DRIVING DEVICE, AND CAMERA DEVICE AND OPTICAL INSTRUMENT THAT INCLUDE SAME

CROSS-REFERENCE TO RELATED APPLICATIONS

This application is the U.S. national stage application of International Patent Application No. PCT/KR2021/016251, filed Nov. 9, 2021, which claims the benefit under 35 U.S.C. § 119 of Korean Application No. 10-2020-0161163, filed Nov. 26, 2020, the disclosures of each of which are incorporated herein by reference in their entirety.

TECHNICAL FIELD

Embodiments relate to a lens moving apparatus, and a camera device and an optical instrument including the same.

BACKGROUND ART

Voice coil motor (VCM) technology, which is used in conventional general camera modules, is difficult to apply to a micro-scale camera module, which is intended to exhibit low power consumption, and study related thereto has been actively conducted.

There is increasing demand for, and production of, electronic products such as smartphones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as autofocus, shutter shaking prevention, and zooming in and out, are required.

DISCLOSURE

Technical Problem

Embodiments provide a lens moving apparatus capable of reducing a height in an optical-axis direction and enabling mounting of a large-aperture lens therein, and a camera device and an optical instrument including the same.

Technical Solution

A lens moving apparatus according to an embodiment includes a housing including a side portion and a corner portion, a bobbin disposed in the housing, a first coil disposed on the bobbin, a first magnet disposed on the corner portion of the housing and including a first surface facing the first coil and a second surface formed opposite the first surface, and a second coil disposed so as to face the second surface of the first magnet and configured to move the housing in a direction perpendicular to an optical axis using interaction with the first magnet.

The lens moving apparatus may include a cover member including an upper plate and a side plate and configured to allow the housing to be disposed therein, and the second coil may be disposed between the second surface of the first magnet and the side plate of the cover member.

An area of the second surface is smaller than an area of the first surface, and the first magnet may include a portion, and a length of the portion of the first magnet in a transverse direction may gradually decrease from the first surface toward the second surface.

The lens moving apparatus may include a first circuit board disposed between the side plate of the cover member and the housing and conductively connected to the second coil.

The first circuit board may include a seating portion in which the second coil is disposed and a fixed portion coupled to the side plate of the cover member.

The seating portion of the first circuit board may be spaced apart from the side plate of the cover member.

The lens moving apparatus may include an upper elastic member coupled to an upper portion of the bobbin and an upper portion of the housing, a second circuit board disposed under the housing, and a support member including one end coupled to the upper elastic member and another end conductively connected to the second circuit board.

At least a portion of the second coil may be disposed between the support member and the second surface of the first magnet.

The second coil may include a cavity facing the second surface of the first magnet.

The lens moving apparatus may include a base disposed under the second circuit board, and the first circuit board may be coupled to the base.

The housing may include a recess formed in the corner portion, and the second coil may be disposed in the recess.

A lens moving apparatus according to another embodiment includes a housing including a side portion and a corner portion, a bobbin disposed in the housing, a first coil disposed on the bobbin, a first magnet disposed on the corner portion of the housing and including a first surface facing the first coil, a second surface formed opposite the first surface, a third surface located between one side of the first surface and one side of the second surface, and a fourth surface located between the other side of the first surface and the other side of the second surface, and a second coil including a first coil unit disposed so as to face one of the third surface and the fourth surface in a first horizontal direction and a second coil unit disposed so as to face the remaining one of the third surface and the fourth surface in a second horizontal direction perpendicular to the first horizontal direction, wherein the second coil moves the housing in a direction perpendicular to an optical axis using interaction with the first magnet.

The lens moving apparatus according to the other embodiment may include a cover member including an upper plate and a side plate and configured to allow the housing to be disposed therein, and the first coil unit and the second coil unit may be disposed between the first magnet and the side plate of the cover member.

The first magnet may include a portion formed to gradually decrease in length in a transverse direction from the first surface to the second surface.

The lens moving apparatus according to the other embodiment may include a first circuit board disposed between the side plate of the cover member and the housing and conductively connected to the first coil unit and the second coil unit. The first circuit board may be coupled to the side plate of the cover member.

The lens moving apparatus according to the other embodiment may include an upper elastic member coupled to an upper portion of the bobbin and an upper portion of the housing, a second circuit board disposed under the housing, and a support member including one end coupled to the upper elastic member and another end conductively connected to the second circuit board. The first circuit board may be conductively connected to the second circuit board.

The housing may include a first recess formed in one side of the corner portion and a second recess formed in the other side of the corner portion, the first coil unit may be disposed in the first recess, and the second coil unit may be disposed in the second recess.

The first coil unit may include a cavity facing a portion of the first magnet in the first horizontal direction, and the second coil unit may include a cavity facing another portion of the first magnet in the second horizontal direction.

The first coil unit may overlap the first surface of the first magnet in the first horizontal direction, and the second coil unit may overlap the first surface of the first magnet in the second horizontal direction.

Advantageous Effects

According to embodiments, an OIS coil is disposed between a corner portion of a housing and a side plate of a cover member, whereby a height in an optical-axis direction may be reduced, and a large-aperture lens may be mounted.

DESCRIPTION OF DRAWINGS

FIG. 3A is a perspective view of the bobbin, the second magnet, and the third magnet shown in FIG. 1.

FIG. 20 is a view showing disposition of the first magnet and the second coil according to the embodiment shown in FIG. 18.

FIGS. 23A to 23D are views showing disposition of the magnet units and the coil units according to other embodiments.

FIGS. 24A and 24B are views showing disposition of the magnet units and the coil units according to still other embodiments.

BEST MODE

Figure 1:
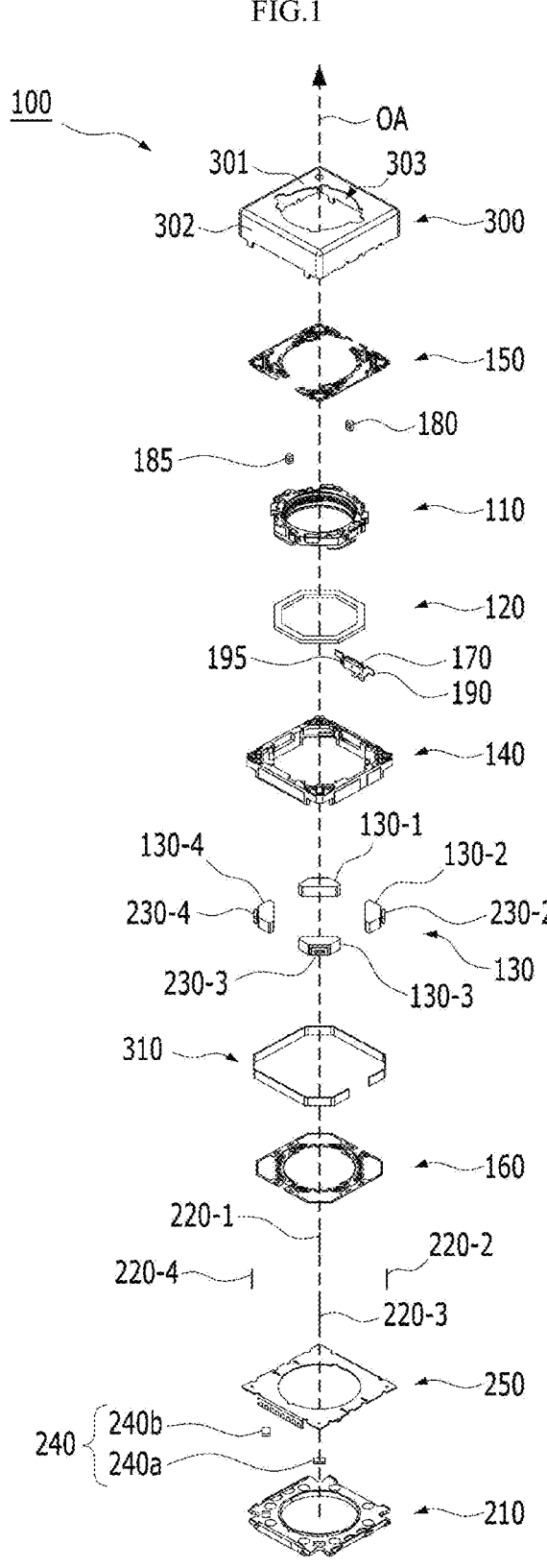
FIG. 1 is an exploded perspective view of a lens moving apparatus according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first," "second," "A," "B," "(a)," and "(b)" can be used. Such terms are only for distinguishing one component from another component, and do not determine the nature, sequence, or procedure of the corresponding constituent elements.

In addition, when it is described that a component is "connected," "coupled" or "joined" to another component, the description may include not only being directly "connected," "coupled" or "joined" to the other component but also being "connected," "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)," it may refer to a downward direction as well as an upward direction with respect to one element.

Hereinafter, the lens moving apparatus may alternatively be referred to as a lens moving unit, a voice coil motor (VCM), an actuator, or a lens moving device. Hereinafter, the "coil" may alternatively be referred to as a coil unit, and the "elastic member" may alternatively be referred to as an elastic unit or a spring.

In addition, in the following description, the "terminal" may alternatively be referred to as a pad, an electrode, a conductive layer, or a bonding portion.

For convenience of description, the lens moving apparatus according to the embodiment will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the optical-axis (OA) direction, may be referred to as a "first direction", the x-axis direction may be referred to as a "second direction", and the y-axis direction may be referred to as a "third direction".

The lens moving apparatus according to the embodiment may perform an "autofocus function". Here, the autofocus function is a function of automatically focusing an image of a subject on the surface of an image sensor.

In addition, the lens moving apparatus according to the embodiment may perform a "hand-tremor compensation function". Here, the hand-tremor compensation function is a function of inhibiting the contour of a captured still image from being blurred due to vibration caused by shaking of a hand of a user when capturing the still image.

Figure 2:
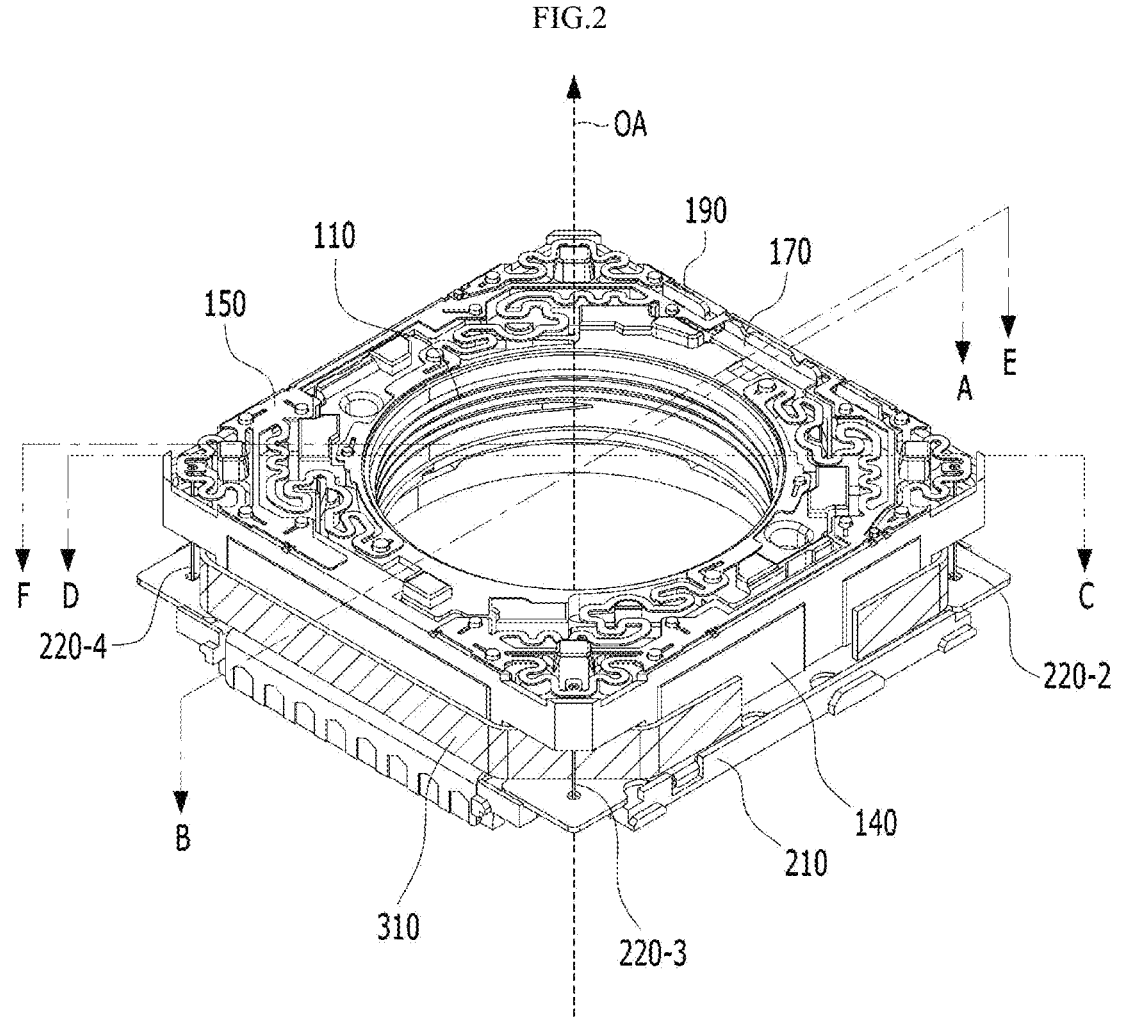
FIG. 2 is an assembled perspective view of the lens moving apparatus, from which the cover member shown in FIG. 1 is removed.

FIG. 1 is an exploded perspective view of a lens moving apparatus 100 according to an embodiment, and FIG. 2 is an assembled perspective view of the lens moving apparatus 100, from which the cover member 300 shown in FIG. 1 is removed.

Referring to FIGS. 1 and 2, the lens moving apparatus 100 may include a bobbin 110, a first coil 120, a first magnet 130, a housing 140, and a second coil 230.

The lens moving apparatus 100 may further include a circuit board 310 connected to the second coil 230.

The lens moving apparatus 100 may further include at least one of an upper elastic member 150, a lower elastic member 160, a support member 220, a first position sensor 170, a circuit board 190, or a second magnet 180.

In addition, the lens moving apparatus 100 may further include a second position sensor 240.

In addition, the lens moving apparatus 100 may further include at least one of a third magnet 185, a base 210, a circuit board 250, or a cover member 300.

In addition, the lens moving apparatus 100 may further include a capacitor 195 mounted on the circuit board 190.

Hereinafter, the circuit board 310 may alternatively be referred to as any one of first to third circuit boards, the circuit board 250 may alternatively be referred to as another one of the first to third circuit boards, and the circuit board 190 may alternatively be referred to as the remaining one of the first to third circuit boards.

First, the bobbin 110 will be described.

The bobbin 110 may be disposed in the housing 140 so as to be movable in the optical-axis (OA) direction or the first direction (e.g. the Z-axis direction) by electromagnetic interaction between the first coil 120 and the first magnet 130.

Figure 3A:
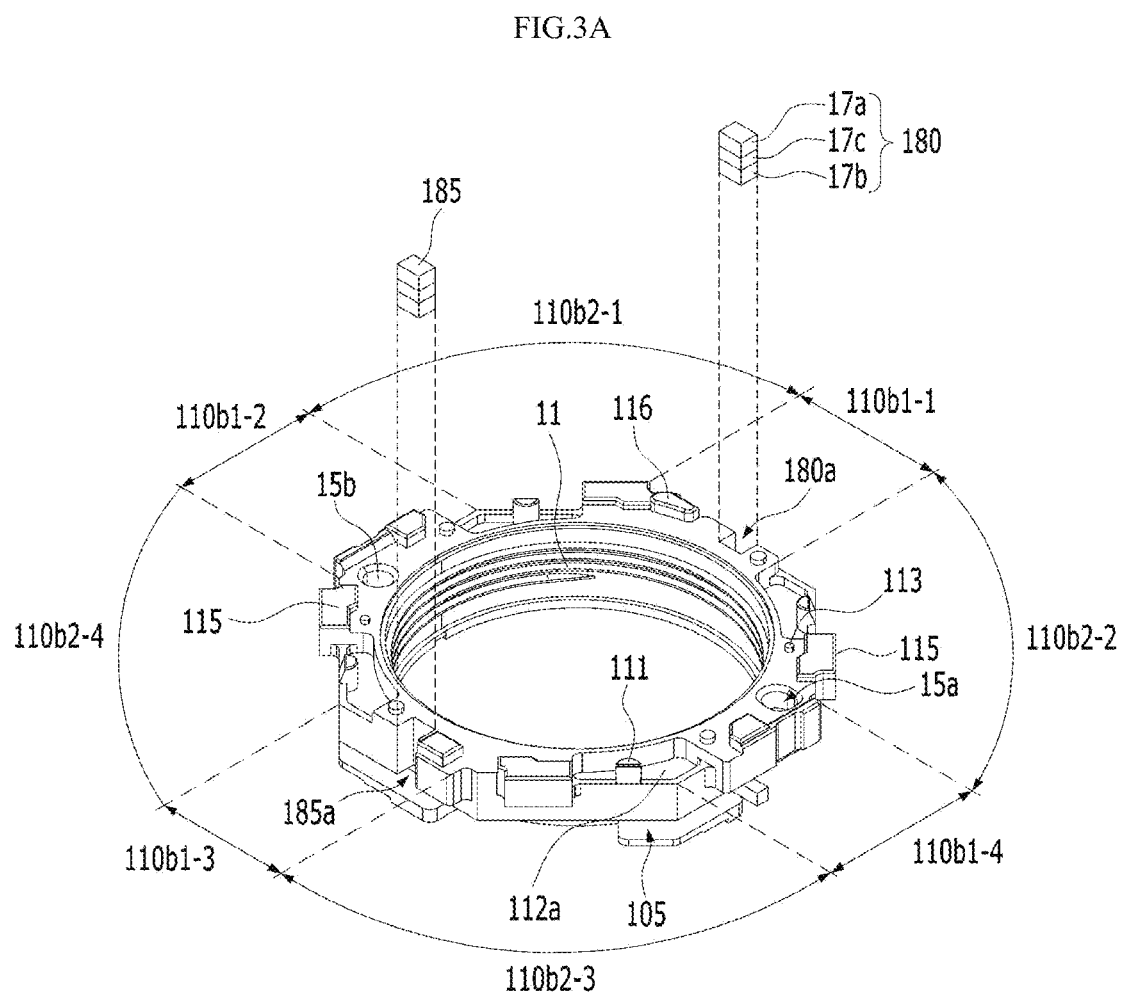
Figure 3B:
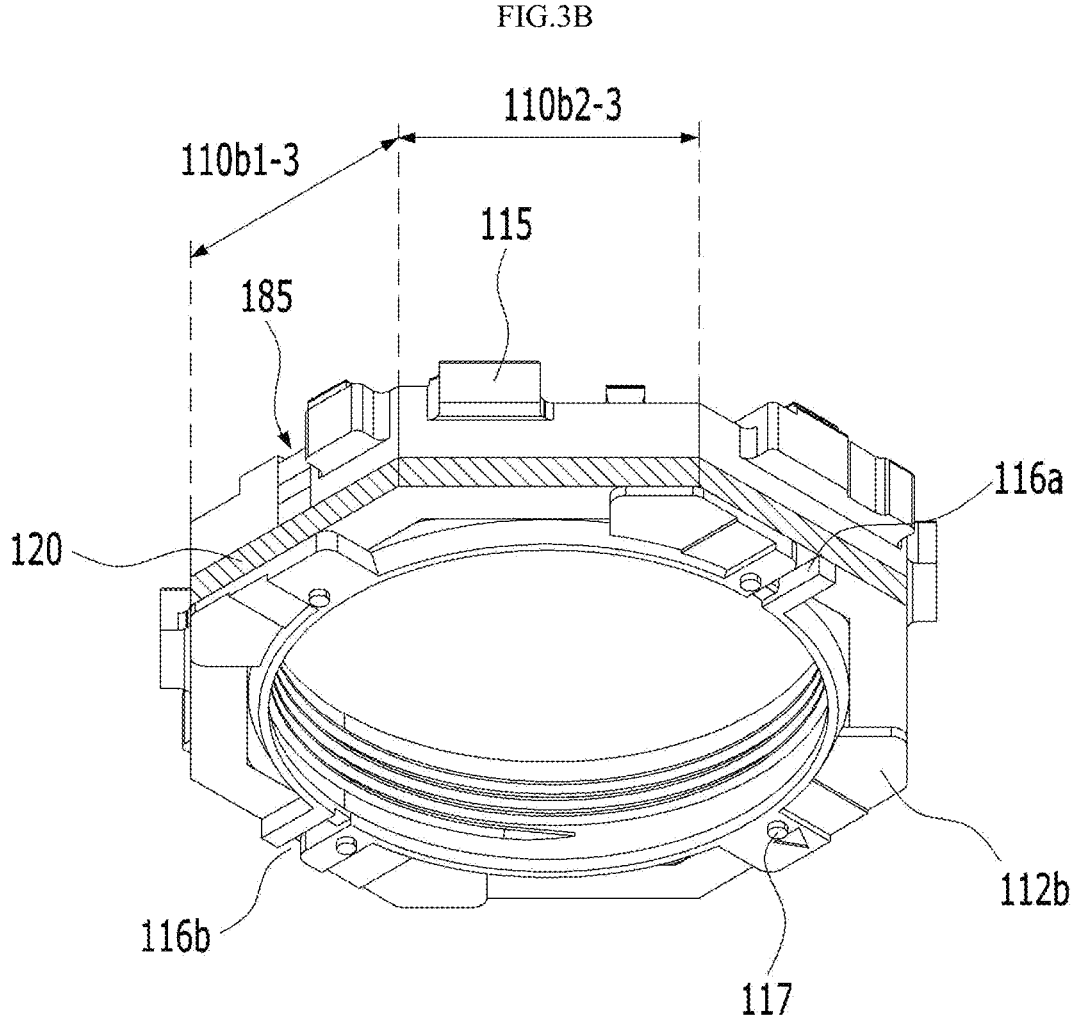
FIG. 3B illustrates a first coil coupled to the bobbin.

FIG. 3A is a perspective view of the bobbin 110, the second magnet 180, and the third magnet 185 shown in FIG. 1, and FIG. 3B illustrates the first coil 120 coupled to the bobbin 110.

Referring to FIGS. 3A and 3B, the bobbin 110 may have a bore 110a formed therein to mount a lens or a lens barrel therein. In an example, the bore 110a in the bobbin 110 may be a through-hole formed through the bobbin 110 in the optical-axis direction, and may have a circular shape, an elliptical shape, or a polygonal shape, without being limited thereto.

A lens may be directly mounted in the bore 110a in the bobbin 110, but the disclosure is not limited thereto. In another embodiment, a lens barrel, to which at least one lens is mounted or coupled, may be coupled or mounted in the bore in the bobbin 110. The lens or the lens barrel may be coupled to the inner circumferential surface of the bobbin 110 in any of various manners.

The bobbin 110 may include first side portions 110b1-1 to 110b1-4, which are spaced apart from each other, and second side portions 110b2-1 to 110b2-4, which are spaced apart from each other. Each of the second side portions 110b2-1 to 110b2-4 may connect two adjacent ones of the first side portions to each other. In an example, the length of each of the first side portions 110b1-1 to 110b-4 of the bobbin 110 in the horizontal direction or the transverse direction may be different from the length of each of the second side portions 110b2-1 to 110b2-4 in the horizontal direction or the transverse direction. However, the disclosure is not limited thereto. In another embodiment, the two lengths may be equal to each other.

The bobbin 110 may include a protruding portion 115, which is provided on the outer surface thereof. In an example, the protruding portion 115 may be disposed on the outer surface of at least one of the second side portions 110*b*2-1 to 110*b*2-4 of the bobbin 110, but the disclosure is not limited thereto. The protruding portion 115 may protrude in a direction parallel to a line that extends through the center of the bore 110*a* in the bobbin 110 and is perpendicular to the optical axis, but the disclosure is not limited thereto.

The protruding portion 115 of the bobbin 110 may correspond to a recessed portion 25*a* in the housing 140, and may be inserted into or disposed in the recessed portion 25*a* in the housing 140 in order to suppress or inhibit rotation of the bobbin 110 about the optical axis beyond a predetermined range.

Furthermore, when the bobbin 110 is moved beyond a predetermined range in the optical-axis direction (for example, in a direction from the upper elastic member 150 toward the lower elastic member 160) due to external impact or the like, the protruding portion 115 may serve as a stopper that suppresses or inhibits direct collision of the lower surface of the bobbin 110 with the base 210 or the circuit board 250.

The bobbin 110 may have a first escape recess 112*a* formed in the upper surface thereof to avoid spatial interference with a first frame connection portion 153 of the upper elastic member 150. In an example, the first escape recess 112*a* may be disposed in each of the second side portions 110*b*2-1 to 110*b*2-4 of the bobbin 110, but the disclosure is not limited thereto.

The bobbin 110 may be provided on the upper surface thereof with a guide portion 11 to guide the upper elastic member 150 to the mounting position. As illustrated in FIG. 3A, in an example, the guide portion 111 of the bobbin 110 may be disposed in the first escape recess 112*a* in order to guide the first frame connection portion 153 of the upper elastic member 150 to extend along a predetermined path. In an example, the guide portion 111 may protrude from the bottom surface of the first escape recess 112*a* in the optical-axis direction.

In addition, a damper may be disposed between the guide portion 111 of the bobbin 110 and the upper elastic member 150 (e.g. the first frame connection portion 153). In this case, the damper may be coupled or attached to the guide portion 111 and the upper elastic member 150 (e.g. the first frame connection portion 153).

The bobbin 110 may include a stopper 116, which protrudes from the upper surface thereof.

The stopper 116 of the bobbin 110 may serve to inhibit the upper surface of the bobbin 110 from directly colliding with the inner side of the upper plate of the cover member 300 when the bobbin 110 is moved beyond a prescribed range due to external impact or the like while the bobbin 110 is being moved in the first direction in order to perform the autofocus function.

The bobbin 110 may include a first coupling portion 113 in order to be coupled and fixed to the upper elastic member 150. In an example, the first coupling portion 113 of the bobbin 110 is illustrated in FIG. 3A as being of a protrusion type, but the disclosure is not limited thereto. In another embodiment, the first coupling portion 113 of the bobbin 110 may be formed in a shape of a recess or a flat surface.

In addition, the bobbin 110 may include a second coupling portion 117 in order to be coupled and fixed to the lower elastic member 160. The second coupling portion 117 of the bobbin 110 is illustrated in FIG. 3B as being of a protrusion type, but the disclosure is not limited thereto. In another embodiment, the second coupling portion of the bobbin 110 may be formed in a shape of a recess or a flat surface.

The bobbin 110 may have a seating recess 105 formed in the outer surface thereof to allow the first coil 120 to be seated, inserted, or disposed therein. The seating recess 105 may be recessed in the outer surface of each of the first and second side portions 110*b*1-1 to 110*b*1-4 and 110*b*2-1 to 110*b*2-4 of the bobbin 110, and may have a closed curve shape, such as a circular shape, an elliptical shape, or a polygonal ring shape, which coincides with the shape of the first coil 120.

In addition, in order to suppress separation of the first coil 120 and to guide the two ends of the first coil 120 when the first coil 120 is connected to the lower elastic members 160-1 and 160-2, guide recesses 116*a* and 116*b* may be formed in the lower surfaces of two first side portions (e.g. 110*b*1-2 and 110*b*1-4) or two second side portions of the bobbin 110 that are located opposite each other.

In addition, the bobbin 110 may have a seating recess 180*a* formed in the outer surface thereof to allow the second magnet 180 to be seated, inserted, fixed, or disposed therein. In an example, the seating recess 180*a* in the bobbin 110 may be recessed in the outer surface of the bobbin 110 and may include an opening formed in at least one of the upper surface or the lower surface of the bobbin 110, but the disclosure is not limited thereto.

In addition, the bobbin 110 may have a seating recess 185*a* formed in the outer surface thereof to allow the third magnet 185 to be seated, inserted, fixed, or disposed therein. In an example, the seating recess 185*a* in the bobbin 110 may be recessed in the outer surface of the bobbin 110 and may have an opening formed in at least one of the upper surface or the lower surface of the bobbin 110, but the disclosure is not limited thereto.

Each of the seating recesses 180*a* and 185*a* in the bobbin 110 may be located above the seating recess 105, in which the first coil 120 is disposed, and may be connected to or contiguous with the seating recess 105, without being limited thereto. In another embodiment, the two seating recesses may be spaced apart from each other.

The seating recess 180*a* in the bobbin 110 may be formed in one (e.g. 110*b*1-1) of the first side portions 110*b*1-1 to 110*b*1-4 of the bobbin 110, and the seating recess 185*a* in the bobbin 110 may be formed in another (e.g. 110*b*1-3) of the first side portions 110*b*1-1 to 110*b*1-4 of the bobbin 110.

In an example, the seating recesses 180*a* and 185*a* may be disposed in two first side portions of the bobbin 110 that face each other or that are located opposite each other.

Since the second magnet 180 and the third magnet 185 are disposed in the seating recesses 180*a* and 185*a* formed in two first side portions of the bobbin 110 that are located opposite each other, it is possible to achieve weight equilibrium between the second magnet 180 and the third magnet 185, and it is possible for the influence on AF driving force due to magnetic field interference between the first magnet 130 and the second magnet 180 to cancel out the influence on AF driving force due to magnetic field interference between the first magnet 130 and the third magnet 185, whereby the embodiment may improve the accuracy of the autofocus (AF) operation.

The bobbin 110 may be provided on the inner circumferential surface thereof with a thread 11 for coupling to the lens or the lens barrel. The thread 11 may be formed on the inner circumferential surface of the bobbin 110 in the state in which the bobbin 110 is held by a jig or the like. The bobbin 110 may have jig-fixing recesses 15*a* and 15*b* formed in the upper surface thereof. In an example, the jig-fixing recesses 15a and 15b may be formed in the upper surfaces of two first side portions (e.g. 110b1-2 and 110b1-4) or two second side portions of the bobbin 110 that are located opposite each other, but the disclosure is not limited thereto. The jig-fixing recesses 15a and 15b may also function as a foreign-substance collector to collect foreign substances.

Next, the first coil 120 will be described.

The first coil 120 may be disposed on or coupled to the bobbin 110. In an example, the first coil 120 may be disposed on the outer surface of the bobbin 110.

In an example, the first coil 120 may be disposed under the second and third magnets 180 and 185, but the disclosure is not limited thereto. In an example, the first coil 120 may be disposed under the protruding portion 115 of the bobbin 110, but the disclosure is not limited thereto.

In an example, the first coil 120 may not overlap the second and third magnets 180 and 185 in a direction perpendicular to the optical axis, but the disclosure is not limited thereto.

In an example, the first coil 120 may be disposed in the seating recess 105 in the bobbin 110, the second magnet 180 may be inserted into or disposed in the seating recess 180a in the bobbin 110, and the third magnet 185 may be inserted into or disposed in the seating recess 185a in the bobbin 110.

In an example, each of the second magnet 180 and the third magnet 185, which are disposed on the bobbin 110, may be spaced apart from the first coil 120 in the optical-axis (OA) direction, but the disclosure is not limited thereto. In another embodiment, each of the second magnet 180 and the third magnet 185, which are disposed on the bobbin 110, may be in contact with the first coil 120, or may overlap the first coil 120 in a direction perpendicular to the optical axis. In an alternative example, at least a portion of each of the second magnet 180 and the third magnet 185 may be disposed inside the first coil 120.

In an example, the first coil 120 may surround the outer surface of the bobbin 110 in a winding direction about the optical axis OA.

The first coil 120 may be directly wound around the outer surface of the bobbin 110, but the disclosure is not limited thereto. In another embodiment, the first coil 120 may be coupled to the bobbin 110 in a form of a coil ring or a coil block. The first coil 120 may be embodied as a coil ring or a coil block having an angled ring shape or a rounded ring shape.

Power or a drive signal may be supplied to the first coil 120.

The power or the drive signal supplied to the first coil 120 may be a DC signal, an AC signal, or a signal containing both DC and AC components, and may be of a voltage type or a current type.

When a drive signal (e.g. a drive current) is supplied to the first coil 120, electromagnetic force may be generated by electromagnetic interaction with the first magnet 130, and the bobbin 110 may be moved in the optical-axis (OA) direction by the generated electromagnetic force.

At the initial position of an AF operation unit (or an AF moving unit), the bobbin 110 may be moved upwards or downwards, which is referred to as bidirectional driving of the AF operation unit. Alternatively, at the initial position of the AF operation unit, the bobbin 110 may be moved upwards, which is referred to as unidirectional driving of the AF operation unit.

At the initial position of the AF operation unit, the first coil 120 may be disposed so as to correspond to or overlap the first magnet 130, which is disposed in the housing 140, in a direction parallel to a line that is perpendicular to the optical axis OA and extends through the optical axis.

In an example, the AF operation unit may include the bobbin 110 and components (e.g. the first coil 120 and the second and third magnets 180 and 185) coupled to the bobbin 110. In an example, the AF operation unit may include the lens and/or the lens barrel.

The initial position of the AF operation unit may be an original position of the AF operation unit in the state in which no electric power is applied to the first coil 120 or a position at which the AF operation unit is located as a result of the upper and lower elastic members 150 and 160 being elastically deformed due only to the weight of the AF operation unit.

In addition, the initial position of the bobbin 110 may be a position at which the AF operation unit is located when gravity acts in a direction from the bobbin 110 toward the base 210 or when gravity acts in a direction from the base 210 toward the bobbin 110.

Next, the second and third magnets 180 and 185 will be described.

The second magnet 180 may be referred to as a "sensing magnet" because the second magnet 180 provides a magnetic field, which is detected by the first position sensor 170, and the third magnet 185 may be referred to as a balancing magnet because the third magnet 185 cancels out the influence of the magnetic field of the sensing magnet 180 and establishes weight equilibrium with the sensing magnet 180.

The second magnet 180 and the third magnet 185 may be disposed on or coupled to the bobbin 110.

A portion of one surface of the second magnet 180 that faces the first position sensor 170 may be exposed from the seating recess 180a, but the disclosure is not limited thereto. In another embodiment, a portion of one surface of the second magnet 180 that faces the first position sensor 170 may not be exposed from the seating recess 180a.

In an example, each of the second and third magnets 180 and 185, which are disposed on the bobbin 110, may be configured such that the interface between the N pole and the S pole is parallel to a direction perpendicular to the optical axis OA. In an example, each of the surfaces of the second and third magnets 180 and 185 that face the first position sensor 170 may be divided into an N pole and an S pole, but the disclosure is not limited thereto.

In another embodiment, for example, the interface between the N pole and the S pole of each of the second and third magnets 180 and 185, which are disposed on the bobbin 110, may be parallel to the optical axis OA.

In an example, each of the second and third magnets 180 and 185 may be a monopolar-magnetized magnet, which includes one N pole and one S pole, but the disclosure is not limited thereto. In another embodiment, each of the second and third magnets 180 and 185 may be a bipolar-magnetized magnet or a 4-pole magnet, which includes two N poles and two S poles.

Each of the second and third magnets 180 and 185 may include a first magnet part 17a, a second magnet part 17b, and a partition wall 17c disposed between the first magnet part 17a and the second magnet part 17b. Here, the partition wall 17c may alternatively be referred to as a "non-magnetic partition wall".

The first magnet part 17a may include an N pole, an S pole, and a first interface portion between the N pole and the S pole. The first interface portion may be a portion that has substantially no magnetism and includes a zone having almost no polarity, and may be a portion that is naturally formed in order to form a magnet composed of one N pole and one S pole.

The second magnet part 17b may include an N pole, an S pole, and a second interface portion between the N pole and the S pole. The second interface portion may be a portion that has substantially no magnetism and includes a zone having almost no polarity, and may be a portion that is naturally formed in order to form a magnet composed of one N pole and one S pole.

The partition wall 17c may be a portion that separates or isolates the first magnet part 17a and the second magnet part 17b from each other and has substantially no magnetism or polarity. The partition wall may be, for example, a non-magnetic material, air, or the like. The non-magnetic partition wall may be referred to as a "neutral zone" or a "neutral section".

The partition wall 17c may be a portion that is artificially formed when the first magnet part 17a and the second magnet part 17b are magnetized. The width of the partition wall 17c may be larger than the width of the first interface portion (or the width of the second interface portion). Here, the width of the partition wall 17c may be a length of the partition wall 17c in a direction from the first magnet part 17a toward the second magnet part 17b. The width of the first interface portion (or the second interface portion) may be a length of the first interface portion in a direction from the N pole toward the S pole of each of the first and second magnet parts 17a and 17b.

The second magnet 180 may be moved together with the bobbin 110 in the optical-axis direction, and the first position sensor 170 may detect the intensity of the magnetic field or the magnetic force of the second magnet 180, which is moved in the optical-axis direction, and may output an output signal corresponding to a result of the detection.

In an example, the intensity of the magnetic field or magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

Next, the housing 140 will be described.

The housing 140 may be disposed in the cover member 300.

The housing 140 accommodates the bobbin 110 therein, and supports the first magnet 130, the first position sensor 170, and the circuit board 190.

Figure 4A:
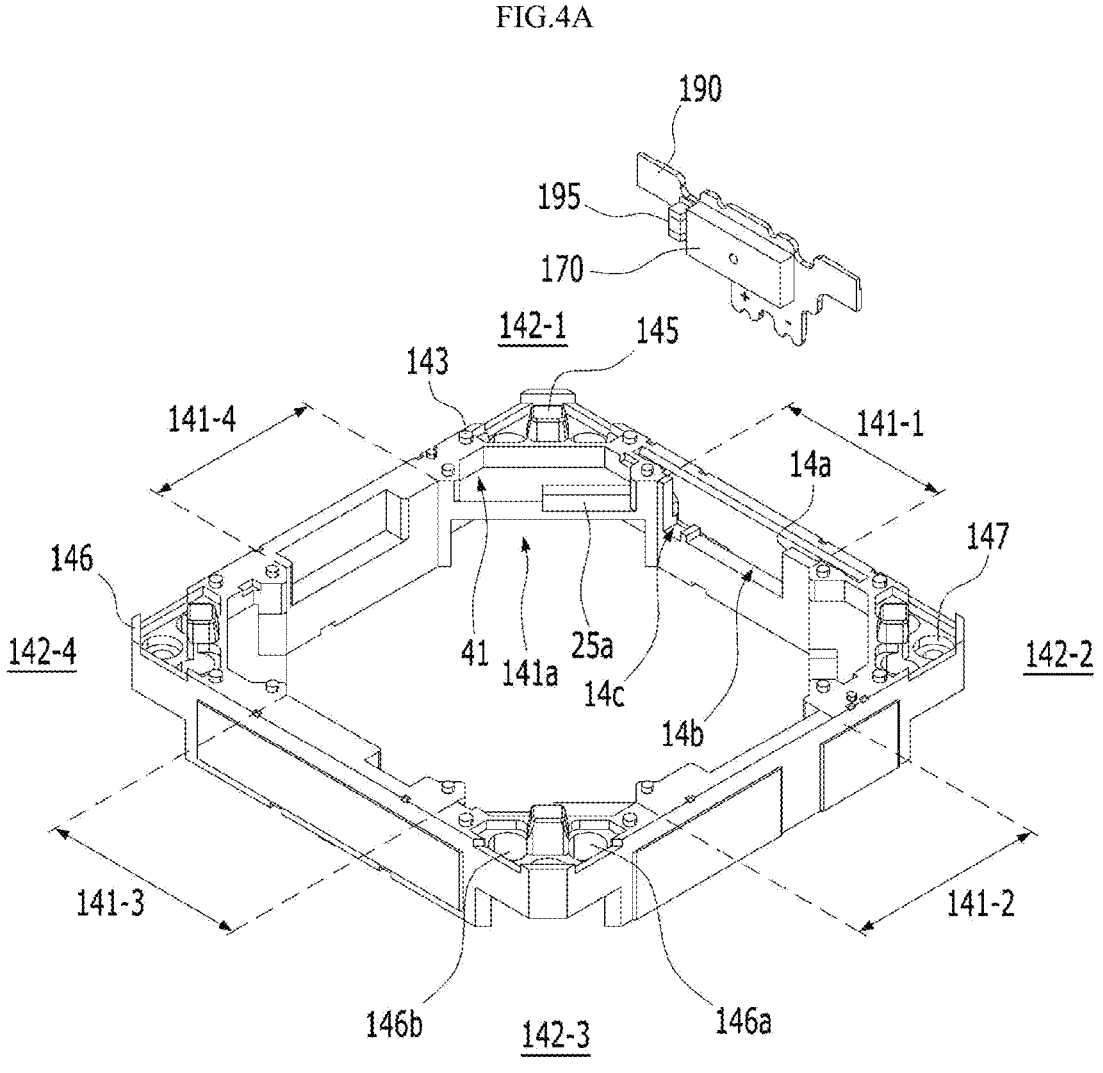
FIG. 4A is a perspective view of the housing, the circuit board, the first position sensor, and the capacitor shown in FIG. 1.
Figure 4B:
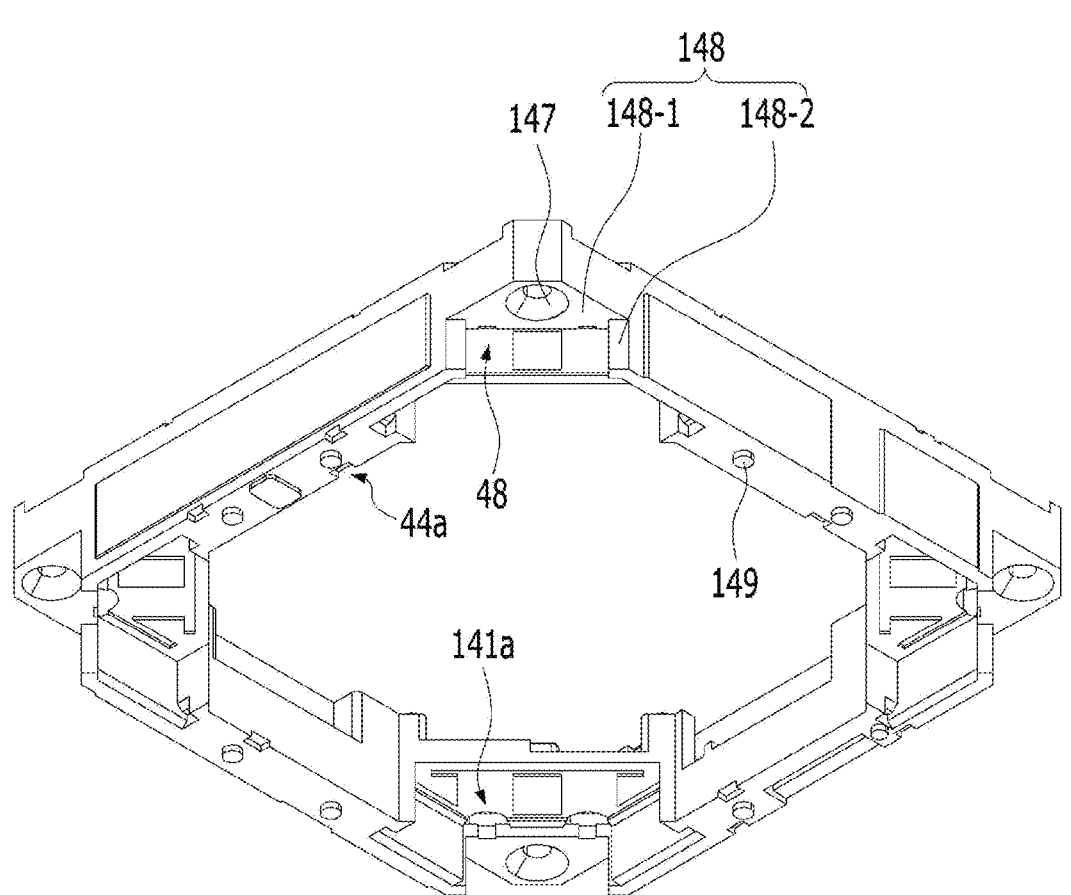
FIG. 4B is a bottom perspective view of the housing.
Figure 4C:
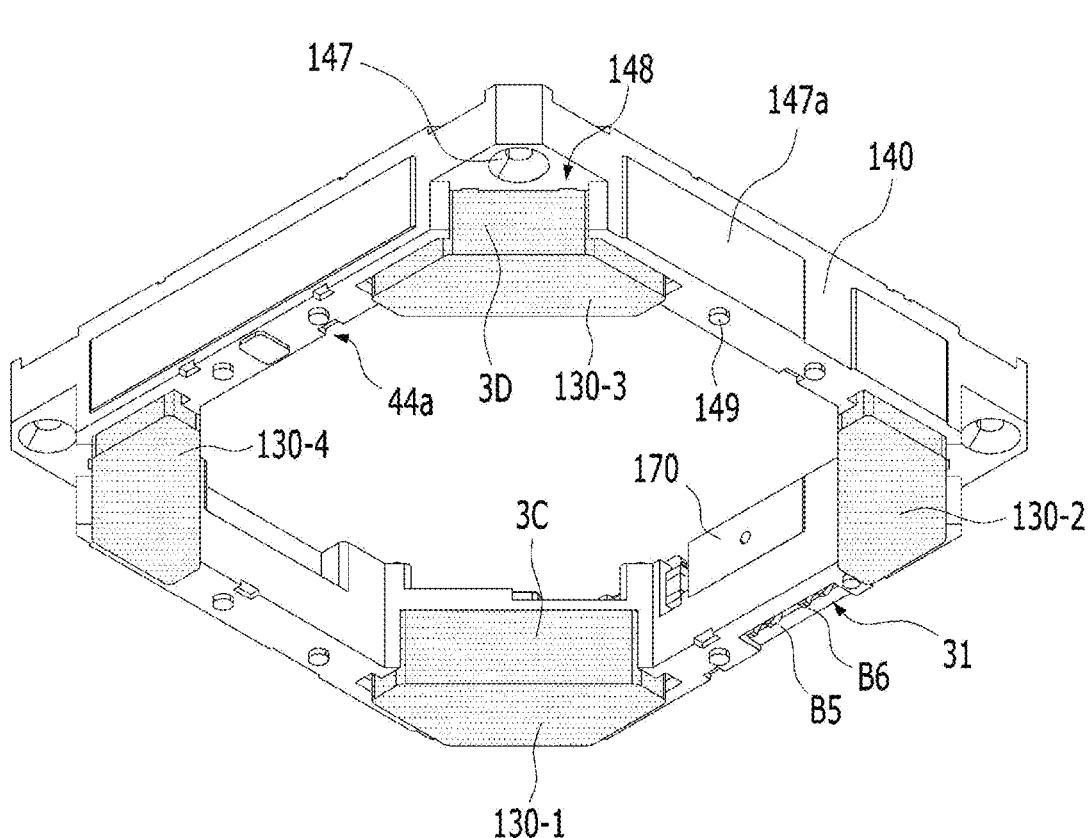
FIG. 4C is an assembled perspective view of the housing, a first magnet, the circuit board, the first position sensor, and the capacitor.

FIG. 4A is a perspective view of the housing 140, the circuit board 190, the first position sensor 170, and the capacitor 195 shown in FIG. 1, FIG. 4B is a bottom perspective view of the housing 140, and FIG. 4C is an assembled perspective view of the housing 140, the first magnet 130, the circuit board 190, the first position sensor 170, and the capacitor 195.

Referring to FIGS. 4A and 4B, the housing 140 may be formed in a hollow column shape overall. In an example, the housing 140 may have a polygonal (e.g. rectangular or octagonal) or circular bore 140a formed therein, and the bore 140a in the housing 140 may be a through-hole, which is formed through the housing 140 in the optical-axis direction. In an example, at least a portion of the bobbin 110 may be disposed in the bore 140a in the housing 140.

The housing 140 may include a plurality of side portions 141-1 to 141-4 and a plurality of corner portions 142-1 to 142-4.

In an example, the housing 140 may include first to fourth side portions 141-1 to 141-4, which are spaced apart from each other, and first to fourth corner portions 142-1 to 142-4, which are spaced apart from each other.

Each of the corner portions 142-1 to 142-4 of the housing 140 may be disposed or located between two adjacent ones 141-1 and 141-2, 141-2 and 141-3, 141-3 and 141-4, and 141-4 and 141-1 of the side portions so as to connect the side portions 141-1 to 141-4 to each other.

In an example, the corner portions 142-1 to 142-4 may be located at the corners of the housing 140. In an example, the number of side portions of the housing 140 is four, and the number of corner portions is four, but the disclosure is not limited thereto. The number of side portions or corner portions may be five or greater.

Each of the side portions 141-1 to 141-4 of the housing 140 may be disposed parallel to a corresponding one of side plates 302 (302A to 302D) of the cover member 300.

In an example, the side portions 141-1 to 141-4 of the housing 140 may correspond to or face the first side portions 110b1-1 to 110b1-4 of the bobbin 110, and the corner portions 142-1 to 142-4 of the housing 140 may correspond to or face the second side portions 110b2-1 to 110b2-4 of the bobbin 110.

The first magnet 130 may be disposed or mounted on the corner portions 142-1 to 142-4 of the housing 140.

In an example, the housing 140 may have a seating portion 141a or a receiving portion formed in the corners or the corner portions 142-1 to 142-4 thereof to receive the magnet 130 therein.

In an example, the seating portion 141a in the housing 140 may be formed in the lower portion or the lower end of at least one of the corner portions 142-1 to 142-4 of the housing 140.

In an example, the seating portion 141a in the housing 140 may be formed in the inner side of the lower portion or the lower end of each of the four corner portions 142-1 to 142-4.

The seating portion 141a in the housing 140 may be formed as a recess, e.g. a concave recess, having a shape corresponding to the first magnet 130, but the disclosure is not limited thereto.

In an example, a first opening may be formed in the side surface of the seating portion 141a in the housing 140 that faces the first coil 120, and a second opening may be formed in the lower surface of the seating portion 141a in the housing 140 that faces the upper surface of the circuit board 250 or the upper surface of the base 210. This serves to facilitate mounting of the first magnet 130.

In an example, a first surface 3C of the first magnet 130, which is fixed to or disposed in the seating portion 141a in the housing 140, may be exposed through the first opening in the seating portion 141a. Furthermore, a lower surface 3B of the first magnet 130, which is fixed to or disposed in the seating portion 141a in the housing 140, may be exposed through the second opening in the seating portion 141a.

The housing 140 may have an escape recess 41 formed in the upper surfaces of the corner portions 142-1 to 142-4 in order to avoid spatial interference with the first frame connection portion 153 of the upper elastic member 150.

In an example, the escape recess 41 in the housing 140 may be recessed in the upper surface of the housing 140, and may be located closer to the center of the housing 140 than a stopper 145 or a hole 147. In an example, the escape recess 41 may be located farther inwards than the stopper 145 of the housing 140 in a direction toward the center of the housing 140, and the hole 147 may be located farther outwards than the stopper 145 of the housing 140.

The housing 140 may have a recessed portion 25a formed in the corner portions 142-1 to 142-4 so as to correspond to or face the protruding portion 115 of the bobbin 110. In an example, the recessed portion 25a in the housing 140 may be located above the seating portion 141a in the housing 140. In an example, the recessed portion 25a in the housing 140 may be formed in the bottom surface of the escape recess 41. In an example, the bottom surface of the recessed portion 25a may be located lower than the bottom surface of the escape recess 41, and the seating recess 141a in the housing 140 may be located lower than the bottom surface of the escape recess 41.

The first magnet 130 may be fixed to the seating portion 141a by means of an adhesive, but the disclosure is not limited thereto.

In an example, the housing 140 may have one or more adhesive injection holes 146a and 146b formed in the corner portions 142-1 to 142-4 to receive an adhesive injected thereinto. The one or more adhesive injection holes 146a and 146b may be recessed in the upper surfaces of the corner portions 142-1 to 142-4.

The one or more adhesive injection holes 146a and 146b may be through-holes formed through the corner portions 142-1 to 142-4. The adhesive injection holes 146a and 146b may be connected to or communicate with the seating recess 141a in the housing 140, and may expose at least a portion of the first magnet 130 (e.g. at least a portion of an upper surface 3A of the magnet 130). Since the adhesive injection holes 146a and 146b expose at least a portion of the first magnet 130 (e.g. at least a portion of the upper surface 3A of the magnet 130), an adhesive may be effectively applied to the first magnet 130, and accordingly, the coupling force between the first magnet 130 and the housing 140 may be increased.

The housing 140 may include at least one stopper 147a protruding from the outer surfaces of the side portions 141-1 to 141-4. The at least one stopper 147a may inhibit the outer surfaces of the housing 140 from colliding with the side plates 302 of the cover member 300 when the housing 140 moves in a direction perpendicular to the optical axis.

In order to inhibit the lower surface of the housing 140 from colliding with the base 210 and/or the circuit board 250, the housing 140 may further include a stopper (not shown) protruding from the lower surface thereof.

The housing 140 may have formed therein a mounting recess 14a (or a seating recess) to receive the circuit board 190, a mounting recess 14b (or a seating recess) to receive the first position sensor 170, and a mounting recess 14c (or a seating recess) to receive the capacitor 195.

The mounting recess 14a in the housing 140 may be formed in the upper portion or the upper end of one (e.g. 141-1) of the side portions 141-1 to 141-4 of the housing 140.

In order to facilitate mounting of the circuit board 190, the mounting recess 14a in the housing 140 may be formed so as to be open at the upper surface thereof and to have a side surface, a bottom surface, and an opening that is open to the inside of the housing 140. The mounting recess 14a in the housing 140 may have a shape that corresponds to or coincides with the shape of the circuit board 190.

The mounting recess 14b in the housing 140 may be formed in the inner surface of the first side portion 141-1 of the housing 140, and may be connected to the mounting recess 14a.

The mounting recess 14c in the housing 140 may be disposed on one side of the mounting recess 14b, and a projection or a protruding portion may be provided between the mounting recess 14b and the mounting recess 14c in order to separate or isolate the capacitor 195 from the first position sensor 170. The reason for this is to position the capacitor 195 and the first position sensor 170 close to each other, thereby reducing the length of a path for conductive connection therebetween, thus reducing the amount of noise introduced by a long path.

The capacitor 195 may be disposed or mounted on a first surface 19b of the circuit board 190.

The capacitor 195 may be of a chip type. In this case, the chip may include a first terminal 195a (refer to FIG. 8B), which corresponds to one end of the capacitor 195, and a second terminal 195b (refer to FIG. 8B), which corresponds to the other end of the capacitor 195. The capacitor 195 may alternatively be referred to as a "capacitive element" or a condenser.

In another embodiment, the capacitor may be included in the circuit board 190. In an example, the circuit board 190 may include a capacitor including a first conductive layer, a second conductive layer, and an insulating layer (e.g. a dielectric layer) disposed between the first conductive layer and the second conductive layer.

The capacitor 195 may be conductively connected in parallel to first and second terminals B1 and B2 of the circuit board 190, through which power (or a drive signal) is supplied to the first position sensor 170 from the outside.

In an alternative example, the capacitor 195 may be conductively connected in parallel to the terminals of the first position sensor 170, which are conductively connected to the first and second terminals B1 and B2 of the circuit board 190.

In an example, one end of the capacitor 195 (or the first terminal of the capacitor chip) may be conductively connected to the first terminal B1 of the circuit board 190, and the other end of the capacitor 195 (or the terminal of the capacitor chip) may be conductively connected to the second terminal B2 of the circuit board 190.

Since the capacitor 195 is conductively connected in parallel to the first and second terminals B1 and B2 of the circuit board 190, the capacitor 195 may serve as a smoothing circuit to remove ripple components included in power signals GND and VDD supplied to the first position sensor 170 from the outside, whereby stable and consistent power signals may be supplied to the first position sensor 170.

Since the capacitor 195 is conductively connected in parallel to the first and second terminals B1 and B2 of the circuit board 190, it is possible to protect the first position sensor 170 from high-frequency noise, electrostatic discharge (ESD), or the like, which is introduced from the outside.

In addition, the capacitor 195 may inhibit overcurrent, which is caused by high-frequency noise, ESD, or the like introduced from the outside, from being applied to the first position sensor 170, and may inhibit a calibration value for displacement of the bobbin 110, which is obtained based on the signal output from the first position sensor 170, from being reset due to the overcurrent.

In addition, the mounting recess 14b in the housing 140 may be open at the upper portion thereof in order to facilitate mounting of the first position sensor 170, and may have an opening formed in the inner surface of the first side portion 141-1 of the housing 140 in order to increase the sensitivity of the first position sensor 170. The mounting recess 14b in the housing 140 may have a shape corresponding to or coinciding with the shape of the first position sensor 170.

In an example, the circuit board 190 may be fixed in the mounting recess 14a in the housing 140 using an adhesive member. The adhesive member may be, for example, epoxy or a sheet of double-sided adhesive tape, but the disclosure is not limited thereto.

The corner portions 142-1 to 142-4 of the housing 140 may be provided with support members 220-1 to 220-4.

Holes 147 defining paths through which the support members 220-1 to 220-4 extend may be formed in the corner portions 142-1 to 142-4 of the housing 140. In an example, the housing 140 may include holes 147 formed through the upper portions of the corner portions 142-1 to 142-4 thereof.

In another embodiment, the holes formed in the corner portions 142-1 to 142-4 of the housing 140 may be recessed in the outer surfaces of the corner portions of the housing 140. At least a portion of the hole may be open to the outer surfaces of the corner portions. The number of holes 147 in the housing 140 may be equal to the number of support members.

One end of the support member 220 may pass through the hole 147 to be connected or bonded to the upper elastic member 150 (e.g. the first outer frame 152).

In an example, the diameter of the hole 147 may gradually increase in a direction toward the lower surface of the housing 140 from the upper surface thereof in order to allow a damper to be easily applied, but the disclosure is not limited thereto. In another embodiment, the diameter of the hole 147 may be constant. In an example, the damper may be disposed in the hole 147, and may be disposed on or coupled to at least a portion of the support member 220.

A recess 148 or a stepped portion may be formed in the lower portions of the corner portions 142-1 to 142-4 of the housing 140. The recess 148 may be recessed in the outer surfaces of the corner portions 142-1 to 142-4 of the housing 140 in order to avoid spatial interference with at least one of the second coil 230, the support member 220, or the circuit board 310.

In an example, the recess 148 may include a first surface 148-1, in which the hole 147 is formed, and a second surface 148-2, which is located between the first surface 148-1 and the lower surfaces of the corner portions 142-1 to 142-4.

In an example, the hole 147 may be formed through the upper surfaces of the corner portions 142-1 to 142-4 and the first surface 148-1.

In addition, the recess 148 may include an opening 48, which is connected to or communicates with the seating portion 141a in the housing 140, and a second surface 3D of the first magnet 130 disposed in the seating portion 141a may be exposed through the opening 48. Since the second surface 3D of the first magnet 130 is exposed, electromagnetic force between the second coil 230 and the first magnet 130 may be increased. In another embodiment, the opening 48 may be omitted, and at least a portion of the housing 140 may be disposed between the second surface 3D of the first magnet 130 and the second coil 230.

In addition, the housing 140 may include a stopper 145 formed on the upper portion, the upper end, or the upper surface thereof in order to inhibit direct collision with the inner surface of the upper plate of the cover member 300. In an example, the stopper 145 may be disposed on the upper surface of each of the corner portions 142-1 to 142-4 of the housing 140, but the disclosure is not limited thereto.

In addition, the housing 140 may further include a stopper (not shown) formed on the lower portion, the lower end, or the lower surface thereof in order to inhibit the lower surface of the housing 140 from colliding with the base 210 and/or the circuit board 250.

In addition, guide protruding portions 146 may be formed on the corners of the upper surfaces of the corner portions 142-1 to 142-4 of the housing 140 in order to inhibit the damper from overflowing.

In an example, each of the holes 147 in the housing 140 may be located between the corner (e.g. the guide protruding portion 146) of the upper surface of a corresponding one of the corner portions 142-1 to 142-4 of the housing 140 and the stopper 145.

The housing 140 may be provided on the upper portion, the upper end, or the upper surface thereof with at least one first coupling portion 143, which is coupled to the first outer frame 152 of the upper elastic member 150. In an example, the first coupling portion 143 of the housing 140 may be disposed on at least one of the side portions 141-1 to 141-4 or at least one of the corner portions 142-1 to 142-4 of the housing 140. The housing 140 may be provided on the lower portion, the lower end, or the lower surface thereof with a second coupling portion 149, which is coupled and fixed to the second outer frame 162 of the lower elastic member 160.

In an example, each of the first and second coupling portions 143 and 149 of the housing 140 may be formed as a protrusion, but the disclosure is not limited thereto. In another embodiment, each of the first and second coupling portions may be formed as a recess or a flat surface.

In an example, the first coupling portion 143 of the housing 140 may be coupled to the hole 152a in the first outer frame 152 of the upper elastic member 150 using an adhesive member (e.g. a solder) or heat fusion, and the second coupling portion 149 of the housing 140 may be coupled to the hole 162a in the second outer frame 162 of the lower elastic member 160 using an adhesive member (e.g. a solder) or heat fusion.

In order to avoid spatial interference with portions where the second outer frames 162-1 to 162-3 of the lower elastic member 160 meet second frame connection portions 163, an escape recess 44a may be formed in the lower surface of at least one of the side portions 141-1 to 141-4 of the housing 140.

Next, the first magnet 130 will be described.

The first magnet 130 may be disposed on or coupled to the housing 140.

The first magnet 130 may be disposed on at least one of the corners (or the corner portions 142-1 to 142-4) of the housing 140. In an example, the first magnet 130 may be disposed on each of the corner portions of the housing 140.

At the initial position of the AF operation unit, the first magnet 130 may be disposed in the housing 140 such that at least a portion thereof overlaps the first coil 120 in a direction parallel to a line that is perpendicular to the optical axis OA and extends through the optical axis OA.

In an example, the first magnet 130 may be inserted into or disposed in the seating portions 141a in the corner portions 142-1 to 142-4 of the housing 140. In another embodiment, the first magnet 130 may be disposed on the outer surfaces of the corner portions 142-1 to 142-4 of the housing 140.

In an example, the first magnet 130 may include a plurality of magnet units (e.g. 130-1 to 130-4) disposed on the corner portions (e.g. 142-1 to 142-4) of the housing 140. Each of the plurality of magnet units 130-1 to 130-4 may have a polyhedral shape in order to be easily seated on the corner portions of the housing 140. In an example, the plurality of magnet units 130-1 to 130-4 may have the same shape.

In another embodiment, the first magnet may be disposed on the side portions 141-1 to 141-4 of the housing 140.

In another embodiment, the first magnet may be disposed on the bobbin, the first coil may be disposed on the bobbin, and a separate magnet for OIS may be disposed in the housing 140 so as to face the second coil.

Figure 14A:
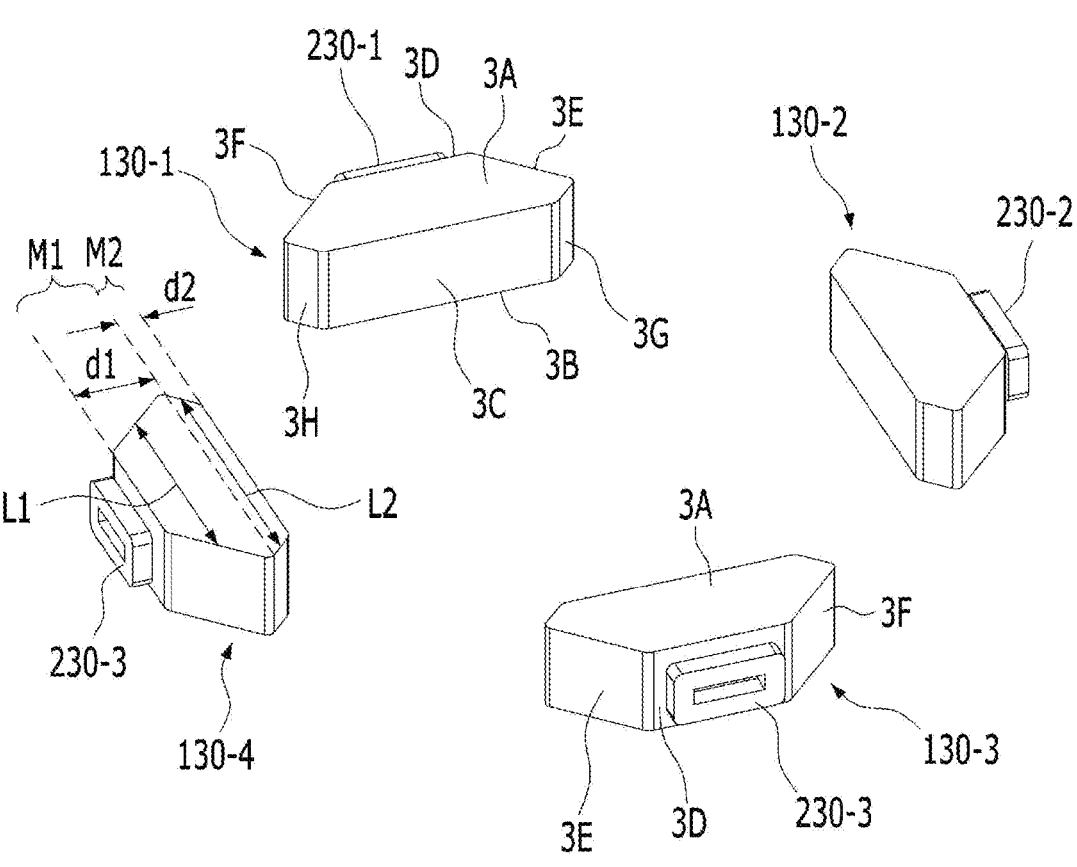
FIG. 14A is a view showing disposition of the first magnet and the second coil according to the embodiment.

FIG. 14A illustrates disposition of the first magnet 130 and the second coil 230 according to the embodiment.

Referring to FIG. 14A, the first magnet 130 may include an upper surface 3A, a lower surface 3B, which is a surface opposite the upper surface 3A, and side surfaces (e.g. 3C, 3D, 3E, 3F, 3G, and 3H) located between the upper surface 3A and the lower surface 3B. In an example, the upper surface 3A and the lower surface 3B may be parallel to each other.

The first magnet 130 may include a first surface 3C, which faces one surface of the first coil 120 (or the outer surface of the bobbin 110), and a second surface 3D, which is a surface opposite the first surface 3C. The second surface 3D may be a surface facing the second coil 230 (230-1 to 230-4). In an example, the first surface 3C and the second surface 3D may be parallel to each other.

In an example, the first magnet 130 may include a first portion M1, a length L1 of which in the transverse direction gradually decreases in a direction from the first surface 3C toward the second surface 3D, and a second portion M2, a length L2 of which in the transverse direction gradually increases in a direction from the first surface 3C toward the second surface 3D. The transverse direction may be, for example, a direction perpendicular to the optical axis and parallel to the first surface 3C. Alternatively, the transverse direction may be a direction parallel to the first surface 3C of the first magnet 130 and perpendicular to a direction from the upper surface 3A toward the lower surface 3B of the first magnet 130.

That is, the length of the first magnet 130 in the transverse direction may gradually increase and then gradually decrease in a direction from the first surface 3C toward the second surface 3D.

In an example, the second portion M2 may be closer to the first coil 120 or the bobbin 110 than the first portion M1. Alternatively, the first portion M1 may be closer to the second coil 230 than the second portion M2.

In an alternative example, the first portion M1 of the first magnet 130 may include the second surface 3D or may be contiguous with the second surface 3D. In addition, the second portion M2 of the first magnet 130 may include the first surface 3C or may be contiguous with the first surface 3C.

In an example, the first magnet 130 may include a third surface 3E connected to one side of the second surface 3D, a fourth surface 3F connected to the other side of the second surface 3D, a fifth surface 3G connecting the third surface 3E to one side of the first surface 3C, and a sixth surface 3H connecting the fourth surface 3F to the other side of the first surface 3C. In an example, the third surface 3E and the fourth surface 3F may be symmetrical with each other with respect to the first surface 3C (or the second surface 3D), and the fifth surface 3G and the sixth surface 3H may be symmetrical with each other with respect to the first surface 3C (or the second surface 3D).

In an example, the area of the first surface 3C of the first magnet 130 may be greater than the area of the second surface 3D of the first magnet 130. In an example, the length of the second surface 3D of the first magnet 130 in the transverse direction may be shorter than the length of the first surface 3C of the first magnet 130 in the transverse direction. In an example, among the first to sixth surfaces 3C to 3H, the area of the first surface 3C may be greater than the area of each of the second to sixth surfaces 3D to 3H.

The reason why the length L1 of the first portion M1 of the first magnet 130 in the transverse direction gradually decreases in a direction from the first surface 3C toward the second surface 3D is that the first magnet 130 is disposed on the corner portions 142-1 to 142-4 of the housing 140.

The reason why the length of the second portion M2 of the first magnet 130 increases is to inhibit the first magnet 130 disposed in the seating portion 141a in the housing 140 from escaping toward the interior of the housing 140.

In addition, since the length L2 of the second portion M2 in the transverse direction gradually decreases in a direction from the second surface 3D toward the first surface 3C, the influences of magnetic field interference between the first magnet 130 and the second magnet 180 and magnetic field interference between the first magnet 130 and the third magnet 185 may be reduced.

In addition, a length d2 of the second portion M2 of the first magnet 130 in a direction from the first surface 3C toward the second surface 3D may be shorter than a length d1 of the first portion M1 of the first magnet 130 in a direction from the first surface 3C toward the second surface 3D (d2<d1).

In the case of "d2>d1", the area of the first surface of the first magnet may be reduced, whereby electromagnetic force generated by interaction between the first coil 120 and the first magnet may be reduced, and electromagnetic force required for AF driving may not be secured.

Figure 14B:
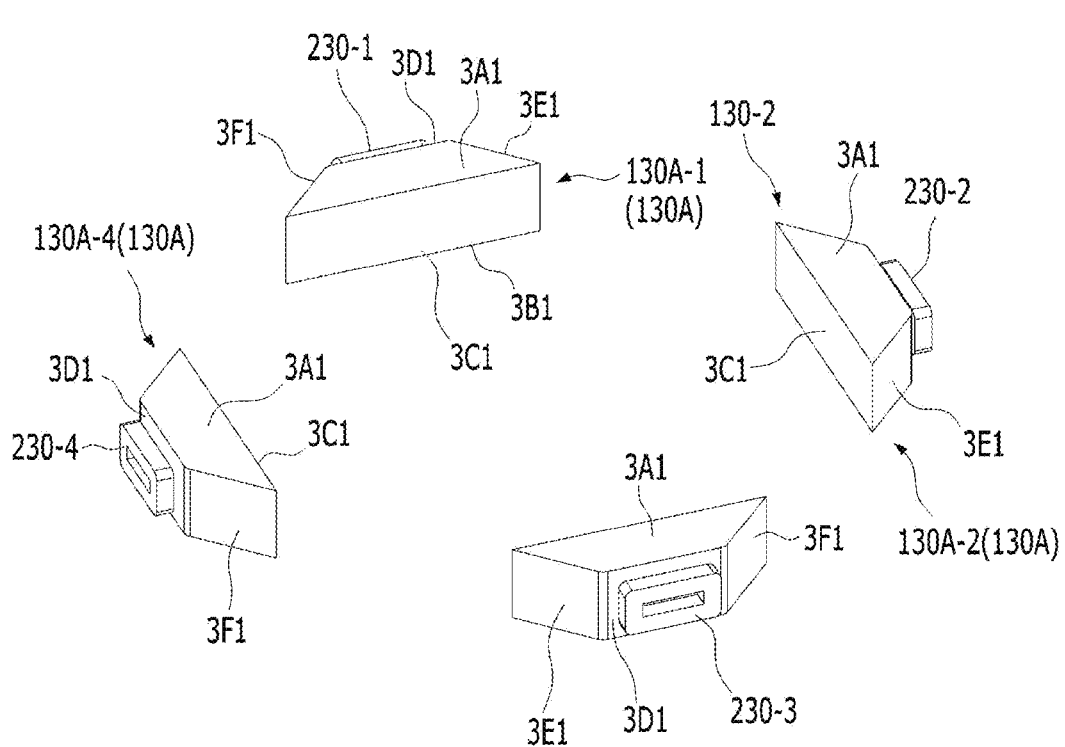
FIG. 14B is a view showing disposition of the first magnet and the second coil according to another embodiment.

FIG. 14B illustrates disposition of a first magnet 130A and the second coil 230 according to another embodiment.

Referring to FIG. 14B, the first magnet 130A may include an upper surface 3A1, a lower surface 3B1, which is a surface opposite the upper surface 3A1, and side surfaces (e.g. 3C1, 3D1, 3E1, and 3F1) located between the upper surface 3A1 and the lower surface 3B1. In an example, the upper surface 3A1 and the lower surface 3B1 may be parallel to each other.

In an example, the first magnet 130A may include a first surface 3C1, which faces one surface of the first coil 120 (or the outer surface of the bobbin 110), and a second surface 3D1, which is a surface opposite the first surface 3C. The second surface 3D1 may be a surface facing the second coil 230 (230-1 to 230-4). In an example, the first surface 3C1 and the second surface 3D1 may be parallel to each other.

In addition, the first magnet 130A may include a third surface 3E1 connecting one side of the first surface 3C1 to one side of the second surface 3D1 and a fourth surface 3F 1 connecting the other side of the first surface 3C1 to the other side of the second surface 3D1.

In an example, the area of the first surface 3C1 of the first magnet 130A may be greater than the area of the second surface 3D1 of the first magnet 130A. In an example, the length of the second surface 3D1 of the first magnet 130A in the transverse direction may be shorter than the length of the first surface 3C1 of the first magnet 130A in the transverse direction. In an example, among the first to fourth surfaces 3C1 to 3F1, the area of the first surface 3C1 may be greater than the area of each of the second to fourth surfaces 3D1 to 3F1.

In an example, the third surface 3E1 and the fourth surface 3F1 may be symmetrical with each other with respect to the first surface 3C1 (or the second surface 3D1).

In an example, the first magnet 130A may include a portion, the length of which in the transverse direction gradually decreases in a direction from the first surface 3C1 toward the second surface 3D1 of the first magnet 130A. In an example, the transverse direction of the first magnet 130A may be a direction parallel to the first surface 3C1 of the first magnet 130A. The first magnet 130A may have, for example, a trapezoidal shape when viewed from above.

The first magnet 130 or 130A may be formed as a unitary body, and may be disposed such that the first surface 3C or 3C1 of the first magnet 130 or 130A, which faces the first coil 120, is an S pole and the second surface 3D or 3D1 thereof is an N pole. However, the disclosure is not limited thereto. In another embodiment, the first surface 3C or 3C1 of the first magnet 130 or 130A may be an N pole, and the second surface 3D or 3D1 thereof may be an S pole.

At least two first magnets may be disposed on or mounted to the corner portions of the housing 140 so as to face each other.

In an example, two pairs of first magnets may be disposed on the corner portions 142-1 to 142-4 of the housing 140 such that the first magnets in each pair face each other. In an example, when viewed from above, the planar shape of the first magnet may be a polygonal shape, such as a triangular, pentagonal, hexagonal, or rhombic shape.

In another embodiment, one pair of first magnets, which face each other, may be disposed only on two of the corner portions of the housing 140, which face each other.

Each of the first to fourth magnet units 130-1 to 130-4 or 130A-1 to 130A-4 may be a monopolar-magnetized magnet, but the disclosure is not limited thereto. In another embodiment, each of the first magnets may be a bipolar-magnetized magnet or a 4-pole magnet, which includes two N poles and two S poles.

Figure 5:
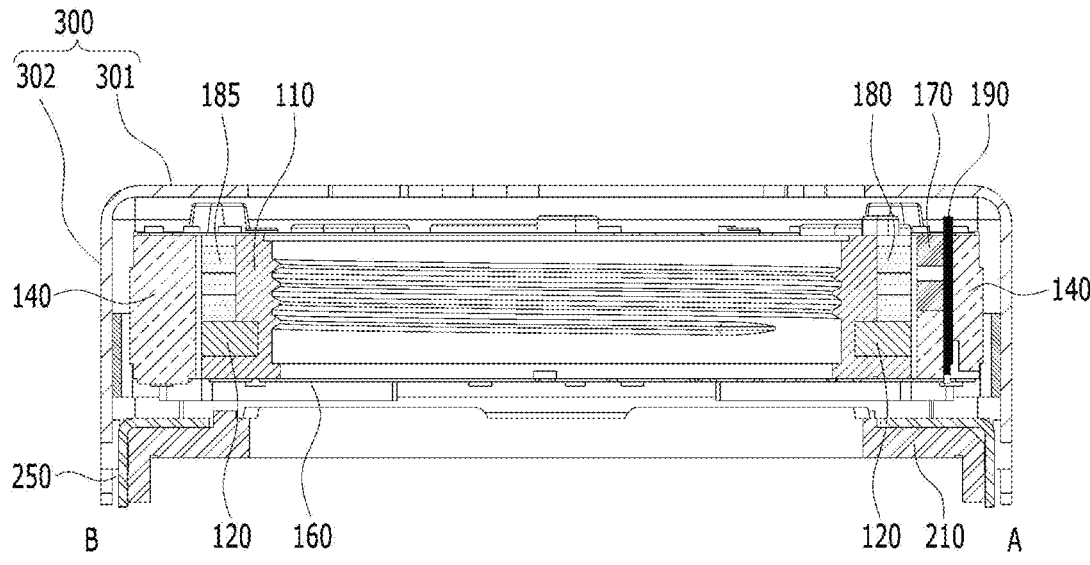
FIG. 5 is a cross-sectional view of the lens moving apparatus shown in FIG. 2 taken in the direction AB.
Figure 6:
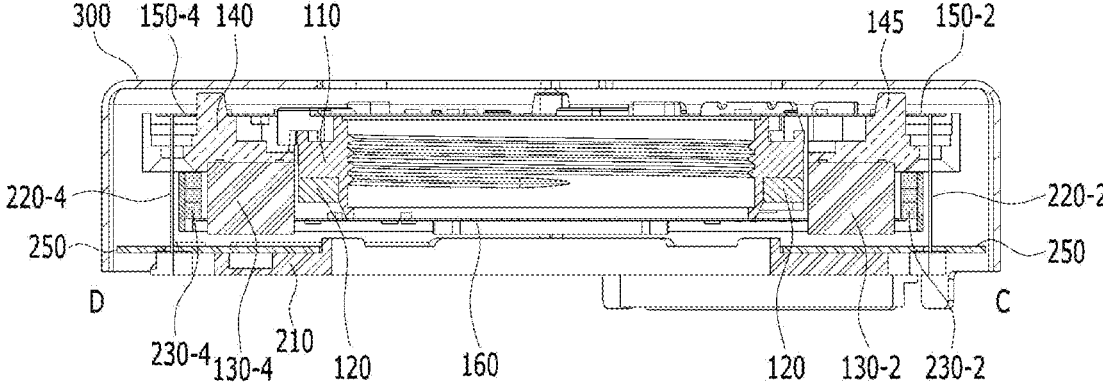
FIG. 6 is a cross-sectional view of the lens moving apparatus shown in FIG. 2 taken in the direction CD.
Figure 7:
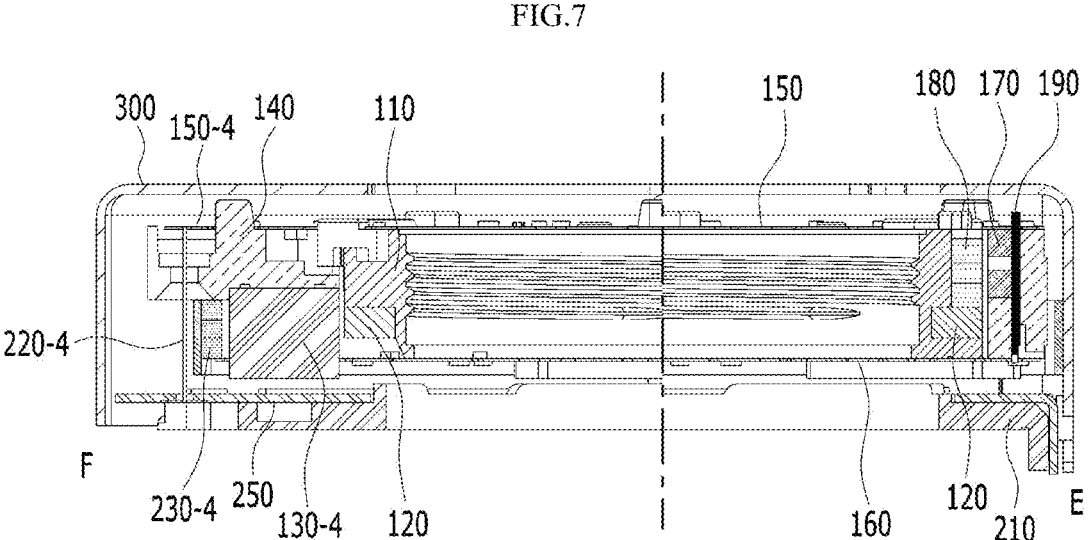
FIG. 7 is a cross-sectional view of the lens moving apparatus shown in FIG. 2 taken in the direction EF.

FIG. 5 is a cross-sectional view of the lens moving apparatus 100 shown in FIG. 2 taken in the direction AB, FIG. 6 is a cross-sectional view of the lens moving apparatus 100 shown in FIG. 2 taken in the direction CD, and FIG. 7 is a cross-sectional view of the lens moving apparatus 100 shown in FIG. 2 taken in the direction EF.

Referring to FIGS. 5 to 7, each of the second and third magnets 180 and 185 may not overlap the first coil 120 in a direction perpendicular to the optical axis OA (or in a direction parallel to a line that is perpendicular to the optical axis and extends through the optical axis), but the disclosure is not limited thereto. In another embodiment, at least a portion of each of the second and third magnets 180 and 185 may overlap the first coil 120 in a direction perpendicular to the optical axis OA (or in a direction parallel to a line that is perpendicular to the optical axis and extends through the optical axis).

At the initial position of the AF operation unit, the first magnet 130 and the first coil 120 may overlap each other in a direction perpendicular to the optical axis OA or in a direction parallel to a line that is perpendicular to the optical axis and extends through the optical axis.

In addition, at the initial position of the AF operation unit, the second magnet 180 may overlap or be aligned with the third magnet 185 in a direction perpendicular to the optical axis OA or in a direction parallel to a line that is perpendicular to the optical axis and extends through the optical axis, but the disclosure is not limited thereto.

In addition, at the initial position of the AF operation unit, the first position sensor 170 may overlap at least one of the second magnet 180 or the second magnet 185 in a direction perpendicular to the optical axis OA or in a direction parallel to a line that is perpendicular to the optical axis and extends through the optical axis.

In another embodiment, the first position sensor 170 may not overlap at least one of the second magnet 180 or the second magnet 185 in a direction perpendicular to the optical axis OA or in a direction parallel to a line that is perpendicular to the optical axis and extends through the optical axis.

Next, the circuit board 190 and the first position sensor 170 will be described.

The circuit board 190 may be disposed on one side portion 141-1 of the housing 140, and the first position sensor 170 may be disposed or mounted on the circuit board 190. In an example, the circuit board 190 may be disposed in the mounting recess 14a in the housing 140.

In an example, the circuit board 190 may be disposed between the first corner portion 142-1 and the second corner portion 142-2 of the housing 140, and first to fourth terminals B1 to B4 of the circuit board 190 may be conductively connected to the first position sensor 170.

In an example, the circuit board 190 may not overlap an imaginary line that connects the corner portion (e.g. the first corner portion 142-1) (or the corner) of the housing 140 to the optical axis OA. This serves to inhibit spatial interference between the support member 220 and the circuit board 190.

In an example, the first position sensor 170 may be implemented as a Hall sensor alone or a driver including a Hall sensor.

When the first position sensor 170 is implemented as a Hall sensor alone, the first position sensor 170 may include two input terminals and two output terminals. A drive signal or a power signal may be supplied to the two input terminals, and an output signal of the first position sensor 170 may be output to the two output terminals. In addition, the two input terminals and the two output terminals of the first position sensor 170 may be conductively connected to a corresponding one of the first to fourth upper elastic units 150-1 to 150-4.

When the first position sensor 170 is implemented as a driver, the first position sensor 170 may include two terminals configured to receive power signals, two terminals configured to transmit and receive a clock signal and a data signal, and two terminals configured to supply a drive signal to the first coil 120.

Figure 8A:
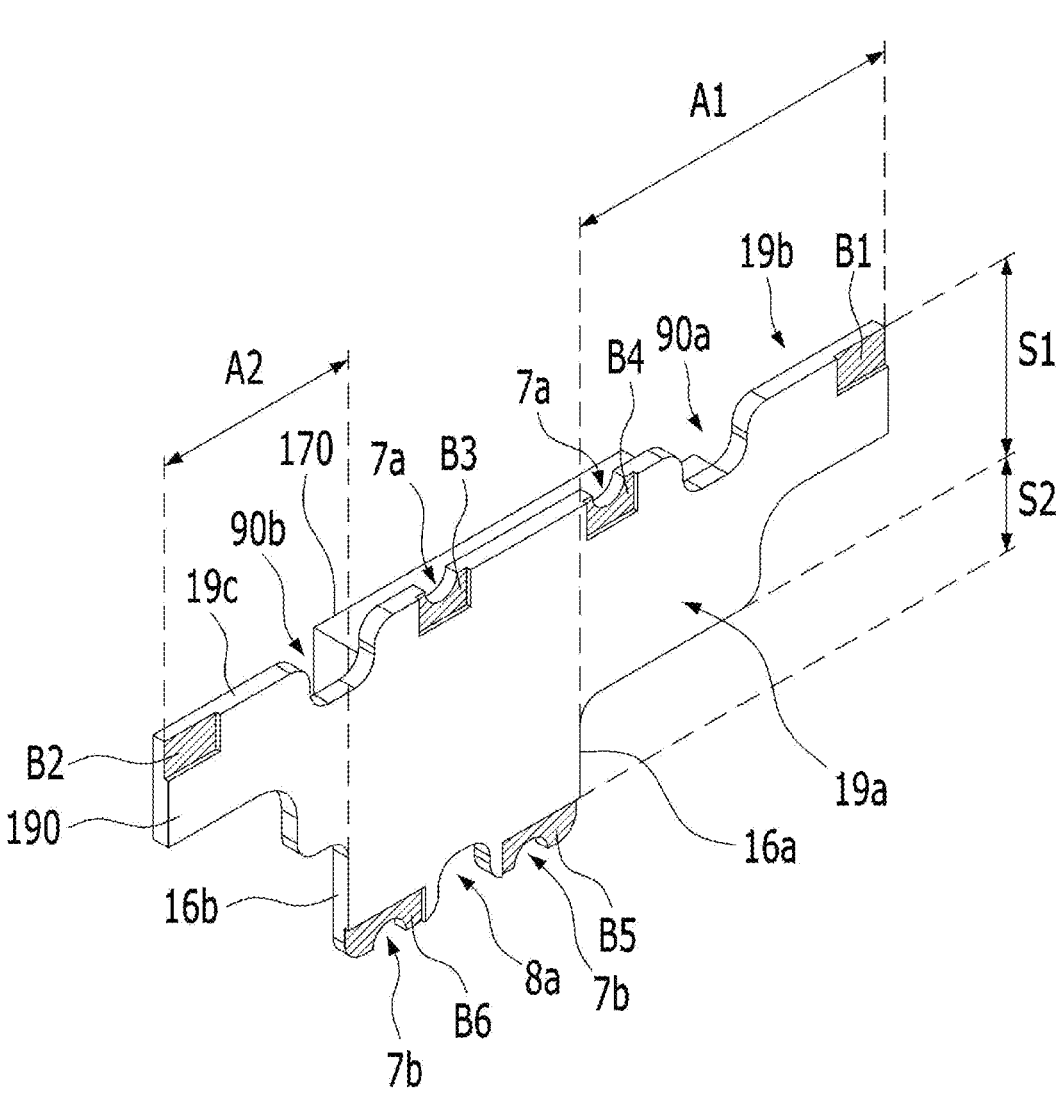
FIG. 8A is an enlarged view of the circuit board and the first position sensor.
Figure 8B:
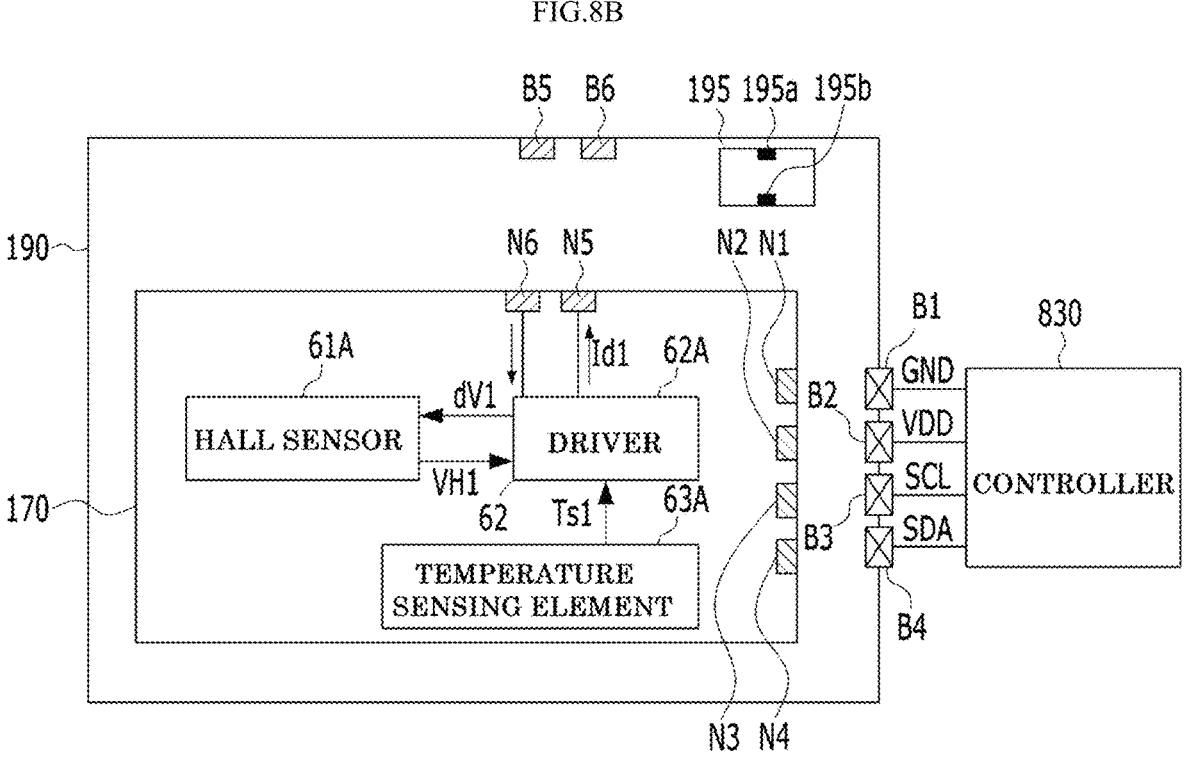
FIG. 8B is a diagram showing the configuration of an embodiment of the first position sensor shown in FIG. 8A.

FIG. 8A is an enlarged view of the circuit board 190 and the first position sensor 170, and FIG. 8B is a diagram showing the configuration of an embodiment of the first position sensor 170 shown in FIG. 8A.

Referring to FIGS. 8A and 8B, the circuit board 190 may include terminals B1 to B6, which are conductively connected to external terminals or external devices.

The first position sensor 170 may be disposed on a first surface 19b of the circuit board 190, and the terminals B1 to B6 may be disposed on a second surface 19a of the circuit board 190.

Here, the second surface 19a of the circuit board 190 may be a surface opposite the first surface 19b of the circuit board 190. In an example, the second surface 19a of the circuit board 190 may be the surface of the circuit board 190 that faces the bobbin 110.

The circuit board 190 may include a body portion S1 and an extension portion S2, which is located under the body portion S1. The body portion S1 may alternatively be referred to as an "upper end portion", and the extension portion S2 may alternatively be referred to as a "lower end portion".

The extension portion S2 may extend downwards from the body portion S1.

The body portion S1 may be formed so as to protrude from side surfaces 16a and 16b of the extension portion S2. In an example, the side surfaces 16a and 16b of the extension portion S2 may be surfaces connecting the first surface 19b of the extension portion S2 to the second surface 19a of the extension portion S2.

The body portion S1 may include a first extension region A1, which extends in a direction toward the first corner portion 142-1 of the housing 140, and a second extension region A2, which extends in a direction toward the second corner portion 142-2 of the housing 140. In an example, the first extension region A1 may extend or protrude from the first side surface 16a of the extension portion S2, and the second extension region A2 may extend or protrude from the second side surface 16b of the extension portion S2.

In an example, the length of the first extension region A1 in the transverse direction is illustrated in FIG. 8A as being longer than the length of the second extension region A2 in the transverse direction, but the disclosure is not limited thereto. In another embodiment, the length of the first extension region A1 in the transverse direction may be equal to or shorter than the length of the second extension region A2 in the transverse direction.

In an example, the length of the body portion S1 of the circuit board 190 in the transverse direction may be longer than the length of the extension portion S2 in the transverse direction.

In an example, the first to fourth terminals B1 to B4 of the circuit board 190 may be disposed on the second surface 19a of the body portion S1 so as to be spaced apart from each other. In an example, the four terminals B1 to B4 may be disposed in a line in the transverse direction of the circuit board 190.

The first to fourth terminals B1 to B4 may be disposed closer to the upper surface 19c than to the lower surface of the circuit board 190. In an example, the first to fourth terminals B1 to B4 may be formed so as to be contiguous with the second surface 19a of the circuit board 190 and the upper surface 19c of the body portion S1 of the circuit board 190, which is contiguous with the second surface 19a.

In addition, in an example, at least one of the first to fourth terminals B1 to B4 may include a recess 7a or a via formed in the upper surface 19c of the circuit board 190. The recess 7a functions to increase a contact area between a solder and the terminals B3 and B4, thereby increasing adhesive force and improving soldering efficiency.

The fifth terminal B5 and the sixth terminal B6 of the circuit board 190 may be disposed on the second surface 19a of the extension portion S2 of the circuit board 190 so as to be spaced apart from each other.

The circuit board 190 may have a recess 8a or a hole formed between the fifth terminal B5 and the sixth terminal B6. The recess 8a may be recessed in the lower surface of the circuit board 190, and may be open both to the first surface 19b and to the second surface 19a of the circuit board 190.

When soldering for conductive connection to an external device is performed, the recess 8a inhibits a solder from being applied to a portion between the fifth terminal B5 and the sixth terminal B6, thereby inhibiting electrical short circuit between the fifth terminal B5 and the sixth terminal B6.

In addition, in an example, at least one of the fifth or sixth terminal B5 or B6 may include a recess 7b or a via, which is formed in the lower surface of the circuit board 190. The recess 7b functions to increase a contact area between a solder and the fifth and sixth terminals B5 and B6, thereby increasing adhesive force and improving soldering efficiency.

The circuit board 190 may include a recess 90a formed between the second terminal B2 and the third terminal B3 and a recess 90b formed between the first terminal B1 and the fourth terminal B4. Here, each of the recesses 90a and 90b may alternatively be referred to as an "escape recess".

Each of the first recess 90a and the second recess 90b may be recessed in the upper surface 19c of the circuit board 190, and may be open both to the first surface 19b and to the second surface 19a of the circuit board 190.

The first recess 90a in the circuit board 190 may be formed in order to avoid spatial interference with a first outer frame 152 of a third upper elastic unit 150-3, and the second recess 90b in the circuit board 190 may be formed in order to avoid spatial interference with a first outer frame 152 of a fourth upper elastic unit 150-4.

The circuit board 190 may be, for example, a printed circuit board or an FPCB.

The circuit board 190 may include a circuit pattern or a line (not shown) for conductive connection between the first to sixth terminals B1 to B6 and the first position sensor 170.

The first position sensor 170 may detect the magnetic field or the intensity of the magnetic field of the second magnet 180, which is mounted on the bobbin 110, during movement of the bobbin 110, and may output an output signal corresponding to a result of the detection.

The first position sensor 170 may be disposed in or coupled to the housing 140.

In an example, the first position sensor 170 may be mounted on the circuit board 190 disposed in the housing 140, and may be fixed to the housing 140. In an example, the first position sensor 170 may be disposed in the mounting recess 14b in the housing 190, and may be moved together with the housing 140 during hand-tremor compensation.

The first position sensor 170 may be disposed on the first surface 19b of the circuit board 190. In another embodiment, the first position sensor 170 may be disposed on the second surface 19a of the circuit board 190.

The first position sensor 170 may include a Hall sensor 61A and a driver 62A.

In an example, the Hall sensor 61A may be made of a silicon-based material, and an output VH1 of the Hall sensor 61A may increase as ambient temperature increases. In an example, the ambient temperature may be the temperature of the lens moving apparatus, for example, the temperature of the circuit board 190, the temperature of the Hall sensor 61A, or the temperature of the driver 62A.

In another embodiment, the Hall sensor 61A may be made of GaAs, and the output VH1 of the Hall sensor 61A may decrease as the ambient temperature increases. In another embodiment, the output of the Hall sensor 61A may have a slope of about $-0.06\%/°$ C. with respect to the ambient temperature.

The first position sensor 170 may further include a temperature-sensing element 63A capable of detecting the ambient temperature. The temperature-sensing element 63A may output a temperature detection signal Ts1 corresponding to a result of detection of the ambient temperature of the first position sensor 170A to the driver 62A.

In an example, the Hall sensor 61A of the first position sensor 190 may generate an output VH1 corresponding to a result of detection of the intensity of the magnetic force of the second magnet 180. In an example, the intensity of the output of the first position sensor 190 may be proportional to the intensity of the magnetic force of the second magnet 180.

The driver 62A may output a drive signal dV1 for driving of the Hall sensor 61A and a drive signal Id1 for driving of the first coil 120.

In an example, the driver 62A may receive a clock signal SCL, a data signal SDA, and power signals VDD and GND from the controller 830 or 780 through data communication using a protocol, such as I2C communication.

Here, the first power signal GND may be a ground voltage or 0 V, and the second power signal VDD may be a predetermined voltage for driving of the driver 62, and may be a DC voltage and/or an AC voltage. However, the disclosure is not limited thereto.

In addition, the driver 62A may receive the output VH1 of the Hall sensor 61A, and may transmit the clock signal SCL and the data signal SDA pertaining to the output VH1 of the Hall sensor 61A to the controller 830 or 780 through data communication using a protocol, such as I2C communication.

In addition, the driver 62A may receive the temperature detection signal Ts1 as a result of detection by the temperature-sensing element 63A, and may transmit the temperature detection signal Ts1 to the controller 830 or 780 through data communication using a protocol, such as I2C communication.

In an example, the driver 62A may further include an amplifier, which receives the output VH1 of the Hall sensor 61A and amplifies and outputs the received output VH1 of the Hall sensor 61A in response to a control signal. For example, the amplifier may be a variable gain amplifier, in which a gain is variable in response to the control signal.

In addition, in an example, the driver 62A may further include an analog-to-digital converter, which performs analog-to-digital conversion for the output of the amplifier and outputs the converted digital signal. The driver 62A may further include an interface unit capable of performing data communication using an external host and a protocol, such as I2C communication, and capable of transmitting and receiving a clock signal SCL and a data signal SDA.

In an example, the driver 62A may further include a memory, e.g. an EEPROM, in which an initial register setting value of the first position sensor 170 for displacement of the operation unit (e.g. the bobbin 110) and a calculated value are stored. The driver 62A may further include a logic controller configured to generate a control signal to control the gain of the amplifier. The driver 62A may further include a proportional-integral-derivative (PID) controller configured to perform phase compensation and/or gain compensation for the output of the analog-to-digital converter. In addition, the logic controller may control the phase compensation and/or the gain compensation of the PID controller. In addition, the driver 62A may further include a drive signal generator configured to generate a drive signal Id1 based on the output of the PID controller.

The controller 830 or 780 may perform temperature compensation for the output VH1 of the Hall sensor 61A based on variation in the ambient temperature detected by the temperature-sensing element 63A of the first position sensor 170.

The first position sensor 170 may include first to fourth terminals N1 to N4 for the power signals VDD and GND, the clock signal SCL, and the data signal SDA, and fifth and sixth terminals N5 and N6 to provide the drive signal Id1 to the first coil 120.

Each of the first to fourth terminals N1 to N4 of the first position sensor 170 may be conductively connected to a corresponding one of the first to fourth terminals B1 to B4 of the circuit board 190, and each of the fifth and sixth terminals N5 and N6 of the first position sensor 170 may be conductively connected to a corresponding one of the fifth and sixth terminals B5 and B6 of the circuit board 190.

Each of the first to sixth terminals B1 to B6 of the circuit board 190 may be conductively connected to a corresponding one of terminals 21-1 to 21-$n$ of the circuit board 250 via the upper elastic member 150 (and/or the lower elastic member 160) and the support member 220.

In an example, the first to fourth terminals B1 to B4 of the circuit board 190 may be conductively connected to the upper elastic units 150-1 to 150-4 and the support members 220-1 to 220-4, whereby each of the first to fourth terminals B1 to B4 of the first position sensor 170 may be conductively connected to a corresponding one of the terminals 21-1 to 21-$n$ (e.g. n=4) of the circuit board 250.

In addition, in an example, the fifth and sixth terminals B5 and B6 of the circuit board 190 may be conductively connected to the lower elastic units 160-1 and 160-2, and the fifth and sixth terminals B5 and B6 of the first position sensor 170 may be conductively connected to the first coil 120 via the lower elastic units 160-1 and 160-2.

In an example, the fifth terminal B5 of the circuit board 190 may be coupled to the first lower elastic unit 160-1, and the sixth terminal B6 of the circuit board 190 may be coupled to the second lower elastic unit 160-2.

In another embodiment, the first position sensor may be disposed on the bobbin 110, and the second magnet may be disposed in the housing. In addition, the third magnet may be disposed in the housing 140 so as to correspond to the second magnet. In this case, the circuit board may be disposed on the bobbin and may be conductively connected to the first position sensor. Alternatively, a conductive part, a line, or a conductive pattern for conductive connection to the first position sensor may be directly formed on the outer circumferential surface of the bobbin.

Next, the upper elastic member 150, the lower elastic member 160, and the support member 220 will be described. The upper elastic member 150 and the lower elastic member 160 may constitute an elastic member supporting the bobbin.

Figure 9A:
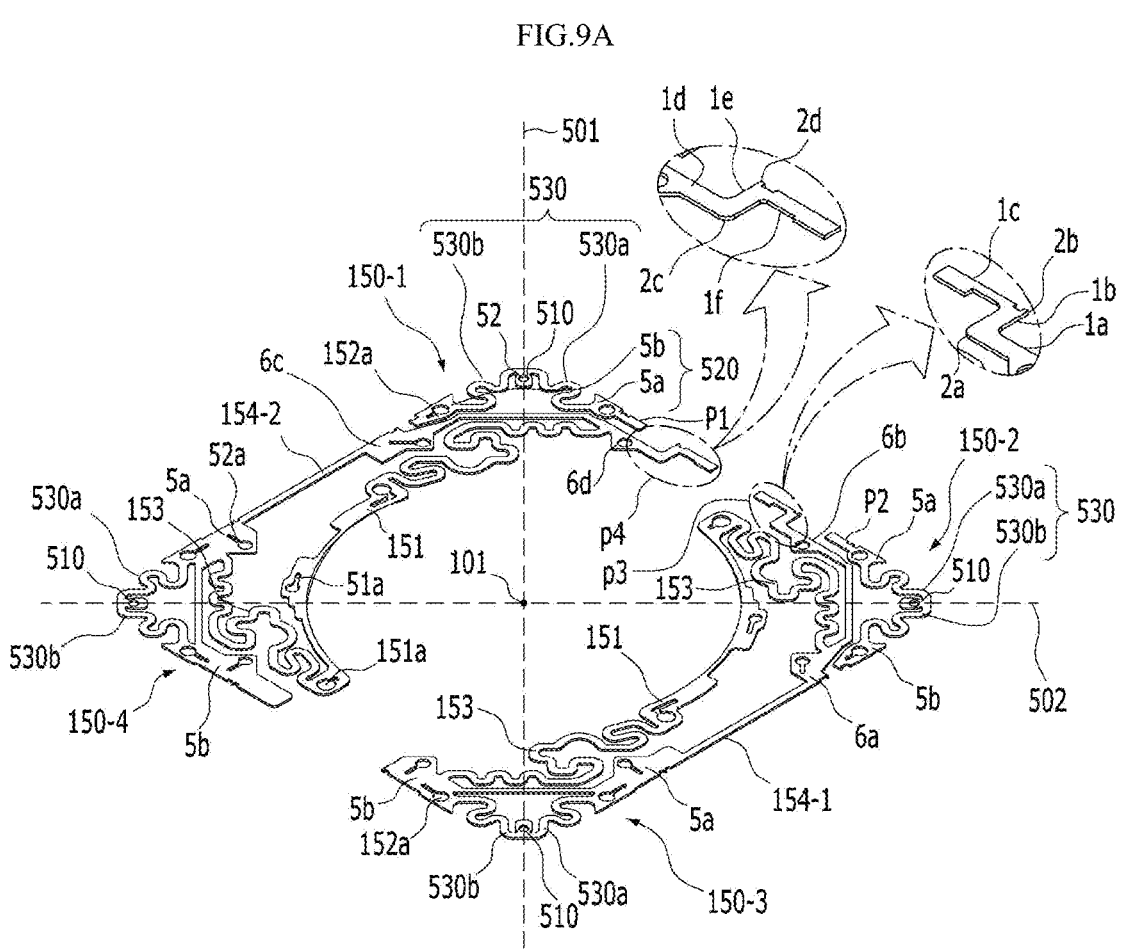
FIG. 9A is a view showing the upper elastic member shown in FIG. 1.
Figure 9B:
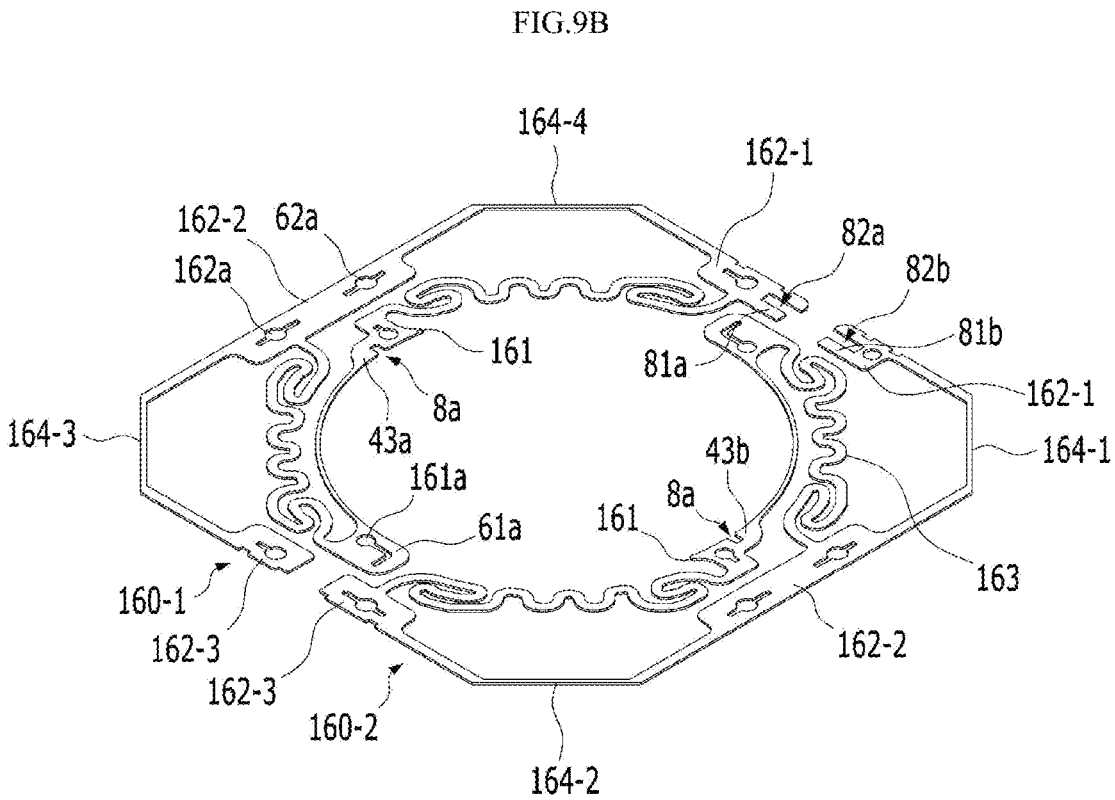
FIG. 9B is a view showing the lower elastic member shown in FIG. 1.
Figure 10:
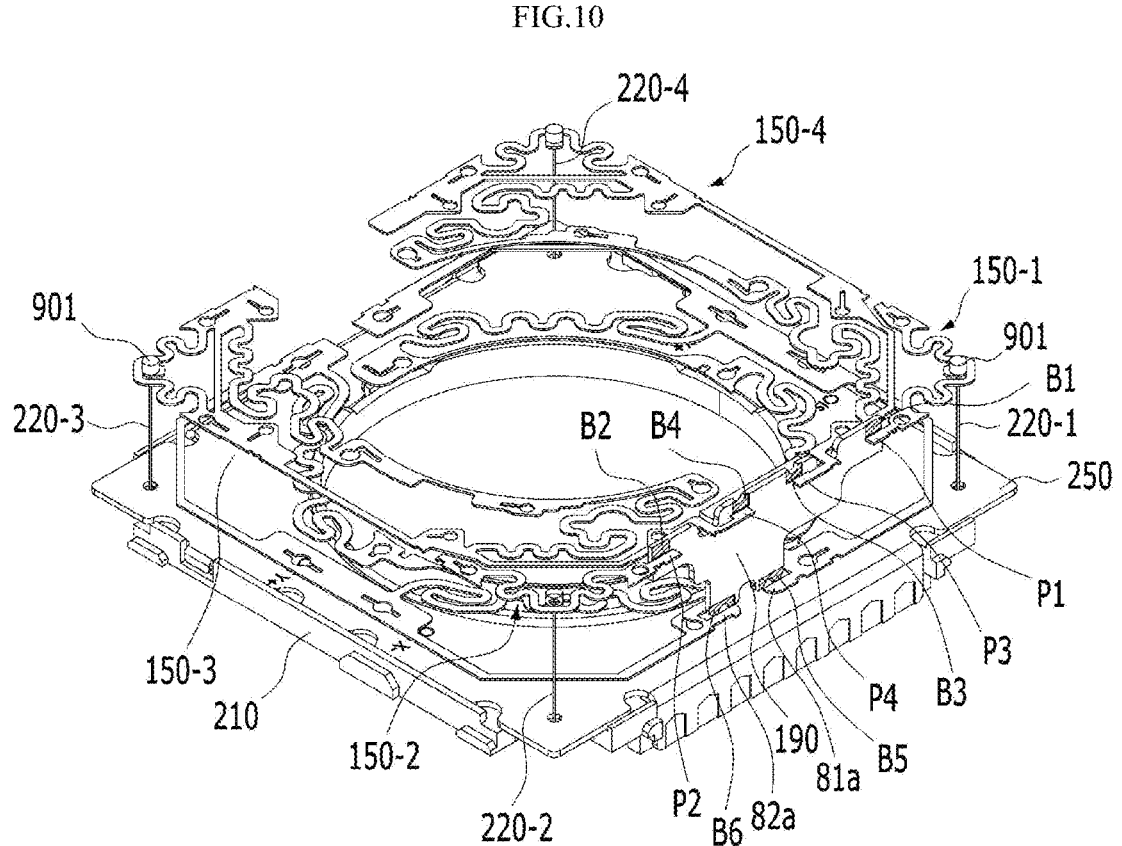
FIG. 10 is an assembled perspective view of the upper elastic member, the lower elastic member, a base, a support member, the circuit board, and a second position sensor.
Figure 11A:
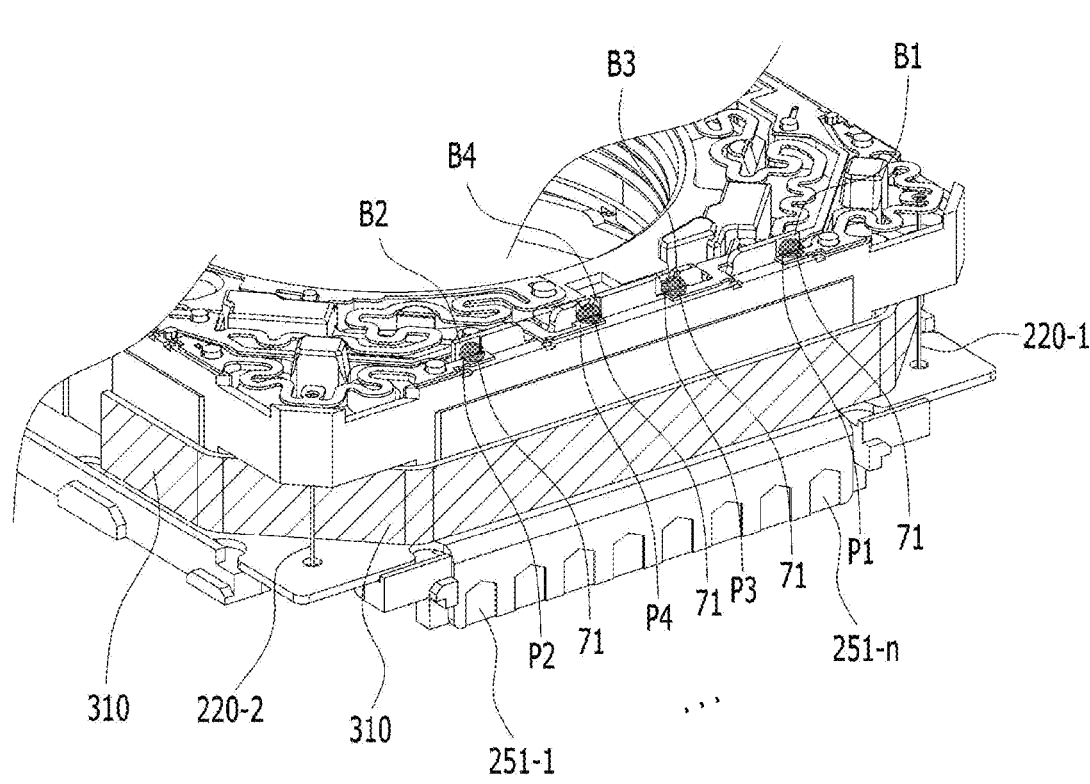
FIG. 11A is a view showing coupling between first to fourth terminals of the circuit board and upper elastic units.
Figure 11B:
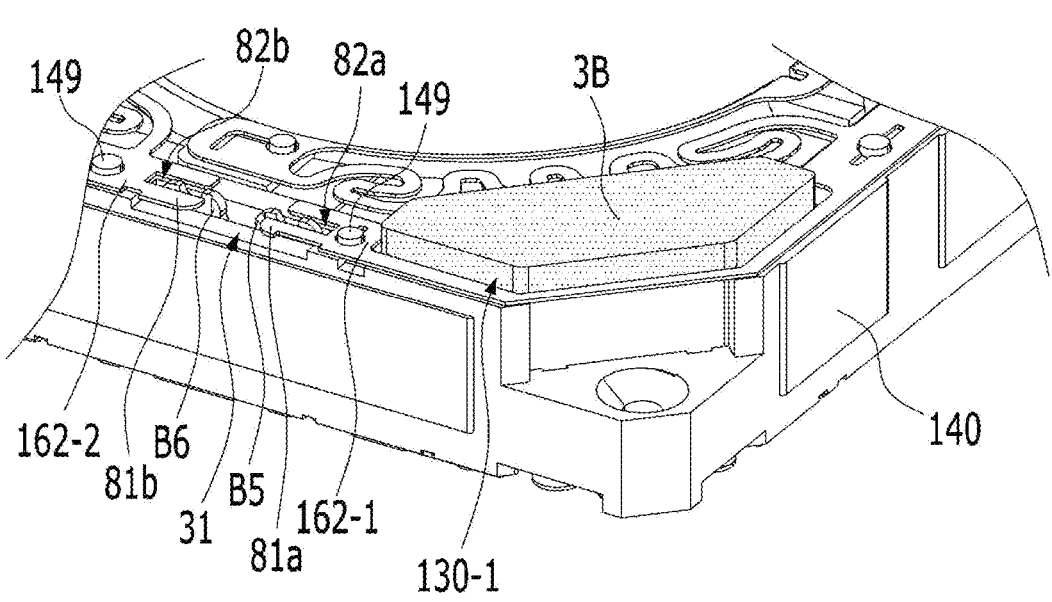
FIG. 11B is a bottom view of fifth and sixth terminals of the circuit board and lower elastic units.
Figure 12:
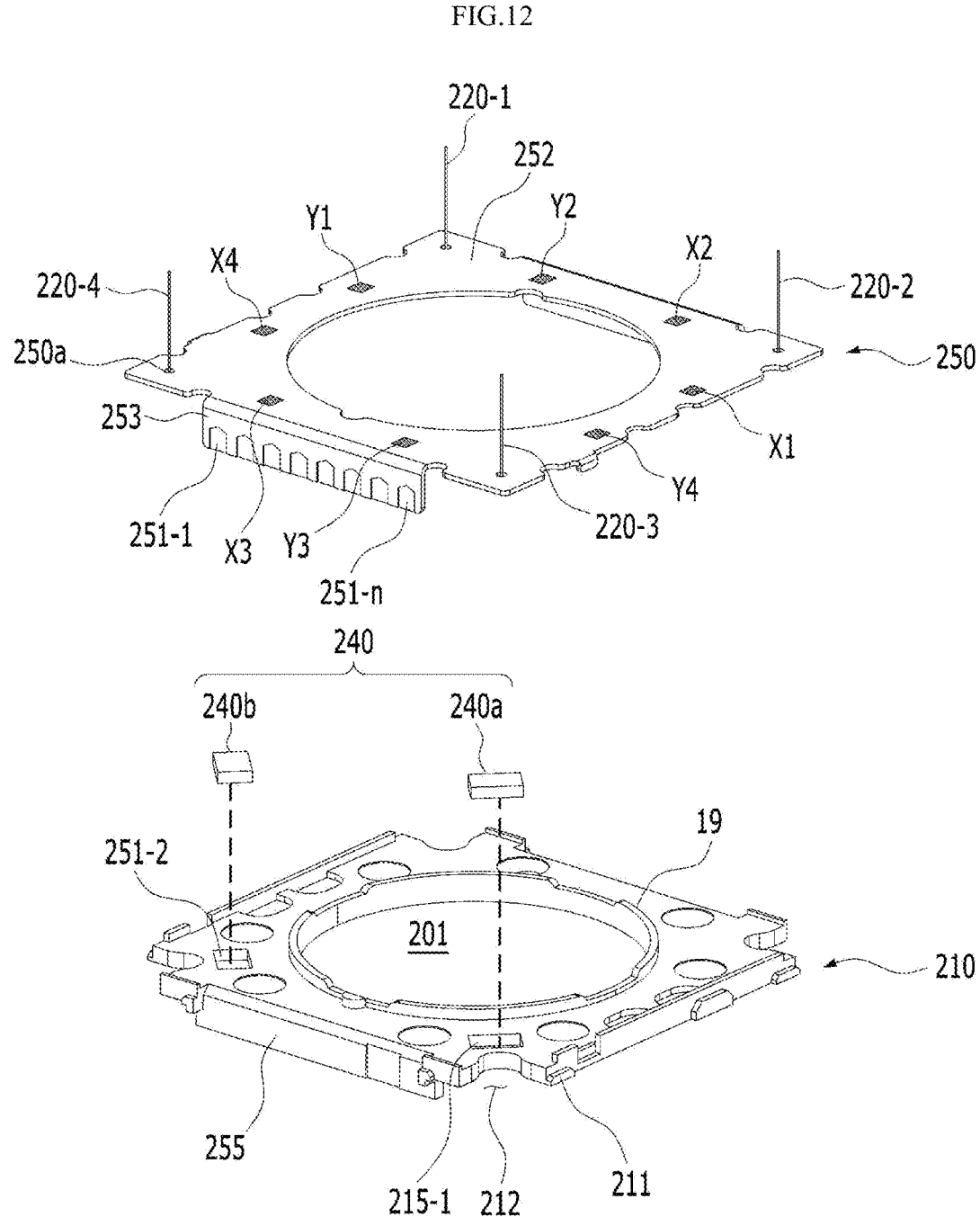
FIG. 12 is an exploded perspective view of the base, the circuit board, the support member, and the second position sensor.
Figure 13:
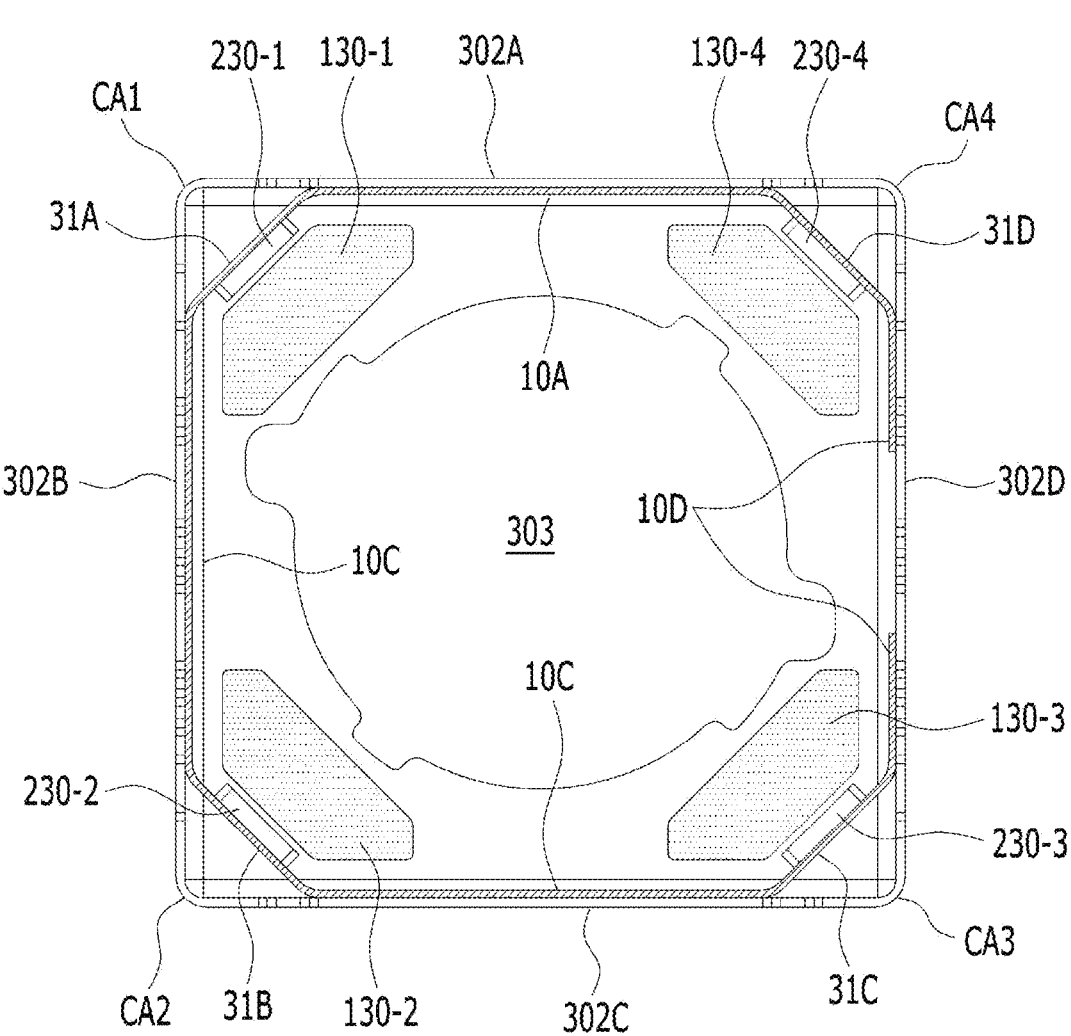
FIG. 13 is a bottom view of the first magnet, a second coil, the circuit board, and the cover member.
Figure 15:
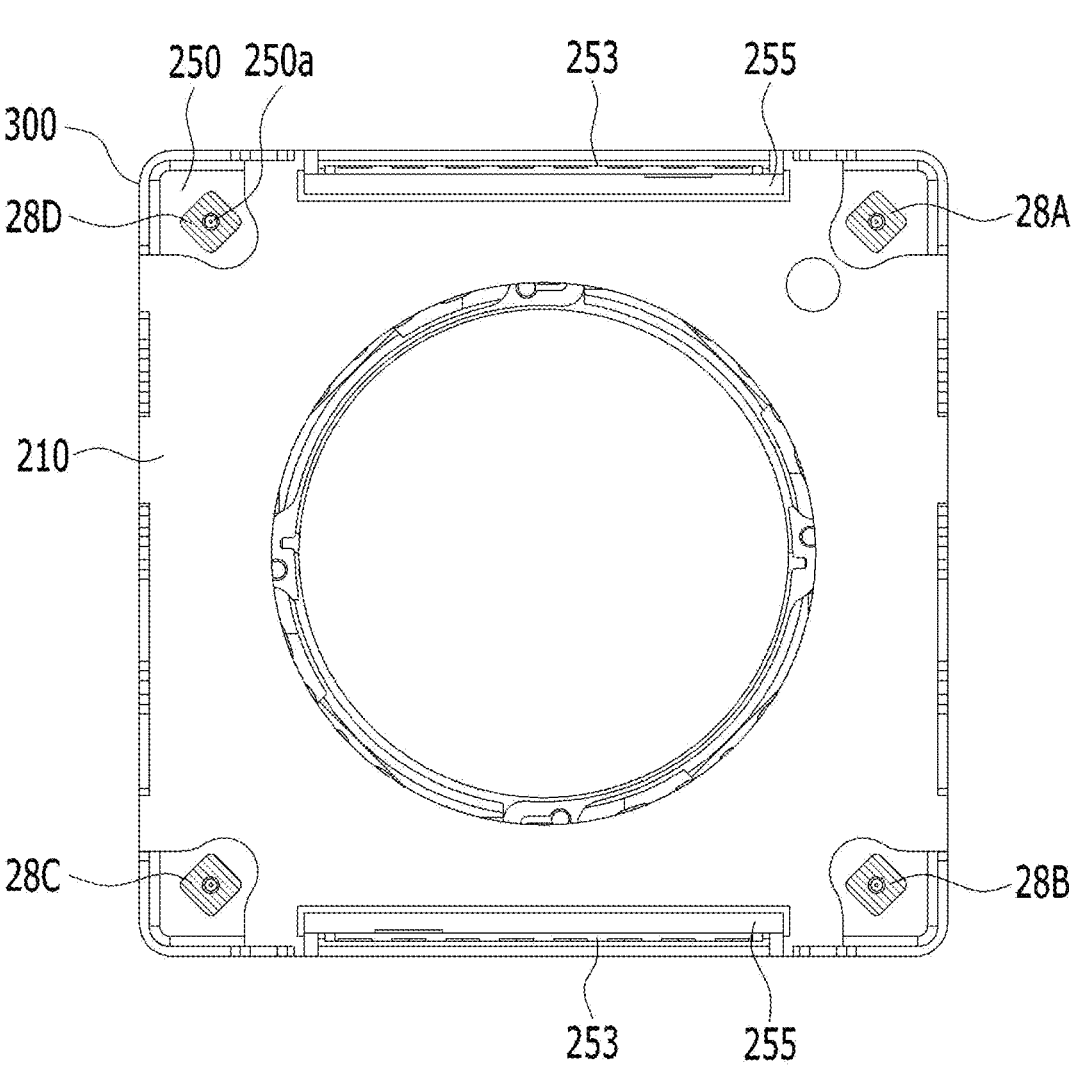
FIG. 15 is a bottom view of the lens moving apparatus.
Figure 16:
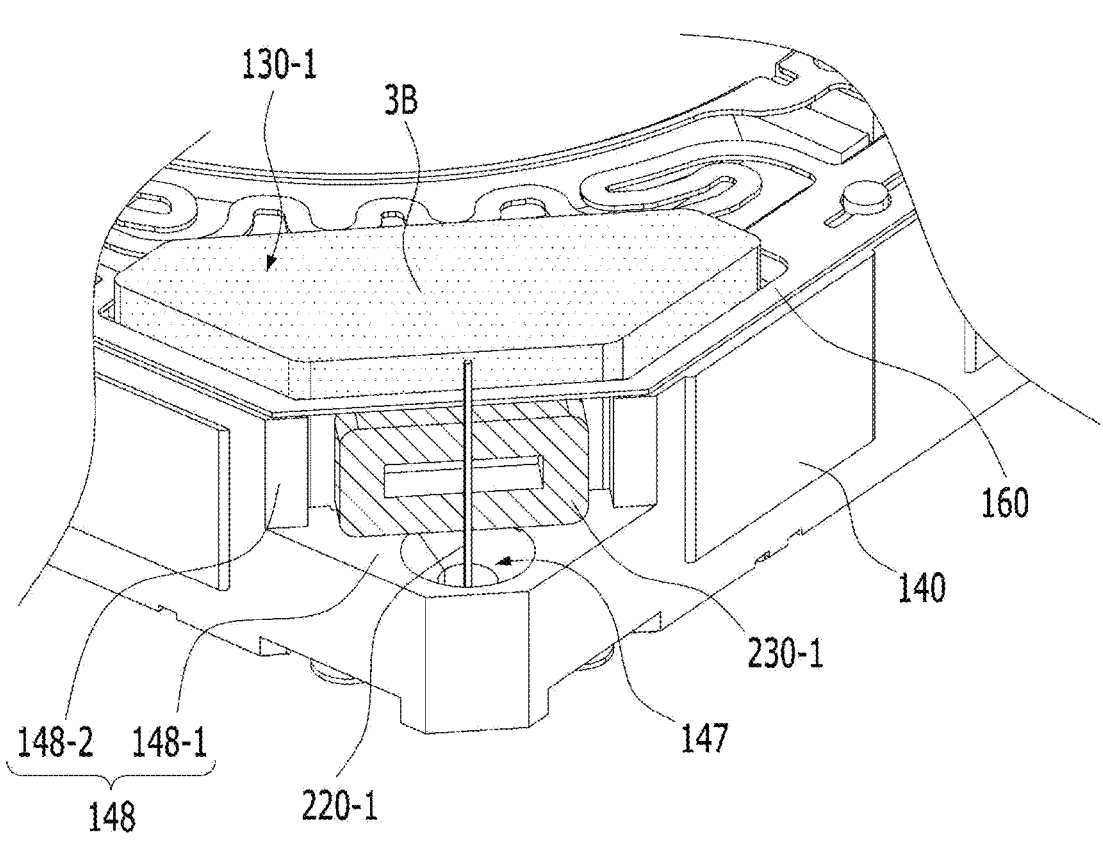
FIG. 16 is a bottom view of a first magnet unit disposed on one corner portion of the housing, a second coil unit corresponding to the first magnet unit, and a first support member.
Figure 17A:
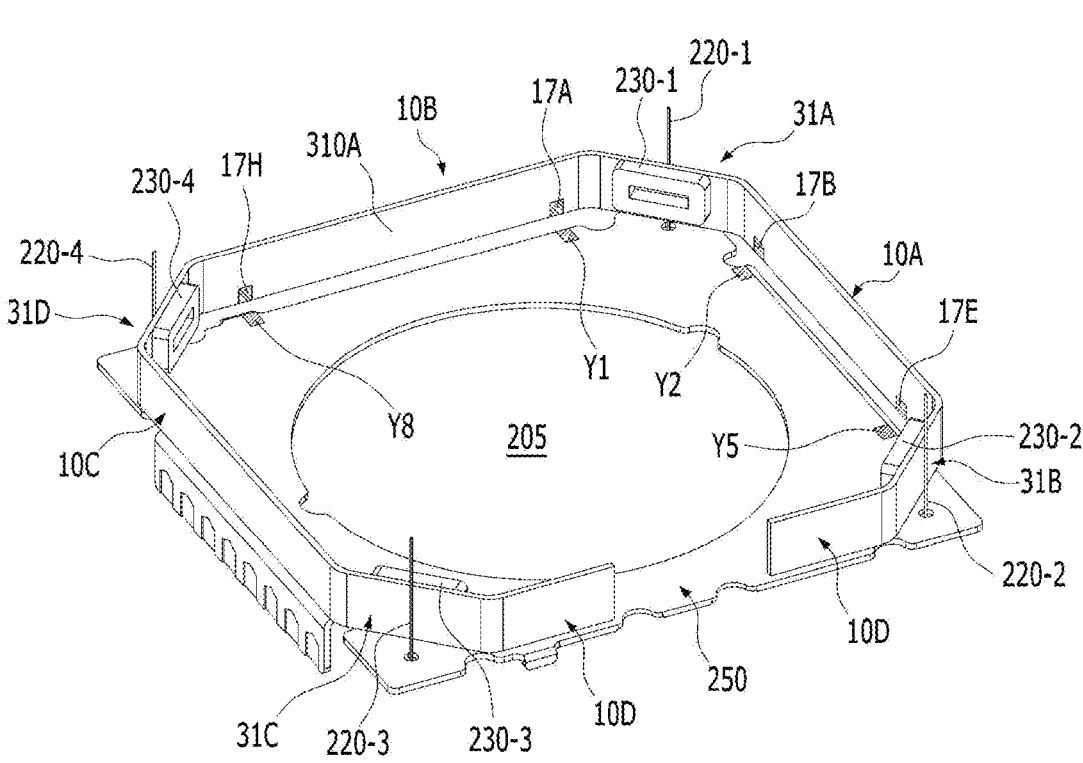
FIG. 17A is a first perspective view of a first circuit board, second coil units, the support member, and a second circuit board.
Figure 17B:
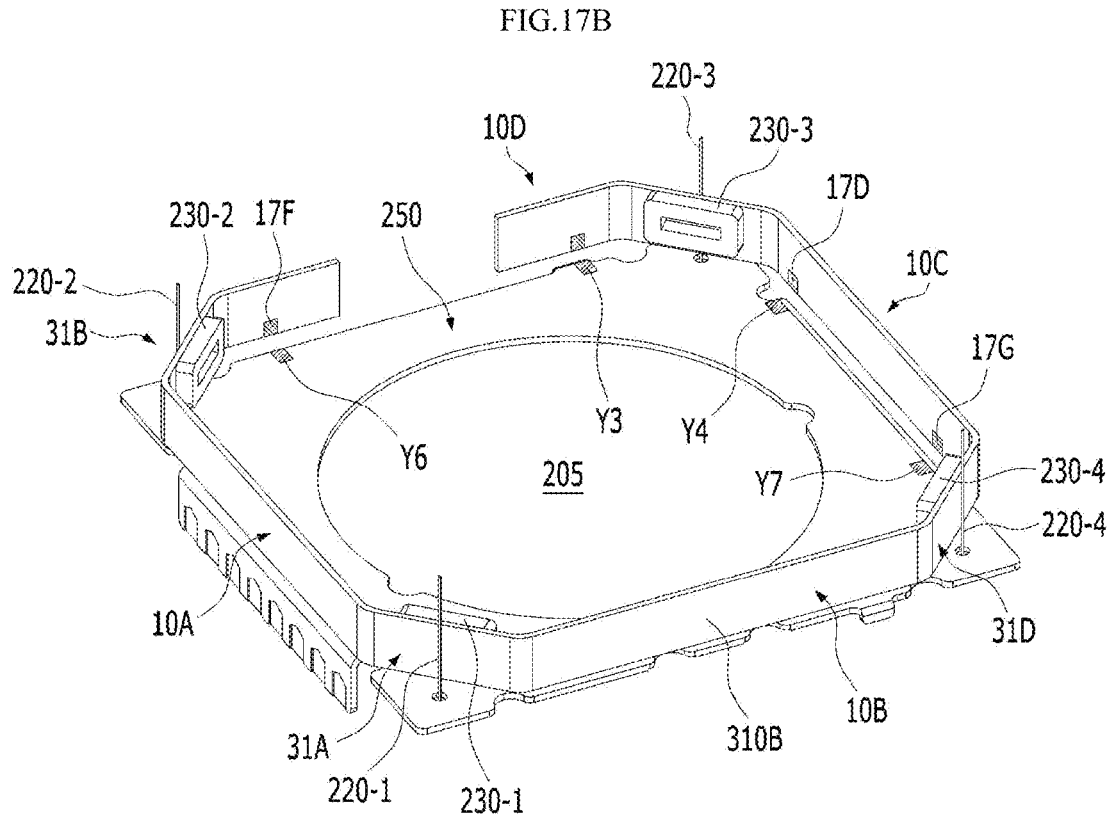
FIG. 17B is a second perspective view of the first circuit board, the second coil units, the support member, and the second circuit board.

FIG. 9A is a view showing the upper elastic member 150 shown in FIG. 1, FIG. 9B is a view showing the lower elastic member 160 shown in FIG. 1, FIG. 10 is an assembled perspective view of the upper elastic member 150, the lower elastic member 160, the base 210, the support member 220, the circuit board 250, and the second position sensor 240, FIG. 11A is a view showing coupling between the first to fourth terminals B1 to B4 of the circuit board 190 and the upper elastic units 150-1 to 150-4, FIG. 11B is a bottom view of the fifth and sixth terminals B5 and B6 of the circuit board 190 and the lower elastic units 160-1 and 160-2, FIG. 12 is an exploded perspective view of the base 210, the circuit board 250, the support members 220-1 to 220-4, and the second position sensor 240, FIG. 13 is a bottom view of the first magnet 130, the second coil 230, the circuit board 310, and the cover member 300, FIG. 14A is a view showing disposition of the first magnet 130 and the second coil 230 according to the embodiment, FIG. 14B is a view showing disposition of the first magnet 130A and the second coil 230 according to another embodiment, FIG. 15 is a bottom view of the lens moving apparatus 100, FIG. 16 is a bottom view of the first magnet unit 130-1 disposed on one corner portion of the housing 140, the second coil unit 230-1 corresponding to the first magnet unit 130-1, and the first support member 220-1, FIG. 17A is a first perspective view of the circuit board 310, the second coil units 230-1 to 230-4, the support member 220, and the circuit board 250, and FIG. 17B is a second perspective view of the circuit board 310, the second coil units 230-1 to 230-4, the support member 220, and the circuit board 250.

Referring to FIGS. 9A to 17B, the upper elastic member 150 may be coupled to the upper portion, the upper end, or the upper surface of the bobbin 110, and the lower elastic member 160 may be coupled to the lower portion, the lower end, or the lower surface of the bobbin 110.

In an example, the upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

The support member 220 may support the housing 140 so as to allow the housing 140 to be moved relative to the base 210 in a direction perpendicular to the optical axis, and may conductively connect the upper elastic member 150 to the circuit board 250.

Referring to FIG. 9A, the upper elastic member 150 may include a plurality of upper elastic units 150-1 to 150-4, which are conductively isolated from each other. Although FIG. 9A illustrates four upper elastic units, which are conductively isolated from each other, the number of upper elastic units is not limited thereto, and may be two or greater.

The upper elastic member 150 may include first to fourth upper elastic units 150-1 to 150-4, which are directly bonded and thus conductively connected to the first to fourth terminals B1 to B4 of the circuit board 190.

A portion of each of the plurality of upper elastic units may be disposed on the first side portion 141-1 of the housing 140, on which the circuit board 190 is disposed, and at least one upper elastic unit may be disposed on each of the remaining second to fourth side portions 141-2 to 141-4, other than the first side portion 141-1 of the housing 140.

Each of the first to fourth upper elastic units 150-1 to 150-4 may include a first outer frame 152 coupled to the housing 140.

At least one of the first to fourth upper elastic units 150-1 to 150-4 may further include a first inner frame 151 coupled to the bobbin 110 and a first frame connection portion 153 connecting the first inner frame 151 to the first outer frame 152.

In the embodiment shown in FIG. 9A, each of the first and second upper elastic units 150-1 and 150-2 may include only the first outer frame, without including the first inner frame and the first frame connection portion, and each of the first and second upper elastic units 150-1 and 150-2 may be spaced apart from the bobbin 110.

In an example, each of the third and fourth upper elastic units 150-3 and 150-4 may include the first inner frame 151, the first outer frame, and the first frame connection portion 153, but the disclosure is not limited thereto.

In an example, each of the first inner frames 151 of the third and fourth upper elastic units 150-3 and 150-4 may have a hole 151a formed therein for coupling to the first coupling portion 113 of the bobbin 110, but the disclosure is not limited thereto. In an example, the hole 151a in the first inner frame 151 may have at least one slit 51a formed therein to allow an adhesive member to enter a region between the first coupling portion 113 of the bobbin 110 and the hole 151a.

Each of the first outer frames 152 of the first to fourth upper elastic members 150-1 to 150-4 may have a hole 152a formed therein for coupling to the first coupling portion 143 of the housing 140.

The first outer frame 151 of each of the first to fourth upper elastic units 150-1 to 150-4 may include a body portion coupled to the housing 140 and connection terminals P1 to P4, each of which is connected to a corresponding one of the first to fourth terminals B1 to B4 of the circuit board 190. Here, the connection terminals P1 to P4 may alternatively be referred to as "extension portions".

Each of the first to fourth upper elastic units 150-1 to 150-4 may include a first coupling portion 520 coupled to the housing 140, a second coupling portion 510 coupled to a corresponding one of the support members 220-1 to 220-4, a connection portion 530 connecting the first coupling portion 520 to the second coupling portion 510, and extension portions P1 to P4 connected to the second coupling portion 510 and extending to the first side portion 141-1 of the housing 140. In an example, the first outer frame 152 may include the first coupling portion 520, the second coupling portion 510, and the connection portion 530.

The body portion of each of the first to fourth upper elastic units 150-1 to 150-4 may include a first coupling portion 520. In addition, the body portion of each of the first to fourth upper elastic units 150-1 to 150-4 may further include at least one of a second coupling portion 510 or a connection portion 530.

In an example, using a solder or a conductive adhesive member, one end of the first support member 220-1 may be coupled to the second coupling portion 510 of the first upper elastic unit 150-1, one end of the second support member 220-2 may be coupled to the second coupling portion 510 of the second upper elastic unit 150-1, one end of the third support member 220-3 may be coupled to the second coupling portion 510 of the third upper elastic unit 150-3, and one end of the fourth support member 220-4 may be coupled to the second coupling portion 510 of the fourth upper elastic unit 150-4.

The second coupling portion 510 may have a hole 52 formed therein to allow a corresponding one of the support members 220-1 to 220-4 to pass therethrough. One end of the corresponding one of the support members 220-1 to 220-4, which has passed through the hole 52, may be directly coupled to the second coupling portion 510 via a conductive adhesive member or a solder 910 (refer to FIG. 10), and the second coupling portion 510 and the support members 220-1 to 220-4 may be conductively connected to each other.

In an example, the second coupling portion 510, which is a region in which the solder 910 is disposed for coupling to the support members 220-1 to 220-4, may include the hole 52 and a region peripheral to the hole 52.

The first coupling portion 520 may include at least one coupling region (e.g. 5a or 5b) coupled to the housing 140 (e.g. the corner portions 142-1 to 142-4).

In an example, the coupling region (e.g. 5a or 5b) of the first coupling portion 520 may include at least one hole 152a coupled to the first coupling portion 143 of the housing 140.

In an example, each of the coupling regions 5a and 5b may have one or more holes formed therein.

In an example, in order to support the housing 140 in an equilibrium state, the coupling regions 5a and 5b of the first coupling portions 520 of the first to fourth upper elastic units 150-1 to 150-4 may be symmetrically formed with respect to reference lines (e.g. 501 and 502), but the disclosure is not limited thereto.

In addition, the first coupling portions 143 of the housing 140 may be symmetrically disposed with respect to the reference lines (e.g. 501 and 502) and may be provided such that two thereof are located on each side of each of the reference lines, but the number thereof is not limited thereto.

Each of the reference lines 501 and 502 may be a line that extends between a center point 101 and one of the corners of the corner portions 142-1 to 142-4 of the housing 140. In an example, each of the reference lines 501 and 502 may be a line that extends through the center point 101 and two corners, which face each other in the diagonal direction of the housing 140, among the corners of the corner portions 142-1 to 142-4 of the housing 140.

Here, the center point 101 may be the center of the housing 140, the center of the bobbin 110, or the center of the upper elastic member 150. In addition, in an example, the corner of each of the corner portions of the housing 140 may be a corner that is aligned with or corresponds to the center of a corresponding one of the corner portions of the housing 140.

In the embodiment shown in FIG. 9A, each of the coupling regions 5a and 5b of the first coupling portions 520 is embodied as including the hole 152a, but the disclosure is not limited thereto. In another embodiment, each of the coupling regions may be formed in any of various shapes suitable for coupling to the housing 140, such as a recess shape.

In an example, the hole 152a in the first coupling portion 520 may have at least one slit 52a formed therein to allow an adhesive member to enter a region between the first coupling portion 143 of the housing 140 and the hole 152a.

The connection portion 530 may interconnect the second coupling portion 510 and the first coupling portion 520.

In an example, the connection portion 530 may interconnect the second coupling portion 510 and the coupling regions 5a and 5b of the first coupling portion 520.

In an example, the connection portion 530 may include a first connection portion 530a, which interconnects the first coupling region 5a of the first coupling portion 520 of each of the first to fourth upper elastic units 150-1 to 150-4 and the second coupling portion 510, and a second connection portion 530b, which interconnects the second coupling region 5b of the first coupling portion 520 and the second coupling portion 510.

In an example, the first outer frame 151 may include a connection region, which directly interconnects the first coupling region 5a and the second coupling region 5b, but the disclosure is not limited thereto.

Each of the first and second connection portions 530a and 530b may include a bent portion, which is bent at least once, or a curved portion, which is curved at least once, but the disclosure is not limited thereto. In another embodiment, a linear portion may be included.

The width of the connection portion 530 may be less than the width of the first coupling portion 520. Furthermore, the width of the connection portion 530 may be less than the width (or the diameter) of the first coupling portion. In another embodiment, the width of the connection portion 530 may be equal to the width of the first coupling portion 520, and may be equal to the width (or the diameter) of the first coupling portion.

In an example, the first coupling portions 520 may be in contact with the upper surfaces of the corner portions 142-1 to 142-4 of the housing 140, and may be supported by the corner portions 142-1 to 142-4 of the housing 140. In an example, the connection portion 530 may not be supported by the upper surface of the housing 140, and may be spaced apart from the housing 140. In addition, in order to inhibit oscillation caused by vibration, a damper (not shown) may be disposed between the connection portion 530 and the housing 140 and may be coupled or attached to the connection portion 530 and the housing 140.

The width of each of the first and second connection portions 530a and 530b may be less than the width of the first coupling portion 520, whereby the connection portion 530 may be easily moved in the first direction. Consequently, it is possible to disperse stress applied to the upper elastic units 150-1 to 150-4 and stress applied to the support members 220-1 to 220-4.

In an example, each of the first and second extension portions P1 and P2 of the first outer frames of the first and second upper elastic units 150-1 and 150-2 may extend toward a corresponding one of the first and second terminals B1 and B2 of the circuit board 190, which are located at the first side portion 141-1 of the housing 140, from the first coupling portion 520 (e.g. the first coupling region 5a).

The first coupling portion 520 of the third upper elastic unit 150-3 may further include at least one coupling region 6a or 6b, which is connected to at least one of the fourth side portion 141-4 or the second corner portion 142-2 of the housing 140.

In addition, the first coupling portion 520 of the fourth upper elastic unit 150-4 may further include at least one coupling region 6c or 6d, which is connected to at least one of the second side portion 141-2 or the first corner portion 142-1 of the housing 140.

Each of the third and fourth extension portions P3 and P4 of the first outer frames of the third and fourth upper elastic units 150-3 and 150-4 may extend toward a corresponding one of the third and fourth terminals B3 and B4 of the circuit board 190, which are located at the first side portion 141-1 of the housing 140, from the first coupling portion 520 (e.g. the coupling region 6b or 6d).

One end of each of the first to fourth extension portions P1 to P4 may be coupled and conductively connected to a corresponding one of the first to fourth terminals B1 to B4 of the circuit board 190 by means of a solder or a conductive adhesive member.

In an example, each of the first and second extension portions P1 and P2 may have a linear shape, but the disclosure is not limited thereto. In another embodiment, at least one of a linear portion or a curved portion may be included.

In order to facilitate coupling to a corresponding one of the third and fourth terminals B3 and B4 of the circuit board 190, each of the third and fourth extension portions P3 and P4 may include a bent portion or a curved portion.

The first outer frame of the third upper elastic unit 150-3 may further include a first extension frame 154-1, which is connected between the first coupling portion 520 and the extension portion P3 and is located at the fourth side portion 141-4 and the fourth corner portion 142-4 of the housing 140.

In order to increase the coupling force between the first extension frame 154-1 and the housing 140 to thus inhibit the third upper elastic unit 150-3 from lifting, the first extension frame 154-1 may include at least one coupling region 6a or 6b, which is coupled to the housing 140, and each of the coupling regions 6a and 6b may have a hole formed therein for coupling to the first coupling portion 143 of the housing 140.

The first outer frame of the fourth upper elastic unit 150-4 may further include a second extension frame 154-2, which is connected between the first coupling portion 520 and the extension portion P4 and is located at the second side portion 141-2 and the first corner portion 142-1 of the housing 140.

In order to increase the coupling force between the second extension frame 154-2 and the housing 140 to thus inhibit the fourth upper elastic unit 150-4 from lifting, the second extension frame 154-2 may include at least one coupling region 6c or 6d, which is coupled to the housing 140, and each of the coupling regions 6c and 6d may have a hole formed therein for coupling to the first coupling portion 143 of the housing 140.

Although each of the third upper elastic unit 150-3 and the fourth upper elastic unit 150-4 is illustrated in FIG. 9A as including two first frame connection portions, the disclosure is not limited thereto. The number of first frame connection portions may be one, or three or greater.

As described above, each of the first to fourth upper elastic units may include the extension portions P1 to P4, which are disposed on the first side portion 141-1 of the housing 140. By virtue of the extension portions P1 to P4, the upper elastic units 150-1 to 150-4 may be easily coupled to the first to fourth terminals B1 to B4, which are provided at the body portion S1 of the circuit board 190.

Because the four terminals B1 to B4 provided at the body portion S1 of the circuit board 190, which is disposed on the first side portion 141-1 of the housing 140, are directly and conductively connected to the first to fourth upper elastic units 150-1 to 150-4, a portion of the first outer frame 151 of each of the first to fourth upper elastic units 150-1 to 150-4 may be disposed on the first side portion 141-1 of the housing 140.

Each of the upper elastic units 150-1 to 150-4 may be disposed on a corresponding one of the corner portions 142-1 to 142-4 of the housing 140, and may include the extension portions P1 to P4 extending to the first side portion 141-1 of the housing 140.

Each of the extension portions P1 to P4 of the upper elastic units 150-1 to 150-4 may be directly coupled to a corresponding one of the four terminals B1 to B4 provided at the body portion S1 of the circuit board 190 by means of a conductive adhesive member 71, such as a solder.

The first outer frame 151 of the first upper elastic unit 150-1 may be disposed on the first corner portion 142-1 of the housing 140, the first outer frame 151 of the second upper elastic unit 150-2 may be disposed on the second corner portion 142-2 of the housing 140, the first outer frame 151 of the third upper elastic unit 150-3 may be disposed on the third corner portion 142-3 of the housing 140, and the first outer frame 151 of the fourth upper elastic unit 150-4 may be disposed on the fourth corner portion 142-4 of the housing 140.

A portion of the third upper elastic unit 150-3 may be disposed in the first recess 90a in the circuit board 190, and the end of the portion of the third upper elastic unit 150-3 may be coupled to the third terminal B3 of the circuit board 190. A portion of the fourth upper elastic unit 150-4 may be disposed in the second recess 90b in the circuit board 190, and the end of the portion of the fourth upper elastic unit 150-4 may be coupled to the fourth terminal B4 of the circuit board 190.

The third extension portion P3 of the third upper elastic unit 150-3 may extend toward the third terminal B3 of the circuit board 190 through the first recess 90a in the circuit board 190, and may be bent at least twice. In addition, the fourth extension portion P4 of the fourth upper elastic unit 150-4 may extend toward the fourth terminal B4 of the circuit board 190 through the second recess 90b in the circuit board 190, and may be bent at least twice.

The third extension portion P3 (or "third connection terminal") of the third upper elastic unit 150-3 may include at least two bent regions 2a and 2b.

In an example, the third extension portion P3 of the third upper elastic unit 150-3 may include a first portion 1a, which extends from the first coupling portion 520 (e.g. the coupling region 6b) of the third upper elastic unit 150-3, a first bent region 2a (or "first bent portion"), which is bent at the first portion 1a, a second portion 1b, which extends from the first bent region 2a, a second bent region 2b (or "second bent portion"), which is bent at the second portion 1b, and a third portion 1c, which extends toward the third terminal B3 from the second bent region 2b.

In an example, the second portion 1b of the third extension portion P3 (or the third connection terminal) may be bent at the first portion 1a, and the third portion 1c may be bent at the second portion 1b. The second portion 1b of the third extension portion P3 may be disposed between the first bent region 2a and the second bent region 2b, and may connect the first and second bent regions 2a and 2b to each other.

In an example, each of the first portion 1a and the third portion 1c of the third extension portion P3 may extend toward the first corner portion 142-1 of the housing 140 from the second corner portion 142-2 thereof. In an example, the second portion 1b of the third extension portion P3 may extend toward the outer surface of the housing 140 from the inner surface thereof. In an example, a portion (e.g. the second portion 1b) of the third extension portion P3 of the third upper elastic unit 150-3 may be located in the first recess 90a in the circuit board 190, or may extend through the first recess 90a.

The fourth extension portion P4 (or "fourth connection terminal") of the fourth upper elastic unit 150-4 may include at least two bent regions 2c and 2d.

In an example, the fourth extension portion P4 of the fourth upper elastic unit 150-4 may include a fourth portion 1d, which extends from the first coupling portion 520 (e.g. the coupling region 6d) of the fourth upper elastic unit 150-4, a third bent region 2c (or "third bent portion"), which is bent at the fourth portion 1d, a fifth portion 1e, which extends from the third bent region 2c, a fourth bent region 2d (or "fourth bent portion"), which is bent at the fifth portion 1e, and a sixth portion if, which extends toward the fourth terminal B4 from the fourth bent region 2d.

In an example, the fifth portion 1e of the fourth extension portion P4 (or the fourth connection terminal) may be bent at the fourth portion 1d, and the sixth portion 1f may be bent at the fifth portion 1e. In an example, the fifth portion 1e of the fourth extension portion P4 may be disposed between the third bent region 2c and the fourth bent region 2d, and may connect the third and fourth bent regions 2c and 2d to each other.

In an example, each of the fourth portion 1d and the sixth portion if of the fourth extension portion P4 may extend toward the second corner portion 142-2 of the housing 140 from the first corner portion 142-1 thereof. In an example, the fifth portion 1e of the fourth extension portion P4 may extend toward the outer surface of the housing 140 from the inner surface thereof. In an example, a portion (e.g. the fifth portion 1e) of the fourth extension portion P4 of the fourth upper elastic unit 150-4 may be located in the second recess 90b in the circuit board 190, or may extend through the second recess 90b.

Referring to FIG. 9B, the lower elastic member 160 may include a plurality of lower elastic units. In an example, the lower elastic member 160 may include first and second lower elastic units 160-1 and 160-2.

In an example, each of the first and second lower elastic units 160-1 and 160-2 may include a second inner frame 161, which is coupled or fixed to the lower portion, the lower surface, or the lower end of the bobbin 110, second outer frames 162-1 to 162-3, which are coupled or fixed to the lower portion, the lower surface, or the lower end of the housing 140, and a second frame connection portion 163, which connects the second inner frame 161 to the second outer frames 162-1 to 162-3.

The second inner frame 161 may have a hole 161a formed therein for coupling to the second coupling portion 117 of the bobbin 110, and the second outer frames 162-1 to 162-3 may have holes 162a formed therein for coupling to the second coupling portion 149 of the housing 140.

In an example, each of the first and second lower elastic units 160-1 and 160-2 may include three second outer frames 162-1 to 162-3 and two second frame connection portions 163, which are coupled to the housing 140, but the disclosure is not limited thereto. In another embodiment, each of the first and second lower elastic units may include at least one second outer frame and at least one second frame connection portion.

Each of the first and second lower elastic units 160-1 and 160-2 may include connection frames 164-1 to 164-4, which connect the second outer frames 162-1 to 162-3 to each other. The width of each of the connection frames 164-1 to 164-4 may be less than the width of each of the second outer frames 162-1 to 162-3, but the disclosure is not limited thereto.

In order to avoid spatial interference with the first to fourth magnet units 130-1 to 130-4, the connection frames 164-1 to 164-4 may be located outside the first to fourth magnet units 130-1 to 130-4. In this case, the outside of the first to fourth magnet units 130-1 to 130-4 may be the side opposite the region in which the center of the bobbin 110 or the center of the housing 140 is located with respect to the first to fourth magnet units 130-1 to 130-4.

In addition, in an example, the connection frames 164-1 to 164-4 may be located so as not to overlap the magnet units 130-1 to 130-4 in the optical-axis direction, but the disclosure is not limited thereto. In another embodiment, at least a portion of the connection frame may be aligned with or overlap the magnet unit in the optical-axis direction.

Each of the upper elastic units 150-1 to 150-4 and the lower elastic units 160-1 and 160-2 may be embodied as a leaf spring, but the disclosure is not limited thereto. Each of the elastic units may be embodied as a coil spring or the like. The above-mentioned elastic unit (e.g. 150 or 160) may alternatively be referred to as a "spring", the outer frame (e.g. 152 or 162) may alternatively be referred to as an "outer portion", the inner frame (e.g. 151 or 161) may alternatively be referred to as an "inner portion", and the support member (e.g. 220) may alternatively be referred to as a wire.

Next, the support member 220 (220-1 to 220-4) will be described.

The support member 220 may be disposed on a corresponding one of the corner portions of the housing 140, and may be coupled to the upper elastic unit 150. The support member 220 may include a plurality of support members 220-1 to 220-4.

The support members 220-1 to 220-4 may be disposed on the corner portions 142-1 to 142-4 of the housing 140, and may conductively connect the upper elastic units 150-1 to 150-4 and the circuit board 250 to each other.

Each of the support members 220-1 to 220-4 may be coupled to a corresponding one of first to fourth upper elastic units 150-1 to 150-4, and may conductively connect the corresponding one of the first to fourth upper elastic units 150-1 to 150-4 to a corresponding one of the terminals 251-1 to 251-n (e.g. n=4) of the circuit board 250.

The support members 220-1 to 220-4 may be spaced apart from the housing 140, rather than being fixed to the housing 140. One end of each of the support members 220-1 to 220-4 may be directly connected or coupled to the second coupling portion 510 of the upper elastic member 150.

In addition, in an example, the other end of each of the support members 220-1 to 220-4 may be directly connected or coupled to the circuit board 250, but the disclosure is not limited thereto. In another embodiment, the other end of each of the support members 220-1 to 220-4 may be connected or coupled to a corresponding one of the terminals disposed on the base 210.

In an example, the support members 220-1 to 220-4 may pass through the holes 147 formed in the corner portions 142-1 to 142-4 of the housing 140, but the disclosure is not limited thereto. In another embodiment, the support members may be disposed adjacent to the boundary line between the side portions 141-1 to 141-4 and the corner portions 142-1 to 142-4 of the housing 140, and may not pass through the corner portions 142-1 to 142-4 of the housing 140.

The first coil 120 may be coupled and conductively connected to the first and second lower elastic units 160-1 and 160-2.

In an example, using a conductive adhesive or a solder, one end of the first coil 120 may be coupled to the second inner frame of the first lower elastic unit 160-1, and the other end of the first coil 120 may be coupled to the second inner frame of the second lower elastic unit 160-2.

In an example, the second inner frame 161 of the first lower elastic unit 160-1 may include a first bonding portion 43a, which is coupled to one end of the first coil 120, and the second inner frame 161 of the second lower elastic unit 160-2 may include a second bonding portion 43b, which is coupled to the other end of the first coil 120. Each of the first and second bonding portions 43a may have a recess 8a formed therein to guide the coil 120.

The first terminal B1 of the circuit board 190 may be conductively connected to the first support member 220-1 via the first upper elastic unit 150-1, the second terminal B2 of the circuit board 190 may be conductively connected to the second support member 220-2 via the second upper elastic unit 150-2, the third terminal B3 of the circuit board 190 may be conductively connected to the third support member 220-3 via the fourth upper elastic unit 150-4, and the fourth terminal B4 of the circuit board 190 may be conductively connected to the fourth support member 220-4 via the third upper elastic unit 150-3.

Each of the first to fourth upper elastic units 150-1 to 150-4 may be coupled to a corresponding one of the first to fourth support members 220-1 to 220-4, and each of the first to fourth support members 220-1 to 220-4 may be conductively connected to a corresponding one of the first to fourth terminals 251-1 to 251-n (n=4) of the circuit board 250.

Each of the first and second lower elastic units 160-1 to 160-4 may be conductively connected to the first coil 120, and may be connected or coupled to a corresponding one of the fifth and sixth terminals B5 and B6 of the circuit board 190.

In an example, the power signals VDD and GND may be supplied to the first and second support members 220-1 and 220-2 through the first and second terminals 251-1 and 251-2 of the circuit board 250.

In an example, the power signals VDD and GND may be supplied to the first and second terminals B1 and B2 of the circuit board 190 through the first and second upper elastic units 150-1 and 150-2 connected to the first and second support members 220-1 and 220-2. In addition, the first position sensor 170 may receive the power signals VDD and GND through the first and second terminals B1 and B2 of the circuit board 190.

In an example, the first terminal B1 of the circuit board 190 may be one of a VDD terminal and a GND terminal, and the second terminal B2 of the circuit board 190 may be the other of the VDD terminal and the GND terminal.

In addition, the clock signal SCL and the data signal SDA may be supplied to the third and fourth support members 220-3 and 220-4 through the third and fourth terminals 21-3 and 21-4 of the circuit board 250. The clock signal SCL and the data signal SDA may be supplied to the third and fourth terminals B3 and B4 of the circuit board 190 through the third and fourth upper elastic units 150-3 and 150-4 connected to the third and fourth support members 220-3 and 220-4. In addition, the first position sensor 170 may receive the clock signal SCL and the data signal SDA through the third and fourth terminals B3 and B4 of the circuit board 190.

Each of the fifth and sixth terminals B5 and B6 of the circuit board 190 is connected or coupled to the second outer frame 162-1 of a corresponding one of the first and second lower elastic units 160-1 and 160-2.

The second outer frame 162-1 of the first lower elastic unit 160-1 may include a first bonding portion 81a, to which the fifth terminal B5 of the circuit board 190 is coupled by means of a solder or a conductive adhesive member. In addition, the second outer frame 162-1 of the second lower elastic unit 160-2 may include a second bonding portion 81b, to which the sixth terminal B6 of the circuit board 190 is coupled by means of a solder or a conductive adhesive member.

In an example, the second outer frame 162-1 of the first lower elastic unit 160-1 may include a first hole 82a (or a first recess), in which the fifth terminal B5 of the circuit board 190 is inserted or disposed, and the second outer frame 162-1 of the second lower elastic unit 160-2 may include a second hole 82b (or a second recess), in which the sixth terminal B6 of the circuit board 190 is inserted or disposed.

In an example, each of the first and second holes 82a and 82b may be formed through the second outer frame 161-1, and may have an opening, which is open to one side of the second outer frame 161-1, but the disclosure is not limited thereto. In another embodiment, an opening that is open to one side of the second outer frame 161-1 may not be formed.

In the state in which the fifth terminal B5 (or the sixth terminal B6) of the circuit board 190 is inserted into the first recess 82a (or the second recess 82b) in the second outer frame 162-1 of the first lower elastic unit 160-1, the fifth terminal B5 (or the sixth terminal B6) is coupled to the first bonding portion 81a (or the second bonding portion 81b), in which the first recess 82a (or the second recess 82b) is formed, by means of a solder or a conductive adhesive member. Accordingly, it is possible to increase the coupling area and thus to increase the coupling force and improve soldering efficiency between the terminal and the bonding portion.

Referring to FIG. 11B, one end (e.g. the lower end or the lower surface) of each of the fifth and sixth terminals B5 and B6 may be located at a lower position than the lower end or the lower surface of the second outer frame 162-1 of the first and second lower elastic units 160-1 and 160-2. In the bottom view shown in FIG. 11B, the lower surface or the lower end of each of the fifth and sixth terminals B5 and B6 appears to be located at a lower position than the lower end or the lower surface of the second outer frame 162-1. The reason for this is to improve soldering efficiency between one end of each of the fifth and sixth terminals B5 and B6 and the first and second bonding portions 81a and 81b of the first and second lower elastic units 160-1 and 160-2.

In addition, referring to FIG. 11B, the housing 140 may include a recess 31, which is recessed in the lower surface of the first side portion 141-1. In an example, the bottom surface of the recess 31 in the housing 140 and the lower surface of the housing 140 may have a height difference therebetween in the optical-axis direction. In an example, the bottom surface of the recess 31 in the housing 140 may be located at a higher position than the lower surface of the housing 140.

The recess 31 in the housing 140 may overlap the first and second bonding portions 81a and 81b of the first and second lower elastic units 160-1 and 160-2 in the optical-axis direction.

Furthermore, in an example, the recess 31 in the housing 140 may overlap the holes 82a and 82b in the second outer frames 162-1 of the first and second lower elastic units 160-1 and 160-2 in the optical-axis direction.

By virtue of the recess 31 in the housing 140, it is possible to increase the exposure areas of the fifth and sixth terminals B5 and B6 of the circuit board 190, which are exposed from the housing, and to secure a space in which to dispose a solder or a conductive adhesive member, thereby improving soldering efficiency. In addition, by virtue of the recess 31, it is possible to reduce a length by which the solder or the conductive adhesive member coupled to each of the fifth and sixth terminals protrudes downwards beyond the lower surface of the second outer frame 162-1. Accordingly, it is possible to suppress or inhibit spatial interference with the circuit board 250 or the base 210, which is located under the lower elastic units 160-1 and 160-2.

Furthermore, the lower surface 11c of the first magnet 130, which is disposed in the seating portion 141a in the housing 140, may be located at a lower position than the lower surface of the housing 140 and the lower surfaces of the second outer frames 162-1 to 162-3 of the first and second lower elastic units 160-1 and 160-2, but the disclosure is not limited thereto. In another embodiment, the lower surface 11c of the first magnet 130 may be located at a higher position than the lower surface of the housing 140 in order to reduce spatial interference with the second position sensor 240. In still another embodiment, the lower surface 11c of the first magnet 130 may be located at the same height as or located in the same plane as the lower surface of the housing 140.

In order to space the first magnet 130 apart from the second coil 230 and the circuit board 250, the other end of the support member 220 may be coupled to the circuit board 250 (or the circuit member 231) at a lower position than the lower surface 11c of the first magnet 130.

At least one of the upper elastic member 150, the lower elastic member 160, or the support member 220 may be conductive.

In an example, the support member 220 may be embodied as a member exhibiting elastic support, e.g. a suspension wire, a leaf spring, or a coil spring. In another embodiment, the support member 220 may be integrally formed with the upper elastic member 150.

Next, the base 210, the circuit board 250, and the second coil 230 will be described.

Referring to FIG. 12, the base 210 may include a bore 201 or a cavity (or hole) corresponding to the bore 110a in the bobbin 110 and/or the bore 140a in the housing 140, and may have a shape coinciding with or corresponding to the shape of the cover member 300, for example, a rectangular shape. In an example, the bore 201 in the base 210 may be a through-hole, which is formed through the base 210 in the optical-axis direction.

The base 210 may include a step 211, to which an adhesive is applied in order to adhere the cover member 300 to the base 210. In an example, the step 211 may be formed on the outer surface of the base 210. In this case, the step 211 may guide the side plate 302 of the cover member 300, which is coupled to the upper side of the base, and the lower end of the side plate 302 of the cover member 300 may be in contact with the step 211. The step 211 of the base 210 may be bonded and fixed to the lower end of the side plate 302 of the cover member 300 by means of an adhesive or the like.

A support portion 225 or a holding portion may be provided in the region of the base 210 that faces a terminal surface 253, on which the terminals 251-1 to 251-n of the circuit board 250 are provided. In an example, the support portion 255 may support the terminal surface 253 of the circuit board 250, on which the terminals 251-1 to 251-n of the circuit board 250 are formed.

The base 210 may have a concave recess 212 formed in a corner area thereof corresponding to a corner of the cover member 300. The concave recess 212 may be formed in the base 210 in order to avoid spatial interference with the lower end of the support member 220 and a solder or a conductive adhesive coupled thereto.

The base 210 may have a seating portion (not shown) formed in the lower surface thereof to allow a filter 610 of the camera device 200 to be mounted therein.

In addition, the base 210 may include a protruding portion 19 formed on the upper surface thereof peripheral to the bore 201 in order to be coupled to the bore 205 in the circuit board 250. The protruding portion 19 may protrude from the upper surface of the base 210 in the optical-axis direction. When viewed from above, the protruding portion 19 may have a circular, elliptical, or polygonal shape.

The base 210 may have seating recesses 215-1 and 215-2 formed in the upper surface thereof to allow the second position sensor 240 to be disposed or seated therein.

The second position sensor 240 may be disposed on the base 210. In an example, the second position sensor 240 may be disposed between the circuit board 250 and the base 210. In an example, the second position sensor 240 may be disposed or mounted on the lower surface of the circuit board 250. The first position sensor 170 may alternatively be referred to as an "AF position sensor", and the second position sensor 240 may alternatively be referred to as an "OIS position sensor".

The second position sensor 240 may include a first sensor 240a and a second sensor 240b.

The first and second sensors 240a and 240b may detect displacement of the OIS operation unit in a direction perpendicular to the optical axis. In an example, the first and second sensors 240a and 240b may detect shift or tilt of the OIS operation unit in a direction perpendicular to the optical axis.

The first and second sensors 240a and 240b may be conductively connected to the circuit board 250.

In an example, the first sensor 240a may overlap one (e.g. 130-3 or 130A-3) of the first and third magnet units 130-1 and 130-3 or 130A-1 and 130A-3 in the optical-axis direction, and the second sensor 240b may overlap one (e.g. 130-4 or 130A-4) of the second and fourth magnet units 130-2 and 130-4 or 130A-2 and 130A-4 in the optical-axis direction.

In an example, the first sensor 240a may output a first output signal corresponding to a result of detection of the intensity of the magnetic field of the third magnet unit (e.g. 130-3 or 130A-3), and the second sensor 240b may output a second output signal corresponding to a result of detection of the intensity of the magnetic field of the fourth magnet unit (e.g. 130-4 or 130A-4).

The OIS operation unit may include the AF operation unit and components mounted in the housing 140. In an example, the OIS operation unit may include the AF operation unit, the housing 140, the first magnet 130, the first position sensor 170, the circuit board 190, and the capacitor 195.

Each of the first and second sensors 240a and 240b may be a Hall sensor. Alternatively, each of the first and second sensors 240a and 240b may be a driver including a Hall sensor. The description of the first position sensor 170 may be applied to each of the first and second sensors 240a and 240b.

The circuit board 250 may be disposed on the upper surface of the base 210, and may include a bore 205 corresponding to the bore 110a in the bobbin 110, the bore 140a in the housing 140, and/or the bore 201 in the base 210. The bore 205 in the circuit board 250 may be formed as a through-hole.

The circuit board 250 may include a body 252 disposed on the upper surface of the base 210 and at least one terminal surface 253 (or terminal portion) connected to the body 252. In an example, the terminal surface 253 may be bent from the body 252, and may be disposed on the outer surface of the base 210.

The body 252 of the circuit board 250 may have a shape coinciding with or corresponding to the upper surface of the base 210, for example, a rectangular shape.

The circuit board 250 may include a plurality of terminals 251-1 to 251-n (where n is a natural number greater than 1) formed on the terminal surface 253.

A power signal may be supplied to the first position sensor 170, which is implemented as a Hall sensor alone, through the plurality of terminals 251-1 to 251-n, and an output signal of the first position sensor 170 may be output through the terminals.

Alternatively, signals SCL, SDA, VDD, and GND for data communication between the driver-type first position sensor 170 and the outside may be transmitted and received through the plurality of terminals 251-1 to 251-n.

Further, when each of the first and second sensors 240a and 240b is implemented as a driver IC, signals for data communication with each of the first and second sensors 240a and 240b may be transmitted and received through the plurality of terminals 251-1 to 251-n mounted on the terminal surface 253 of the circuit board 250.

Furthermore, when each of the first and second sensors 240a and 240b is implemented as a Hall sensor alone, a drive signal may be supplied to each of the first and second sensors 240a and 240b through the plurality of terminals 251-1 to 251-n mounted on the terminal surface 253 of the circuit board 250, and an output signal of each of the first and second sensors 240a and 240b may be output to the outside through the terminals.

According to the embodiment, the circuit board 250 may be embodied as a printed circuit board or a flexible printed circuit board (FPCB), but the disclosure is not limited thereto. In another embodiment, the terminals 251-1 to 251-n of the circuit board 250 may be directly formed on the surface of the base 210 using a surface electrode method or the like.

The circuit board 250 may include holes 250a (refer to FIG. 25), through which the support members 220-1 to 220-4 pass. The position and the number of holes 250a may correspond to or coincide with the position and the number of support members 220-1 to 220-4.

At least a portion (e.g. the other end) of each of the support members 220-1 to 220-4 may be coupled to a corresponding one of the pads 28A to 28D formed on the lower surface of the circuit board 250 through a corresponding one of the holes 250a in the circuit board 250 by means of a solder or a conductive adhesive member, and may be conductively connected to the circuit board 250.

Referring to FIG. 15, the pads 28A to 28D of the circuit board 250 and solders or conductive adhesive members coupled to the pads 28A to 28D may be exposed from the lower surface of the base 210 through the escape recesses 212 in the base 210.

In another embodiment, the circuit board 250 may not include holes, and the support members 220-1 to 220-4 may be conductively connected to circuit patterns or pads formed on the upper surface of the circuit board 250 by means of a solder or a conductive adhesive member.

Alternatively, in another embodiment, each of the support members 220-1 to 220-4 may be coupled and conductively connected to a corresponding one of terminals disposed on the base 210 or formed on the base 210, and the terminals formed on the base 210 may be conductively connected to the circuit board 250.

Since the embodiment is configured such that the drive signal is directly supplied to the first coil 120 from the first position sensor 170, it is possible to reduce the number of support members and to simplify the conductive connection structure compared to a case in which the drive signal is directly supplied to the first coil 120 through the circuit board 250.

The cover member 300 may accommodate the OIS operation unit in an accommodation space defined by the cover member 300 and the base 210.

The cover member 300 may be formed in a shape of a box that has an open lower portion and includes an upper plate 301 and side plates 302, and the lower portion of the cover member 300 may be coupled to the upper portion of the base 210. The upper plate 301 of the cover member 300 may have a polygonal shape, for example, a rectangular or octagonal shape.

The cover member 300 may have a bore 303 formed in the upper plate 301 thereof to expose a lens (not shown), which is coupled to the bobbin 110, to external light. The cover member 300 may be made of a non-magnetic material, such as SUS, in order to be inhibited from being attracted to the first magnet 130, but the disclosure is not limited thereto. In another embodiment, the cover member 300 may be made of a magnetic material in order to function as a yoke increasing electromagnetic force between the first coil 120 and the first magnet 130.

The second coil 230 may be disposed between the first magnet 130 and the side plate 302 of the cover member 300.

Referring to FIGS. 13 to 17B, at least a portion of the second coil 230 may face or overlap the second surface 3D or 3D1 of the first magnet 130 or 130A in a direction parallel to a line that is perpendicular to the optical axis OA and extends through the optical axis or in a diagonal direction. Here, the diagonal direction may be a direction from one corner (e.g. CA1 or CA2) of the cover member 300 toward another diagonally opposite corner (e.g. CA3 or CA4) thereof.

In an example, the second coil 230 may be disposed between the second surface 3D or 3D1 of the first magnet 130 or 130A and the corners CA1 to CA4 of the side plate 302 of the cover member 300.

In an alternative example, the second coil 230 may be disposed between the second surface 3D or 3D1 of the first magnet 130 or 130A and the circuit board 310.

In an example, the second coil 230 may be disposed on the first surface 310A of the circuit board 310. In this case, the first surface 310A of the circuit board 310 may be a surface that faces the outer surface of the housing 140 and/or the first magnet 130. In addition, the second surface 310B of the circuit board 310 may be a surface opposite the first surface 310A.

In an example, the second coil 230 may be disposed between the first surface 310A of the circuit board 310 and the second surface 3D or 3D1 of the first magnet 130 or 130A.

In an example, the second coil 230 may not overlap the first magnet 130 in the optical-axis direction.

The second coil 230 may overlap the second surface 3D or 3D1 of the first magnet 130 or 130A in a direction parallel to a line that is perpendicular to the optical axis and extends through the optical axis or in the diagonal direction.

In an example, the second coil 230 may overlap a corresponding one of the corners CA1 to CA4 of the side plate 302 of the cover member 300 in a direction parallel to a line that is perpendicular to the optical axis and extends through the optical axis or in the diagonal direction.

In addition, in an example, the first magnet 130 or 130A may overlap a corresponding one of the corners CA1 to CA4 of the side plate 302 of the cover member 300 in a direction parallel to a line that is perpendicular to the optical axis and extends through the optical axis or in the diagonal direction.

In an example, the first surface 3C or 3C1 and/or the second surface 3D or 3D1 of the first magnet 130 or 130A may overlap a corresponding one of the corners CA1 to CA4 of the side plate 302 of the cover member 300 in a direction parallel to a line that is perpendicular to the optical axis and extends through the optical axis or in the diagonal direction.

The side plate 302 of the cover member 300 may include a plurality of side plates 302A to 302D. In addition, the cover member 300 may include corners CA1 to CA4, each of which is located between two adjacent ones of the side plates. Each of the corners CA1 to CA4 may be a portion where two adjacent ones of the side plates meet each other.

At least a portion of the circuit board 310 may be coupled, attached, or fixed to the cover member 300.

The circuit board 310 may be disposed on, coupled to, attached to, or fixed to the inner surface of the side plate 302 of the cover member 300. In an example, the second surface 310B of the circuit board 310 may be disposed on, coupled to, attached to, or fixed to the inner surface of the side plate 302 of the cover member 300.

In an example, the circuit board 310 may be disposed so as to surround the outer surface of the side portion of the housing 140. In addition, in an example, the circuit board 310 may include one end and the other end spaced apart from each other, but the disclosure is not limited thereto. In another embodiment, the circuit board 310 may have a closed-loop shape, for example, a ring or band shape.

Referring to FIGS. 13 and 17B, the circuit board 310 may include fixed portions 10A to 10D, which are coupled or attached to the side plate 302 of the cover member 300, and seating portions 31A to 31D, which are spaced apart from the side plate 302 of the cover member 300 and are formed to allow the second coil 230 to be coupled thereto or disposed thereon. In an example, each of the seating portions 31A to 31D may connect two adjacent ones of the fixed portions to each other.

In an example, the circuit board 310 (e.g. the fixed portions 10A to 10D) may be coupled to the side plate 302 of the cover member 300 by means of an adhesive, but the disclosure is not limited thereto. A coupling protrusion or a coupling recess may be formed on or in the side plate 302 of the cover member 300, and a hole (or a recess) or a protrusion, which is coupled to the coupling protrusion or the coupling recess formed on or in the side plate 302 of the cover member 300, may be formed in or on the circuit board 310.

Each of the seating portions 31A to 31D may overlap at least one of a corresponding one of the corners CA1 to CA4 of the cover member 300, the second coil 230, or the first magnet 130 in the diagonal direction.

In an example, the circuit board 310 may include at least one fixed portion, which is coupled or fixed to at least one of the side plates of the cover member 300, and at least one seating portion, which is connected to the at least one fixed portion.

In an example, each of the fixed portions 10A to 10D of the circuit board 310 may be parallel to a corresponding one of the side plates 302A to 302D of the cover member 300, and the seating portions 31A to 31D may be bent from the fixed portions 10A to 10D. In an example, the internal angles between the seating portions 31A to 31D and the fixed portions 10A to 10D may be obtuse angles, but the disclosure is not limited thereto. In another embodiment, the internal angles may be right angles.

Although the circuit board 130 is illustrated in FIG. 13 as being coupled or fixed to the cover member 300, the disclosure is not limited thereto. In another embodiment, at least a portion of the circuit board 310 may be coupled or fixed to the base 210. In an example, the base 210 may include a fixing portion, which is coupled to the circuit board 310 or functions to fix the circuit board 310. In an example, the fixing portion may be formed as a protruding portion protruding upwards from the upper surface of the base 210.

The second coil 230 may include a plurality of coil units 230-1 to 230-4, which are disposed or mounted on the circuit board 310. Each of the coil units 230-1 to 230-4 may be conductively connected to the circuit board 310.

In an example, power or a drive signal may be supplied to the coil units 230-1 to 230-4 through the circuit board 310. The power or the drive signal supplied to the second coil units 230-1 to 230-4 may be a DC signal, an AC signal, or a signal containing both DC and AC components, and may be of a current type or a voltage type.

In an example, each of the plurality of coil units 230-1 to 230-4 may be disposed on a corresponding one of the seating portions 31A to 31D of the circuit board 310. In addition, each of the coil units 230-1 to 230-4 may correspond to, face, or overlap a corresponding one of the first magnet units 130-1 to 130-4 in a direction parallel to a line that is perpendicular to the optical axis and extends through the optical axis or in the diagonal direction.

Each of the coil units 230-1 to 230-4 may be embodied as a coil block, which is provided separately from the circuit board 310, but the disclosure is not limited thereto.

In another embodiment, the coil units of the second coil 230 may be directly formed in an FP coil type within the circuit board 310.

In an example, when viewed toward the second surface 3D of the first magnet 130, each of the four coil units 230-1 to 230-4 may have a polygonal (e.g. rectangular) shape, without being limited thereto, and may alternatively have a circular or elliptical shape.

Further, in an example, when viewed toward the second surface 3D of the first magnet 130, the area of each of the second coil units 230-1 to 230-4 may be smaller than the area of the second surface 3D of a corresponding one of the magnet units 230-1 to 230-4. In another embodiment, the former may be equal to or larger than the latter.

In an example, each of the coil units 230-1 to 230-4 may have a cavity (or a hole). For example, each of the coil units 230-1 to 230-4 may have a closed-curve or ring shape having a cavity. The cavity in each of the coil units 230-1 to 230-4 may overlap the first magnet 130 or 130A or the second surface 3D or 3D1 (or the first surface 3C or 3C1) of the first magnet 130 or 130A in a direction parallel to a line that is perpendicular to the optical axis and extends through the optical axis or in the diagonal direction.

In an example, the second coil 230 may include two coil units 230-1 and 230-3 facing each other in a first diagonal direction and two coil units 230-2 and 230-4 facing each other in a second diagonal direction. Here, the coil unit oriented in the first diagonal direction may correspond to, face, or overlap the magnet unit in the first diagonal direction, and the OIS operation unit may be moved in the first diagonal direction by electromagnetic force between the two components. In addition, the coil unit oriented in the second diagonal direction may correspond to, face, or overlap the magnet unit in the second diagonal direction, and the OIS operation unit may be moved in the second diagonal direction by electromagnetic force between the two components.

For example, the first diagonal direction may be a direction from the first corner CA1 (or the third corner CA3) of the cover member 300 toward the third corner CA3 (or the first corner CA1) of the cover member 300. The second diagonal direction may be a direction from the second corner CA2 (or the fourth corner CA4) of the cover member 300 toward the fourth corner CA4 (or the second corner CA2) of the cover member 300, and may be perpendicular to the first diagonal direction.

In another embodiment, one of the two coil units 230-1 and 230-3 facing each other in the first diagonal direction and one of the two coil units 230-2 and 230-4 facing each other in the second diagonal direction may be omitted. For example, the second coil 230 may include only one coil unit (e.g. 230-3) oriented in the first diagonal direction and one coil unit (e.g. 230-4) oriented in the second diagonal direction.

Electromagnetic forces generated by interaction between the coil units 230-1 and 230-3 facing each other in the first diagonal direction and the first and third magnet units 130-1 and 130-3 corresponding thereto may be exerted in the same direction (e.g. the first diagonal direction). In addition, electromagnetic forces generated by interaction between the coil units 230-2 and 230-4 facing each other in the second diagonal direction and the second and fourth magnet units 130-2 and 130-4 corresponding thereto may be exerted in the same direction (e.g. the second diagonal direction).

The OIS operation unit (e.g. the housing 140) may be moved in a direction perpendicular to the optical axis, for example, in the first diagonal direction or the second diagonal direction, by interaction between the first magnet units 130-1 to 130-4 and the coil units 230-1 to 230-4 to which drive signals are supplied. The controller 830 or 780 may control movement of the OIS operation unit in this way, thereby performing hand-tremor compensation for the camera device.

Referring to FIGS. 17A and 17B, the circuit board 310 may include pads 17A to 17H, which are conductively connected to the coil units 230-1 to 230-4. Here, the pads 17A to 17H may alternatively be referred to as "terminals". FIG. 17A is a perspective view viewed from the front, and FIG. 17B is a perspective view viewed from the rear.

In an example, the pads 17A to 17H may be formed on the first surface 310A of the circuit board 310. For example, the pads 17A to 17D may be formed on the first surface 310A of at least one of the fixed portions 10A to 10D or the seating portions 31A to 31D of the circuit board 310.

In an example, one end of the first coil unit 230-1 may be connected to the first pad 17A, and the other end of the first coil unit 230-1 may be connected to the second pad 17B. One end of the third coil unit 230-3 may be connected to the third pad 17C, and the other end of the third coil unit 230-3 may be connected to the fourth pad 17D.

In addition, in an example, one end of the second coil unit 230-2 may be connected to the fifth pad 17E, and the other end of the second coil unit 230-2 may be connected to the sixth pad 17F. One end of the fourth coil unit 230-4 may be connected to the seventh pad 17G, and the other end of the fourth coil unit 230-4 may be connected to the eighth pad 17H.

The circuit board 250 may include pads Y1 to Y8, which are coupled and conductively connected to the pads 17A to 17H of the circuit board 310. In an example, the pads Y1 to Y8 may be formed on the body 252 of the circuit board 250. For example, the pads Y1 to Y8 may be formed on the upper surface of the body 252 of the circuit board 250.

In an example, each of the pads Y1 to Y8 of the circuit board 250 may be coupled and conductively connected to a corresponding one of the pads 17A to 17H of the circuit board 310 by means of a solder or a conductive adhesive.

In an example, the two coil units 230-1 and 230-3 facing each other in the first diagonal direction may be connected to each other in series, and the two coil units 230-2 and 230-4 facing each other in the second diagonal direction may be connected to each other in series.

In an example, the second pad Y2 and the third pad Y3 of the circuit board 250 may be conductively connected to each other via a first circuit pattern (or a first line) formed within the circuit board 250. Accordingly, the two coil units 230-1 and 230-3 facing each other in the first diagonal direction may be connected to each other in series via the first to fourth pads Y1 to Y4 of the circuit board 250.

In an example, a first drive signal for the two coil units 230-1 and 230-3 facing each other in the first diagonal direction may be supplied to the first pad Y1 and the fourth pad Y4 of the circuit board 250. In an example, the first pad Y1 and the fourth pad Y4 of the circuit board 250 may be conductively connected to two terminals to which the first drive signal is supplied, among the terminals 251-1 to 251-$n$ of the circuit board 250.

In addition, in an example, the sixth pad Y6 and the seventh pad Y7 of the circuit board 250 may be conductively connected to each other via a second circuit pattern (or a second line) formed within the circuit board 250. Accordingly, the two coil units 230-2 and 230-4 facing each other in the second diagonal direction may be connected to each other in series via the fifth to eighth pads Y5 to Y8 of the circuit board 250.

In an example, a second drive signal for the two coil units 230-2 and 230-4 facing each other in the second diagonal direction may be supplied to the fifth pad Y5 and the eighth pad Y8 of the circuit board 250. The second drive signal may be an independent signal different from the first drive signal.

In an example, the fifth pad Y5 and the eighth pad Y8 of the circuit board 250 may be conductively connected to two other terminals to which the second drive signal is supplied, among the terminals 251-1 to 251-$n$ of the circuit board 250.

In another embodiment, each of the first to fourth coil units 230-1 to 230-4 may be separated from or independent of the others, and different independent signals may be supplied to the respective first to fourth coil units 230-1 to 230-4. For example, a first drive signal may be supplied to the first and second pads Y1 and Y2 of the circuit board 250, a second drive signal may be supplied to the third and fourth pads Y3 and Y4 of the circuit board 250, a third drive signal may be supplied to the fifth and sixth pads Y5 and Y6 of the circuit board 250, and a fourth drive signal may be supplied to the seventh and eighth pads Y7 and Y8 of the circuit board 250. Each of the first to fourth drive signals may be an individual and independent signal. In an example, the first to eighth pads Y1 to Y8 of the circuit board 250 may be conductively connected to the terminals to which the first to fourth drive signals are supplied, among the terminals 251-1 to 251-$n$ of the circuit board 250.

In the configuration shown in FIGS. 17A and 17B, the pads 17A to 17H of the circuit board 310 are conductively connected to the pads Y1 to Y8 of the circuit board 250, and drive signals are supplied to the coil units 230-1 to 230-4 through the terminals 251-1 to 251-$n$ of the circuit board 250, but the disclosure is not limited thereto.

In another embodiment, the circuit board 310 may include terminals conductively connected to the second coil units in order to supply drive signals to the second coil units 230-1 to 230-4. In this case, the terminals may not be conductively connected to the circuit board 250, but may be directly and conductively connected to the outside. To this end, the terminals of the circuit board 310 may be disposed on the second surface 310B of the circuit board 310, and may be exposed from the side plate 302 of the cover member 300.

The first sensor 240*a* and the second sensor 240*b* may not overlap the coil units 230-1 to 230-4 in the optical-axis direction.

Although the first sensor 240*a* and the second sensor 240*b* are illustrated in FIGS. 1 and 12 as being mounted on the lower surface of the circuit board 250 and disposed in the seating recesses 215-1 and 215-2 in the base 210, the disclosure is not limited thereto. In another embodiment, the second position sensor may be disposed on the circuit board 310, and in this case, the seating recesses 215-1 and 215-2 in the base 210 may be omitted.

In another embodiment, for example, the first sensor may be disposed on the third seating portion 31C of the circuit board 310 corresponding to the first magnet 130-3 or 130A-3, and the second sensor may be disposed on the fourth seating portion 31D of the circuit board 310 corresponding to the first magnet 130-4 or 130A-4. In another embodiment, at least a portion of the first sensor may overlap the first magnet 130-3 or 130A-3, and at least a portion of the second sensor may overlap the first magnet 130-4 or 130A-4 in a direction parallel to a line that is perpendicular to the optical axis and extends through the optical axis or in the diagonal direction.

In another embodiment, the second position sensor 240 may be disposed in the cavity in the second coil. For example, the first sensor may be disposed in the cavity in the third coil unit 230-3, and the second sensor may be disposed in the cavity in the fourth coil unit 230-4. In still another embodiment, the first sensor may be disposed outside the cavity in the third coil unit 230-3, and the second sensor may be disposed outside the cavity in the fourth coil unit 230-4.

Referring to FIGS. 13, 16, 17A, and 17B, the second coil 230 may be located inside the support member 220. In an example, the seating portions 31A to 31D of the circuit board 310 may be located inside the support member 220.

In an example, a separation distance from the optical axis OA to the second coil 230 may be shorter than a separation distance from the optical axis to the support member 220. Further, in an example, a separation distance from the optical axis OA to each of the seating portions 31A to 31D of the circuit board 310 may be shorter than a separation distance from the optical axis to the support member 220.

The second coil 230 may overlap at least a portion of the support member 220 in a direction parallel to a line that is perpendicular to the optical axis and extends through the optical axis or in the diagonal direction.

In an example, at least a portion of the second coil 230 may be disposed between the second surface 3D of a corresponding one of the magnet units 130-1 to 130-4 and a corresponding one of the support members 220-1 to 220-4.

In an example, each of the seating portions 31A to 31D of the circuit board 310 may overlap at least a portion of the support member 220 in a direction parallel to a line that is perpendicular to the optical axis and extends through the optical axis or in the diagonal direction.

The second coil 230 may be disposed in the recess 148 in the housing 140.

For example, each of the second coil units 230-1 to 230-4 may be disposed in a corresponding one of the recesses 148 formed in the corners 142-1 to 142-4 of the housing 140.

For example, the cavity in each of the second coil units 230-1 to 230-4 may be disposed so as to face the second surface 148-2 of the recess 148 and/or the second surface 3D of the first magnet 130.

Referring to FIG. 16, the lower end or the lower surface 33A of the second coil unit 230 (230-1 to 230-4) may be located at a higher position than the lower surface 3B or 3B1 of the first magnet 130 or 130A, but the disclosure is not limited thereto.

In another embodiment, the lower end or the lower surface 33A of the second coil unit 230 (230-1 to 230-4) may be located at the same height as or located at a lower position than the lower surface of the first magnet.

The lower surface 3B or 3B1 of the first magnet 130 or 130A may be located below or at a lower position than the lower end or the lower surface of the housing 140. In another embodiment, the lower surface of the first magnet may be located above or at a higher position than the lower end or the lower surface of the housing 140.

The height of a camera device is closely related to the height of a mobile phone, and there is a great demand for reducing the height of a camera device. However, it is not easy to reduce the height of a camera device due to limitations on reliability and technology of the camera device.

In a lens moving apparatus according to a comparative example, a second coil corresponding to the second coil of the present disclosure may be disposed between the upper surface of the circuit board 250 and the lower surface of the first magnet. In the comparative example, because the second coil is located on the circuit board 250 in the optical-axis direction, there is a limitation on the extent to which the heights of the lens moving apparatus and the camera device in the optical-axis direction are reduced.

In contrast, in the embodiment, the second coil is disposed between the second surface 3D or 3D1 of the first magnet 130 or 130A and the side plate 302 of the cover member 300, rather than being disposed between the upper surface of the circuit board 250 and the lower surface of the first magnet. Accordingly, the embodiment may reduce the size (e.g. the height) of the lens moving apparatus by the length of the second coil in the optical-axis direction compared to the comparative example.

In addition, in the lens moving apparatus according to the comparative example, a first magnet corresponding to the first magnet 130 or 130A of the present disclosure may be disposed between the side portion of the housing and the side plate of the cover member. In the comparative example, because the first magnet is disposed on the side portion of the housing 140, the size of the bore in the bobbin is restricted by the first magnet, and thus there is a limitation in mounting a large-aperture lens.

In contrast, in the embodiment, the first magnet 130 or 130A may be disposed on a corresponding one of the corner portions 142-1 to 142-4 of the housing 140, and may include a portion that decreases in length in the transverse direction (e.g. M1) so as to have a shape suitable for disposition on a corresponding one of the corner portions 142-1 to 142-4. In addition, in the embodiment, the second coil 230 may be disposed between a corresponding one of the corner portions 142-1 to 142-4 of the housing 140 and the side plate 302 of the cover member 300. Accordingly, the embodiment may increase the size of the bore 110a in the bobbin 110, in which a lens is mounted, and may enable mounting of a large-aperture lens therein.

Figure 18:
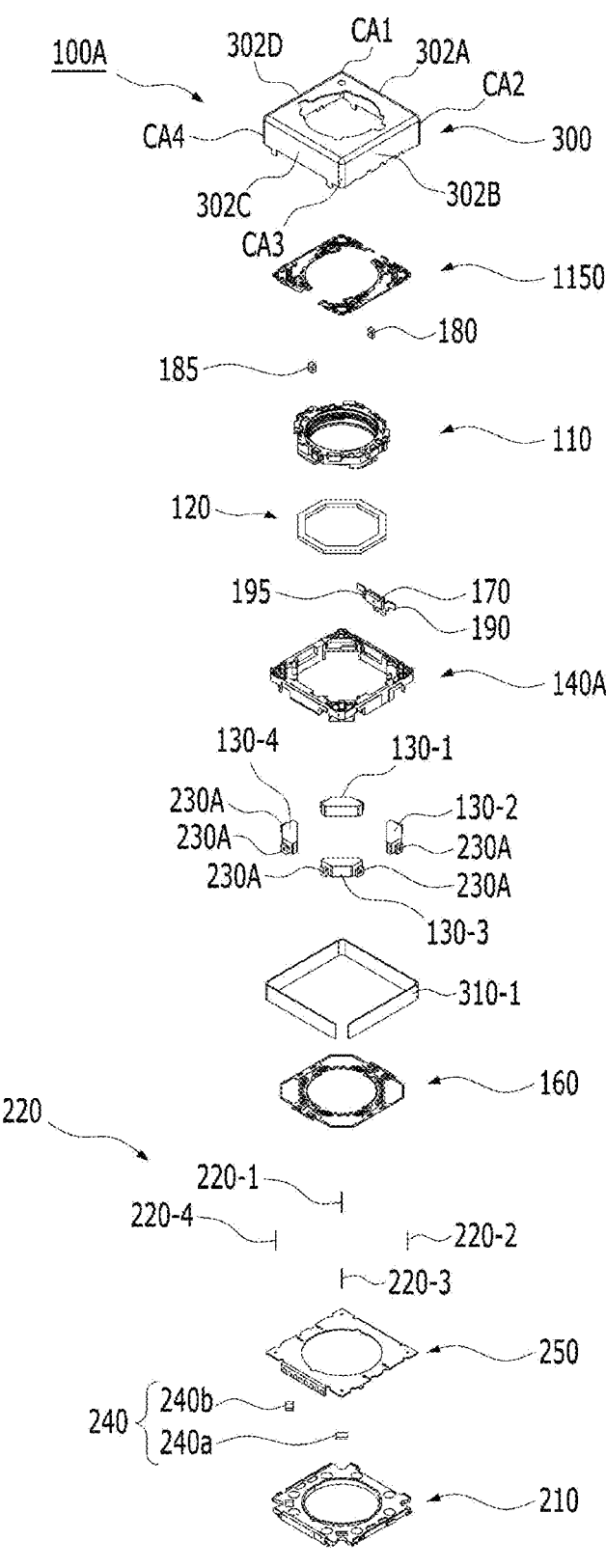
FIG. 18 is an exploded perspective view of a lens moving apparatus according to another embodiment.
Figure 19:
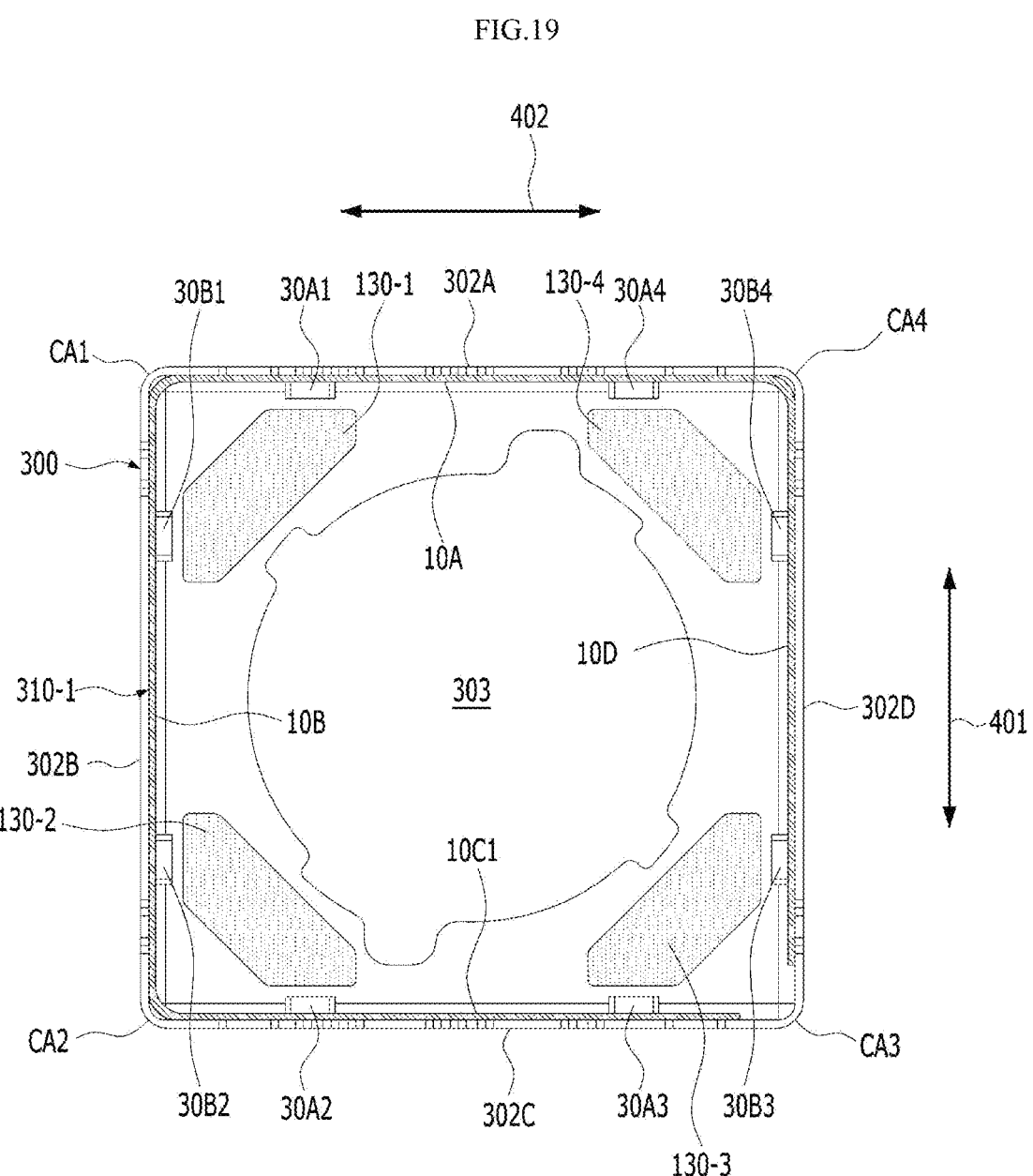
FIG. 19 is a bottom view of the first magnet, the second coil, the circuit board, and the cover member shown in FIG. 18.
Figure 20:
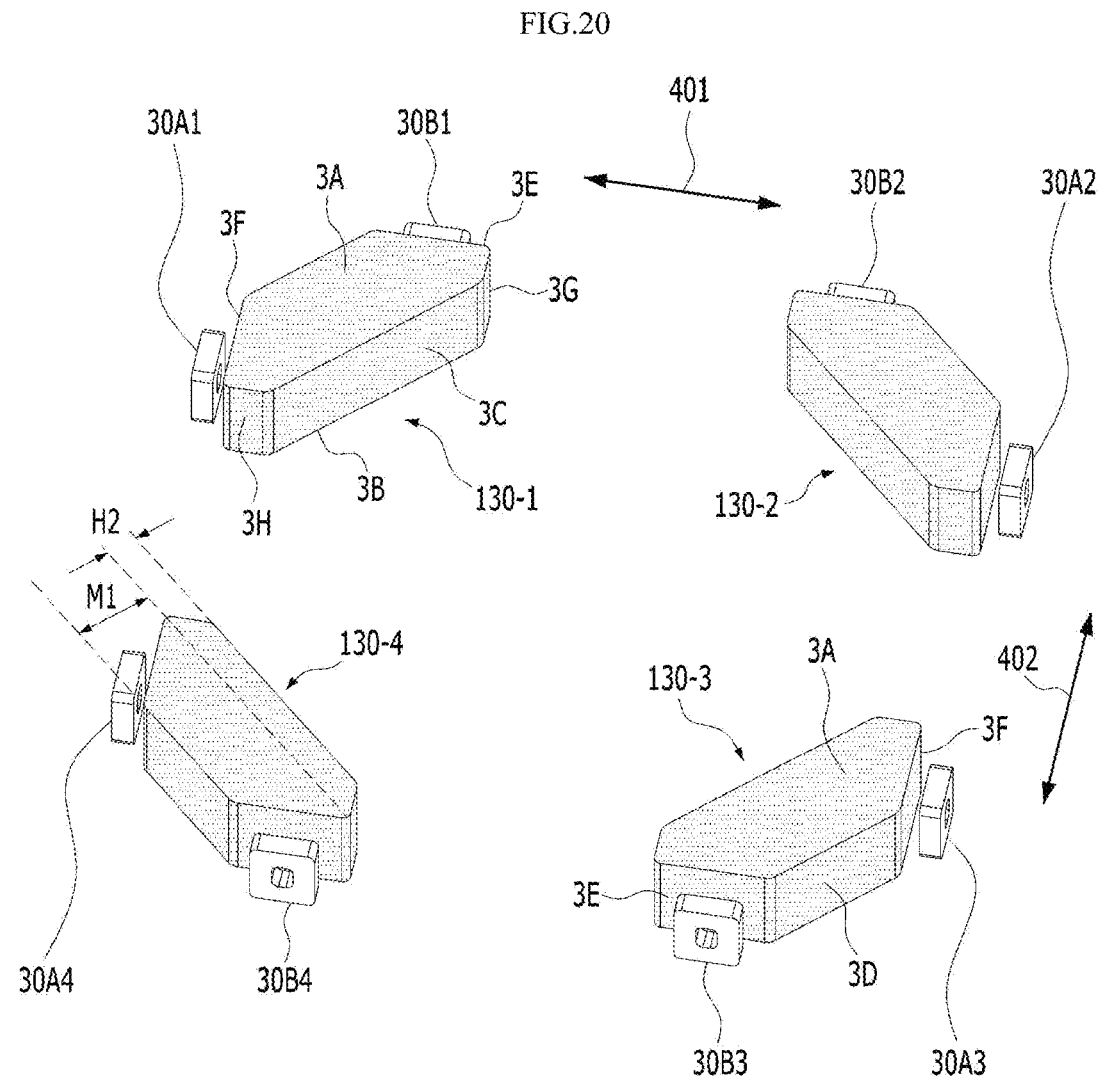
Figure 21:
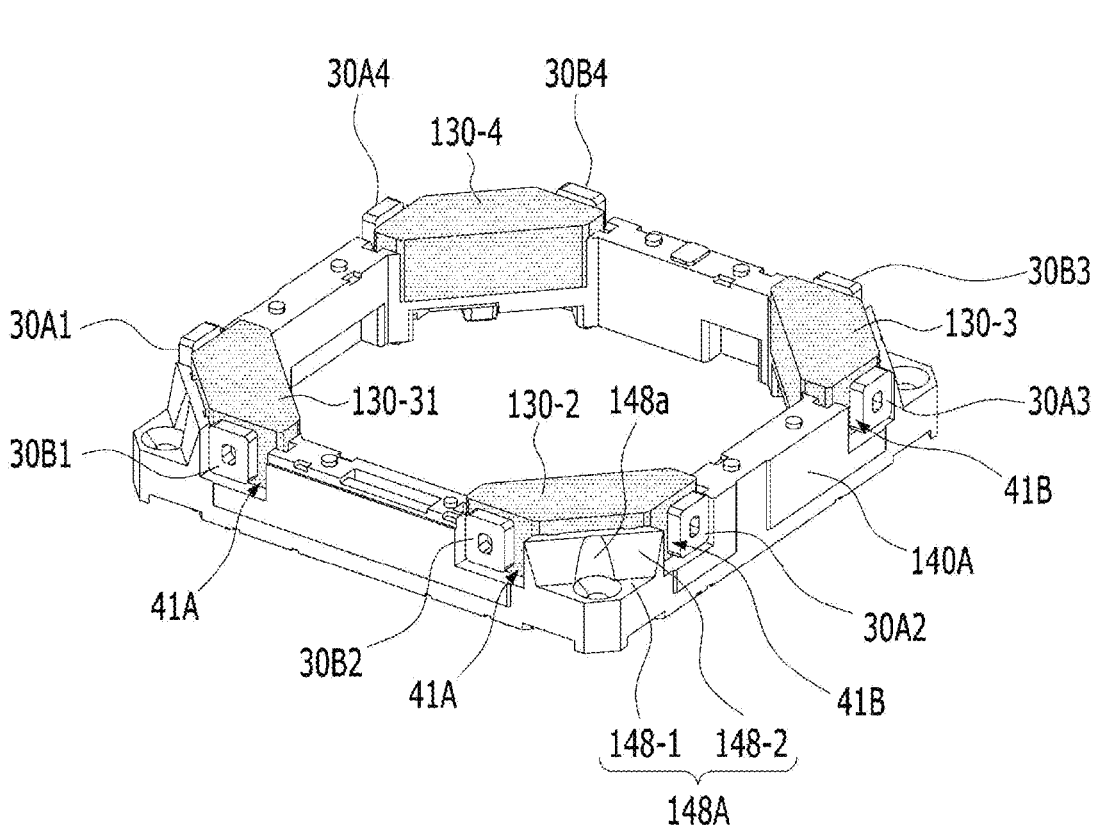
FIG. 21 is a bottom view of the housing, the first magnet, and the second coil shown in FIG. 18.
Figure 22A:
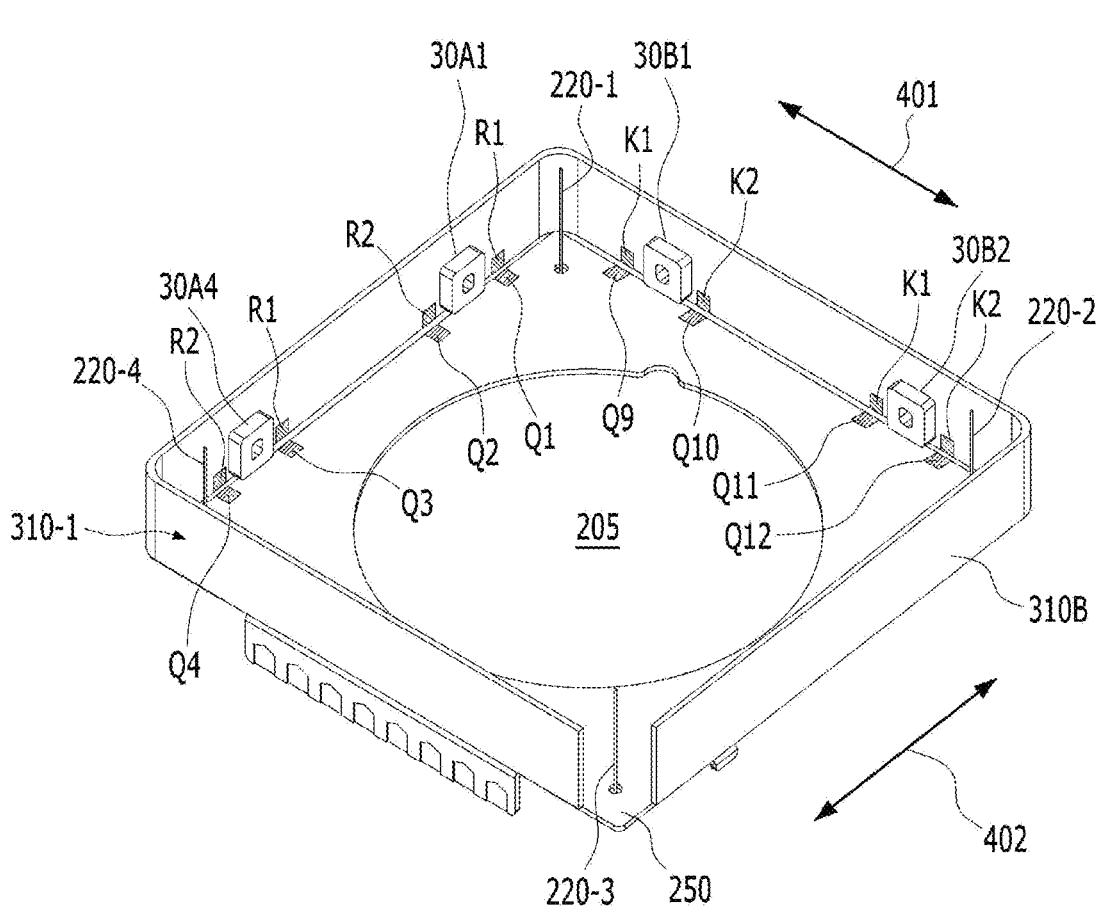
FIG. 22A is a first perspective view of the first circuit board, coil units of the second coil, the support member, and the second circuit board shown in FIG. 18.
Figure 22B:
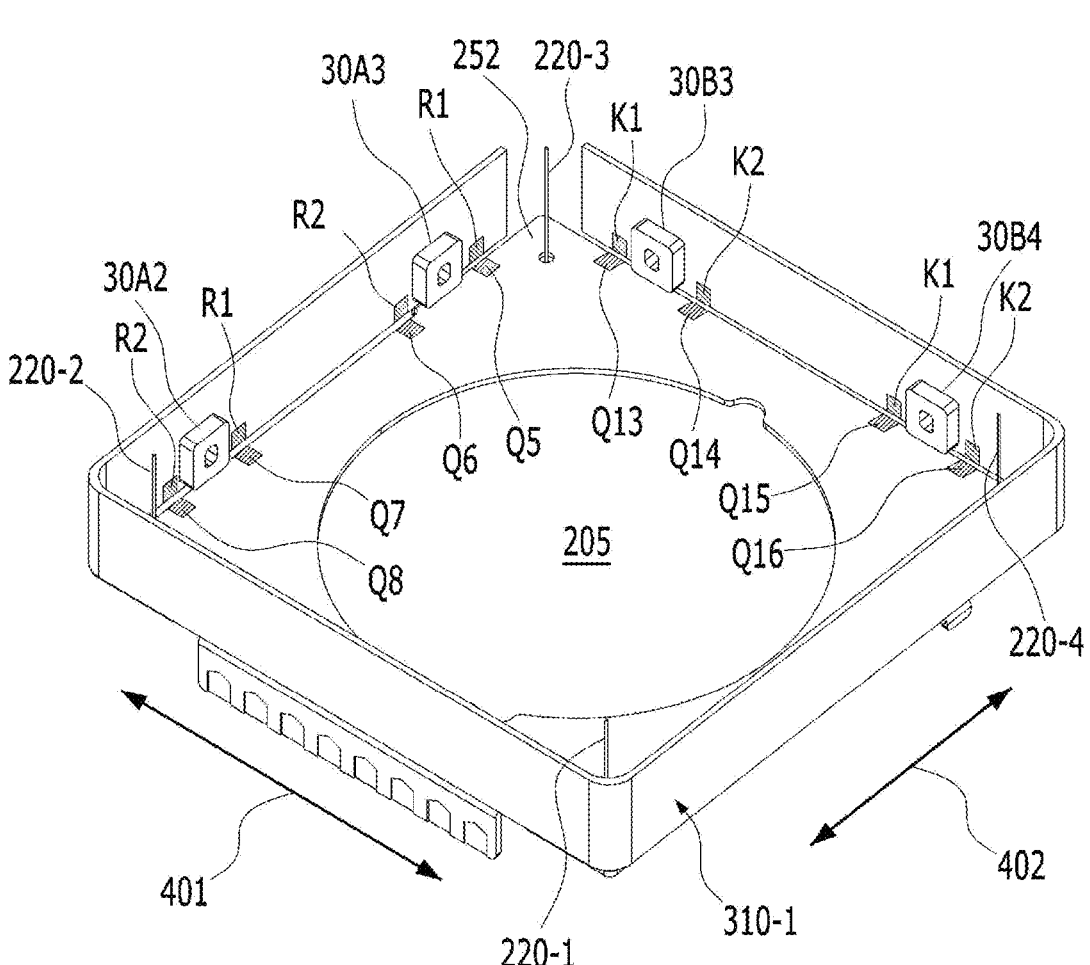
FIG. 22B is a second perspective view of the first circuit board, the second coil units, the support member, and the second circuit board shown in FIG. 18.

FIG. 18 is an exploded perspective view of a lens moving apparatus 100A according to another embodiment, FIG. 19 is a bottom view of the first magnet 130, the second coil 230A, the circuit board 310-1, and the cover member 300 shown in FIG. 18, FIG. 20 is a view showing disposition of the first magnet 130 and the second coil 230A according to the embodiment shown in FIG. 18, FIG. 21 is a bottom view of the housing 140, the first magnet 130, and the second coil 230A shown in FIG. 18, FIG. 22A is a first perspective view of the circuit board 310-1, coil units 30A1 to 30A4 and 30B1 to 30B4 of the second coil 230A, the support member 220, and the circuit board 250 shown in FIG. 18, and FIG. 22B is a second perspective view of the circuit board 310-1, the second coil units 230-1A to 230-4A, the support member 220, and the circuit board 250 shown in FIG. 18.

In FIGS. 18 to 22B, the same reference numerals as those in FIGS. 1 to 17 denote the same components, and the above description of the respective components made with reference to FIGS. 1 to 17 may be applied to the same components. In addition, the first magnet 130A shown in FIG. 14B may be applied to the embodiment shown in FIGS. 18 to 22B.

Referring to FIGS. 18 to 22B, the coil 230A may be disposed between the first magnet 130 and the side plate 302 of the cover member 300.

At least a portion of the second coil 230A may face or overlap the first magnet 130 or 130A in a first horizontal direction 401 and/or a second horizontal direction 402.

Here, the first horizontal direction 401 may be a direction parallel to the first side plate 302A (or the third side plate 302C) of the cover member 300, and the second horizontal direction 402 may be a direction parallel to the second side plate 302B (or the fourth side plate 302D) of the cover member 300.

For example, the first horizontal direction 401 may be a direction from the second side plate 302B (or the fourth side plate 302D) of the cover member 300 toward the opposite fourth side plate 302D (or the second side plate 302B) of the cover member 300.

For example, the second horizontal direction 402 may be a direction from the first side plate 302A (or the third side plate 302C) of the cover member 300 toward the opposite third side plate 302C (or the first side plate 302A) of the cover member 300. For example, the second horizontal direction 402 may be perpendicular to the first horizontal direction 401.

In an example, the second coil 230A may include two coil units corresponding to at least one of the first magnet units 130-1 to 130-4.

For example, the second coil 230A may include first coil units 30A1 to 30A4 and second coil units 30B1 to 30B4 corresponding to the respective first magnet units 130-1 to 130-4.

The first coil units 30A1 to 30A4 may alternatively be referred to as "first-horizontal-direction coil units" or "second-direction coil units". The first coil units 30A1 to 30A4 may correspond to, face, or overlap the magnet units in the first horizontal direction, and may move the OIS operation unit in the first horizontal direction 401 using interaction with the corresponding magnet units.

The second coil units 30B1 to 30B4 may alternatively be referred to as "second-horizontal-direction coil units" or "third-direction coil units". The second coil units 30B1 to 30B4 may correspond to, face, or overlap the magnet units in the second horizontal direction, and may move the OIS operation unit in the second horizontal direction 402 using interaction with the corresponding magnet units.

In addition, the OIS operation unit may be tilted or rotated by a predetermined angle about the optical axis by interaction between the first coil units 30A1 to 30A4, the second coil units 30B1 to 30B4, and the magnet units corresponding thereto.

In an example, each of the first coil units 30A1 to 30A4 may be disposed so as to correspond to, face, or overlap the first side surface of the first magnet 130 or 130A corresponding thereto in the first horizontal direction 401.

Each of the second coil units 30B1 to 30B4 may be disposed so as to correspond to, face, or overlap the second side surface of the first magnet 130 or 130A corresponding thereto in the second horizontal direction.

In an example, the first side surface of the first magnet 130 or 130A may be one of the third surface 3E or 3E1 and the fourth surface 3F or 3F1 of the first magnet, and the second side surface of the first magnet 130 or 130A may be the other of the third surface 3E or 3E1 and the fourth surface 3F or 3F1 of the first magnet 130 or 130A.

In an example, the first side surface of the first magnet 130 or 130A may be a surface corresponding to or facing the second side plate 302B or the fourth side plate 302D of the cover member 300, and the second side surface of the first magnet 130 or 130A may be a surface corresponding to or facing the first side plate 302A or the third side plate 302C of the cover member 300.

Each of the first coil units 30A1 to 30A4 may overlap the first surface 3C or 3C1 of the first magnet 130 or 130A in the first horizontal direction 401, and each of the second coil units 30B1 to 30B4 may overlap the first surface 3C or 3C1 of the first magnet 130 or 130A in the second horizontal direction 402.

In an example, each of the first coil units 30A1 to 30A4 and each of the second coil units 30B1 to 30B4 may not overlap the second surface 3D or 3D1 of the first magnet 130 or 130A in at least one of the first horizontal direction 401 or the second horizontal direction 402.

The first coil units 30A1 and 30A2 corresponding to the first and second magnet units 130-1 and 130-2 may face or overlap the first coil units 30A3 and 30A4 corresponding to the third and fourth magnet units 130-3 and 130-4 in the first horizontal direction 401.

The second coil units 30B1 and 30B2 corresponding to the first and second magnet units 130-1 and 130-2 may face or overlap the second coil units 30B3 and 30B4 corresponding to the third and fourth magnet units 130-3 and 130-4 in the second horizontal direction 402.

In an example, each of the first coil units 30A1 to 30A4 and each of the second coil units 30B1 to 30B4 may not overlap the magnet 130 or 130A in the optical-axis direction.

The first coil units 30A1 to 30A4 and the second coil units 30B1 to 30B4 may be disposed on, coupled to, or fixed to the first surface 310A of the circuit board 310-1. In addition, the first and second coil units 30A1 to 30A4 and 30B1 to 30B4 may be conductively connected to the circuit board 310-1.

At least a portion of the circuit board 310-1 may be coupled to the cover member 300. For example, at least a portion of the circuit board 310-1 may be coupled, attached, or fixed to the inner surface of the side plate 302 of the cover member 300.

The circuit board 310-1 has a shape different from that of the circuit board 310. However, the description of the circuit board 310 may be applied to the circuit board 310-1. The corner portions of the circuit board 310-1 may be fixed or attached to the corners of the side plate of the cover member 300, but the disclosure is not limited thereto.

In the embodiment shown in FIG. 18, the circuit board 310-1 is coupled or fixed to the cover member 300, but the disclosure is not limited thereto. In another embodiment, at least a portion of the circuit board 310-1 may be coupled or fixed to the base 210. In an example, the base 210 may include a fixing portion, which is coupled to the circuit board 310-1 or functions to fix the circuit board 310-1. In an example, the fixing portion may be formed as a protruding portion protruding upwards from the upper surface of the base 210.

In an example, power or a drive signal may be supplied to the coil units 30A1 to 30A4 and 30B1 to 30B4 through the circuit board 310-1. Each of the coil units 30A1 to 30A4 and 30B1 to 30B4 may be embodied as a coil block, which is provided separately from the circuit board 310-1, but the disclosure is not limited thereto. In another embodiment, the first and second coil units 30A1 to 30A4 and 30B1 to 30B4 of the second coil 230A may be directly formed in an FP coil type within the circuit board 310-1.

In an example, each of the first and second coil units 30A1 to 30A4 and 30B1 to 30B4 may have a polygonal (e.g. rectangular) shape, without being limited thereto, and may alternatively have a circular or elliptical shape.

In an example, each of the coil units 30A1 to 30A4 and 30B1 to 30B4 may have a cavity (or hole). For example, each of the coil units 30A1 to 30A4 and 30B1 to 30B4 may have a closed-curve or ring shape having a cavity. The cavity in each of the coil units 30A1 to 30A4 and 30B1 to 30B4 may face or overlap the third and fourth surfaces 3E or 3E1 and 3F or 3F1 of the corresponding magnet unit in the first horizontal direction 401 or the second horizontal direction 402.

The OIS operation unit (e.g. the housing 140) may be moved in a direction perpendicular to the optical axis, for example, in the first horizontal direction 401, the second horizontal direction 402, the first diagonal direction, or the second diagonal direction, by interaction between the first magnet units 130-1 to 130-4 and the coil units 30A1 to 30A4 and 30B1 to 30B4 to which drive signals are supplied. The controller 830 or 780 may control movement of the OIS operation unit in this way, thereby performing hand-tremor compensation for the camera device.

Referring to FIG. 21, in order to avoid spatial interference with the first and second coil units 30A1 to 30A4 and 30B1 to 30B4, recesses 41A and 41B or holes may be formed in the housing 140.

In an example, the first and second recesses 41A and 41B may be formed in the corner portions 142-1 to 142-4 of the housing 140. In another embodiment, the first and second recesses 41A and 41B may be formed in the corner portions 142-1 to 142-4 and the side portions 141-1 to 141-4 of the housing 140.

In an example, the first recess 41A may be formed in one side of each of the corner portions 142-1 to 142-4 of the housing 140 in order to avoid spatial interference with the first coil units 30A1 to 30A4, and the second recess 41B may be formed in the opposite side of each of the corner portions 142-1 to 142-4 of the housing 140 in order to avoid spatial interference with the second coil units 30B1 to 30B4.

In an example, the first recess 41A and the second recess 41B may be recessed in the outer surface of each of the corner portions 142-1 to 142-4 (or the outer surface of each of the side portions 141-1 to 141-4) of the housing 140.

In an example, each of the first recess 41A and the second recess 41B may be connected to or communicate with the seating portion 141a in the housing 140, but the disclosure is not limited thereto. In another embodiment, each of the first recess and the second recess may not communicate with the seating portion 141a, and a portion of the housing 140 may be disposed between the first and second recesses.

At least a portion of the first coil unit 30A may be disposed in the first recess 41A, and at least a portion of the second coil unit 30B may be disposed in the second recess 41B.

The lower ends or the lower surfaces of the first and second coil units 30A and 30B may be located at a higher position than the lower surface 3B or 3B1 of the first magnet 130 or 130A, but the disclosure is not limited thereto.

In another embodiment, the lower ends or the lower surfaces of the first and second coil units 30A and 30B may be located at the same height as or located at a lower position than the lower surface of the first magnet.

The housing 140A may include a recess 148A recessed in the outer surface of each of the corner portions 142-1 to 142-4, and the recess 148A may include a first surface 148-1 in which the hole 147 is formed and a second surface 148-2 located between the first surface 148-1 and the lower surface of each of the corner portions 142-1 to 142-4.

An escape recess 148a may be formed in the outer surface of each of the corner portions 142-1 to 1424, e.g. the second surface 148-2 of the recess 148, in order not only to form a passage through which each of the support members 220-1 to 220-4 extends but also to avoid spatial interference between the support members 220-1 to 220-4 and the corner portions 142-1 to 142-4 of the housing 140.

In an example, the escape recess 148a may be connected to the hole 147 in the housing 140, and may have a hemispherical or semi-elliptical shape, but the disclosure is not limited thereto. In addition, in an example, the lower portion or the lower end of the escape recess 148a may be connected to the lower surface of the housing 140. In an example, the diameter of the escape recess 148a may gradually decrease from above to below, but the disclosure is not limited thereto.

Referring to FIGS. 22A and 22B, the circuit board 310-1 may include pads R1, R2, K1, and K2, which are conductively connected to the first and second coil units 30A1 to 30A4 and 30B1 to 30B4 corresponding to the respective magnet units 130-1 to 130-4. Here, the pads R1, R2, K1, and K2 may alternatively be referred to as "terminals". FIG. 22A is a perspective view viewed from the front, and FIG. 22B is a perspective view viewed from the rear.

In an example, the circuit board 310-1 may include a first pad R1 conductively connected to one end of each of the first coil units 30A1 to 30A4, a second pad R2 conductively connected to the other end of each of the first coil units 30A1 to 30A4, a third pad K1 conductively connected to one end of each of the second coil units 30B1 to 30B4, and a fourth pad K2 conductively connected to the other end of each of the second coil units 30B1 to 30B4. For example, the number of respective first to fourth pads R1, R2, K1, and K2 may be four.

The first to fourth pads R1, R2, K1, and K2 may be formed on the first surface 310A of the circuit board 310-1.

The circuit board 250 may include pads Q1 to Q16, which are coupled and conductively connected to the pads R1, R2, K1, and K2 of the circuit board 310-1. In an example, the pads Q1 to Q16 may be formed on the body 252 of the circuit board 250. For example, the pads Q1 to Q16 may be formed on the upper surface of the body 252 of the circuit board 250.

In an example, each of the pads Q1 to Q16 of the circuit board 250 may be coupled and conductively connected to a corresponding one of the pads R1, R2, K1, and K2 of the circuit board 310-1 by means of a solder or a conductive adhesive.

In an example, the first-horizontal-direction (or second-direction) coil units 30A1 to 30A4 may be connected to each other in series. In an example, for serial connection, the second pad Q2 and the third pad Q3 of the circuit board 250 may be conductively connected to each other via a first circuit pattern (or a first line), the fourth pad Q4 and the fifth pad Q5 may be conductively connected to each other via a third circuit pattern (or a third line), and the sixth pad Q6 and the seventh pad Q7 may be conductively connected to each other via a fourth circuit pattern (or a fourth line). In addition, in an example, a first drive signal for driving of the first-horizontal-direction coil units 30A1 to 30A4 may be supplied to the first pad Q1 and the eighth pad Q8 of the circuit board 250. In addition, the first pad Q1 and the eighth pad Q8 may be conductively connected to terminals to which the first drive signal is supplied, among the terminals 251-1 to 251-n of the circuit board 250.

In addition, in an example, the second-horizontal-direction (or third-direction) coil units 30B1 to 30B4 may be connected to each other in series. In an example, for serial connection, the tenth pad Q10 and the eleventh pad Q11 of the circuit board 250 may be conductively connected to each other via a fifth circuit pattern (or a fifth line), the twelfth pad Q12 and the thirteenth pad Q13 may be conductively connected to each other via a sixth circuit pattern (or a sixth line), and the fourteenth pad Q14 and the fifteenth pad Q15 may be conductively connected to each other via a seventh circuit pattern (or a seventh line). In addition, in an example, a second drive signal for driving of the second-horizontal-direction coil units 30B1 to 30B4 may be supplied to the ninth pad Q9 and the sixteenth pad Q16 of the circuit board 250. In addition, the ninth pad Q9 and the sixteenth pad Q16 may be conductively connected to terminals to which the second drive signal is supplied, among the terminals 251-1 to 251-*n* of the circuit board 250.

In another embodiment, each of the first-horizontal-direction coil units 30A1 to 30A4 and each of the second-horizontal-direction coil units 30B1 to 30B4 may be separated from or independent of the others, and different independent signals may be supplied to the respective first-horizontal-direction coil units 30A1 to 30A4 and to the respective second-horizontal-direction coil units 30B1 to 30B4.

In an example, the first to sixteenth pads Q1 to Q16 of the circuit board 250 may be conductively connected to terminals to which drive signals for driving of the coil units 30A1 to 30A4 and 30B1 to 30B4 are supplied, among the terminals 251-1 to 251-*n* of the circuit board 250.

In another embodiment, the circuit board 310-1 may include terminals configured to supply drive signals to the first-horizontal-direction coil units 30A1 to 30A4 and the second-horizontal-direction coil units 30B1 to 30B4. In this case, the terminals may not be conductively connected to the circuit board 250, but may be directly and conductively connected to the outside. To this end, the terminals of the circuit board 310-1 may be disposed on the second surface 310B of the circuit board 310-1, and may be exposed from the side plate 302 of the cover member 300.

In another embodiment, the first coil unit and the second coil unit of the second coil 230A may be disposed so as to correspond to or face two magnet units selected from among the four magnet units 130-1 to 130-4, and may be disposed so as not to correspond to or face the two remaining magnet units.

Figure 23A:
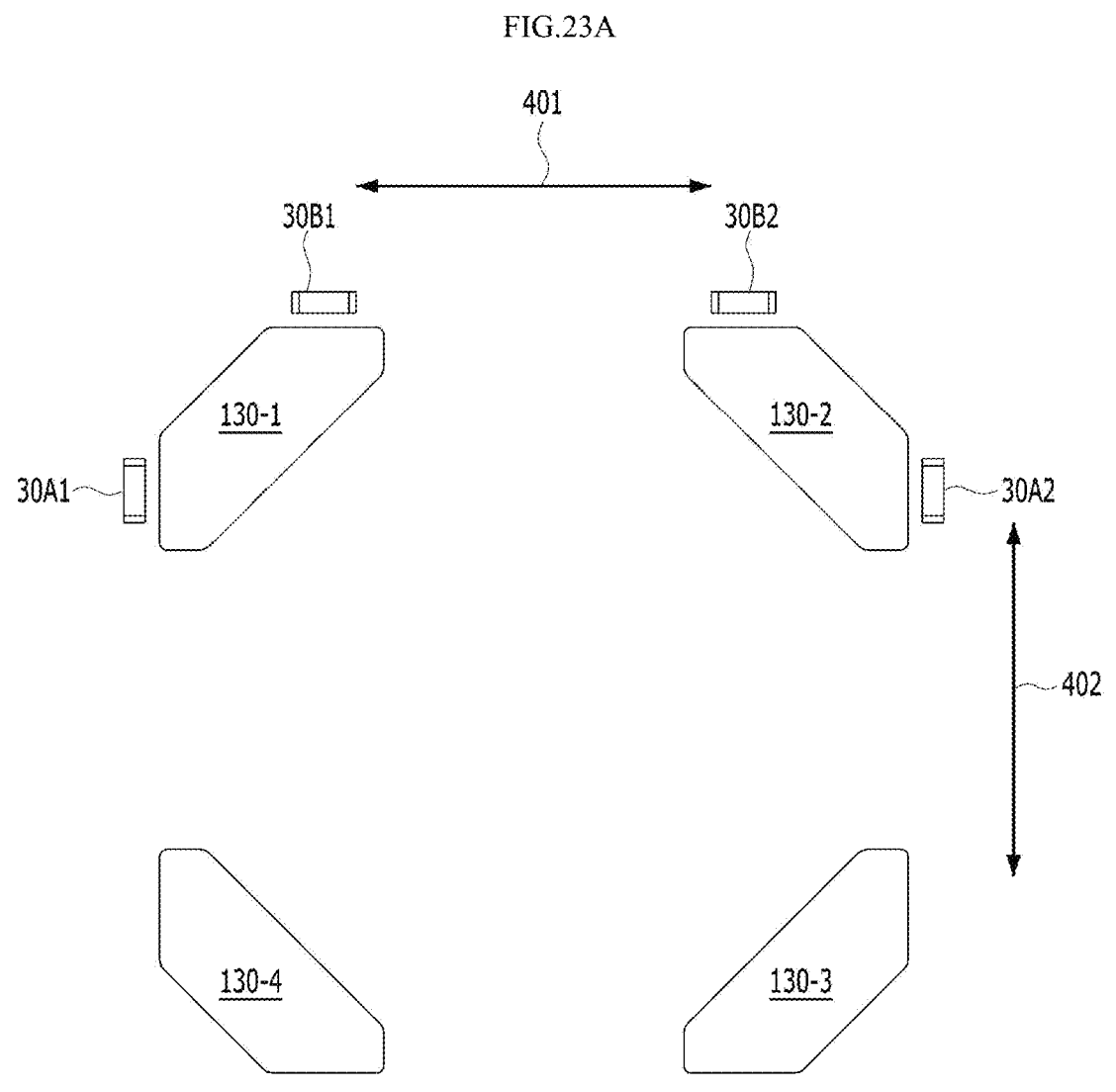

FIG. 23A is a view showing disposition of the magnet units 130-1 to 130-4 and the coil units 30A1, 30A2, 30B1, and 30B2 according to another embodiment.

Referring to FIG. 23A, the second coil 230A may include a first coil unit 30A1 and a second coil unit 30B1, which correspond to one (e.g. 130-1) of two magnet units (e.g. 130-1 and 130-2) facing each other in the first horizontal direction 401, and a first coil unit 30A2 and a second coil unit 30B2, which correspond to the other (e.g. 130-2) of the two magnet units 130-1 and 130-2.

In another embodiment, the second coil unit 230A may include a first coil unit and a second coil unit, which correspond to each of two other magnet units (e.g. 130-3 and 130-4) facing each other in the first horizontal direction 401.

Figure 23B:
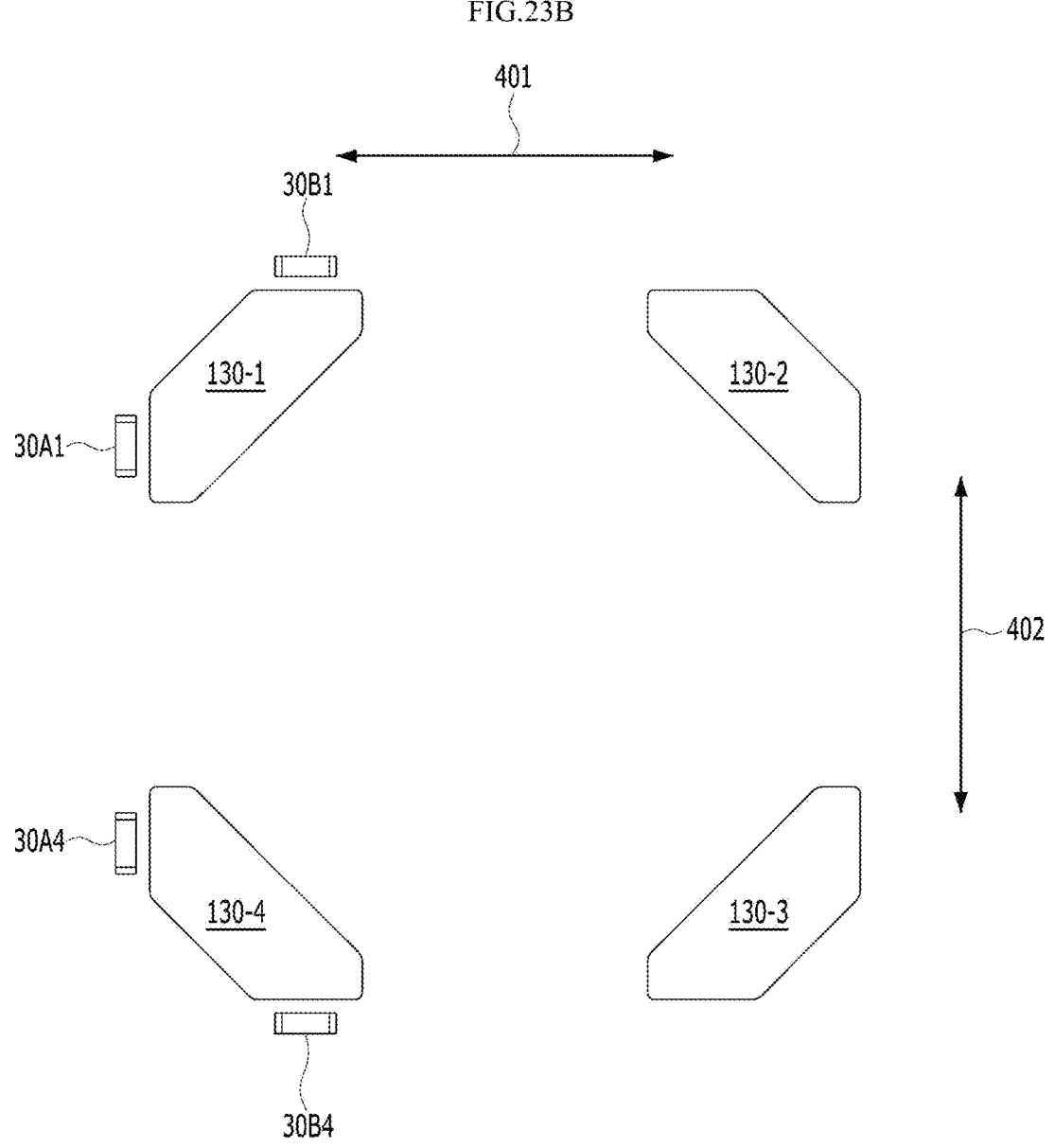

FIG. 23B is a view showing disposition of the magnet units 130-1 to 130-4 and the coil units 30A1, 30A4, 30B1, and 30B4 according to still another embodiment.

Referring to FIG. 23B, the second coil 230A may include a first coil unit 30A1 and a second coil unit 30B1, which correspond to one (e.g. 130-1) of two magnet units (e.g. 130-1 and 130-4) facing each other in the second horizontal direction 402, and a first coil unit 30A4 and a second coil unit 30B4, which correspond to the other (e.g. 130-4) of the two magnet units 130-1 and 130-4.

In another embodiment, the second coil unit 230A may include a first coil unit and a second coil unit, which correspond to each of two other magnet units (e.g. 130-2 and 130-3) facing each other in the second horizontal direction 402.

Figure 23C:
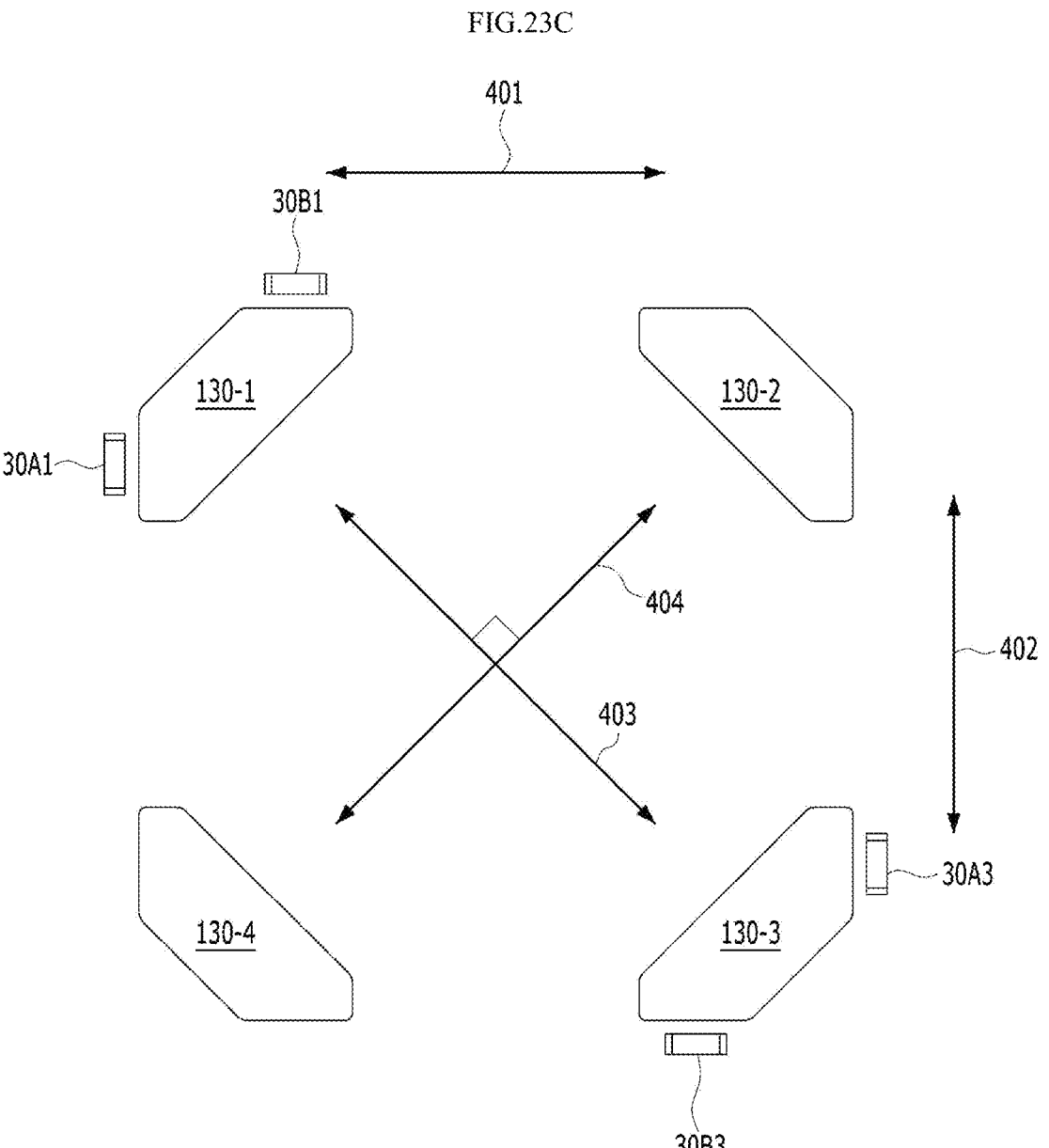

FIG. 23C is a view showing disposition of the magnet units 130-1 to 130-4 and the coil units 30A1, 30A3, 30B1, and 30B3 according to yet another embodiment.

Referring to FIG. 23C, the second coil 230A may include a first coil unit 30A1 and a second coil unit 30B1, which correspond to one (e.g. 130-1) of two magnet units (e.g. 130-1 and 130-3) facing each other in the first diagonal direction 403, and a first coil unit 30A3 and a second coil unit 30B3, which correspond to the other (e.g. 130-3) of the two magnet units 130-1 and 130-3.

In another embodiment, the second coil unit 230A may include a first coil unit and a second coil unit, which correspond to each of two magnet units (e.g. 130-2 and 130-4) facing each other in the second diagonal direction 404.

Figure 23D:
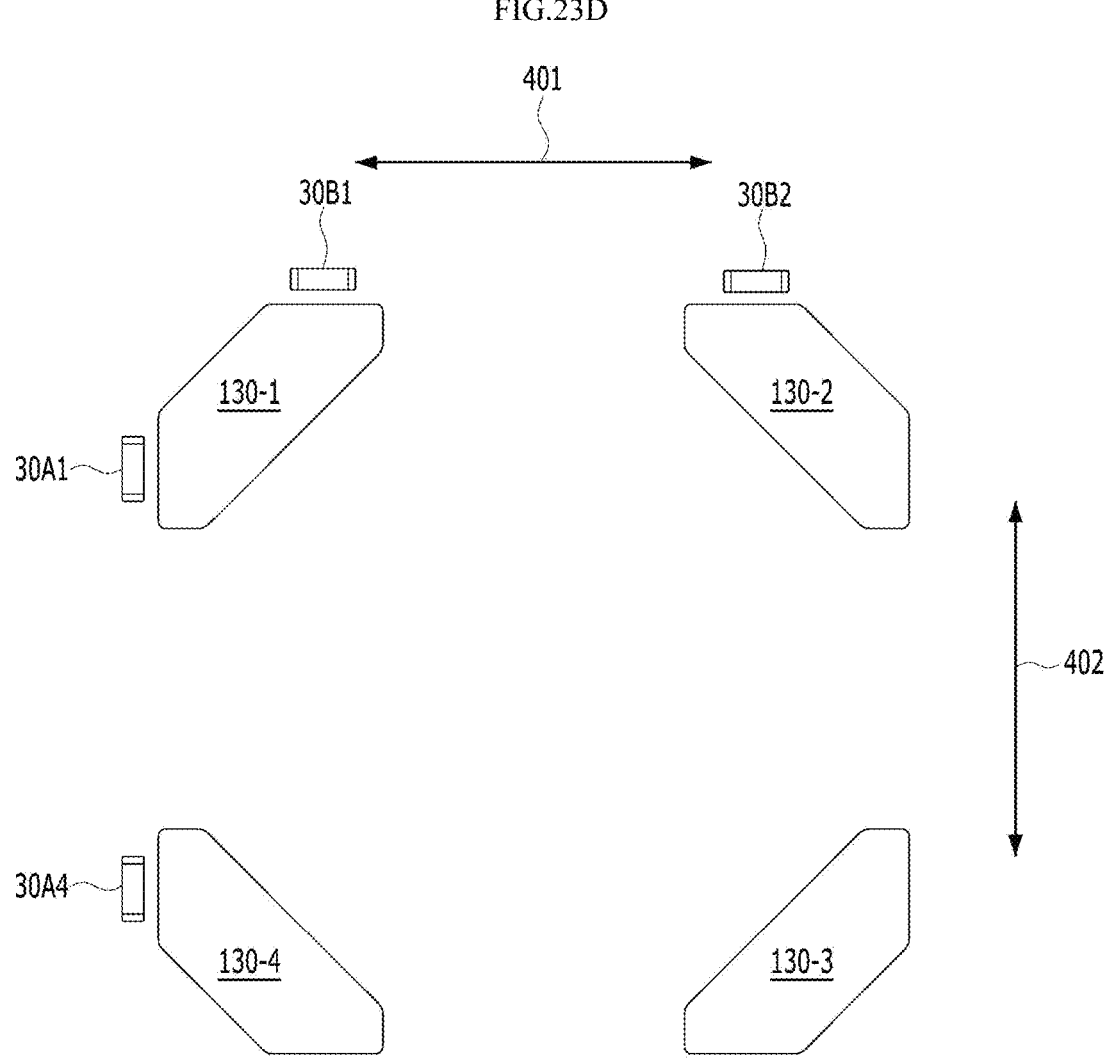

FIG. 23D is a view showing disposition of the magnet units 130-1 to 130-4 and the coil units 30A1, 30A4, 30B1, and 30B2 according to still yet another embodiment.

Referring to FIG. 23D, the second coil 230A may include a first coil unit 30A1 and a second coil unit 30B1, which correspond to one magnet unit (e.g. 130-1), a first coil unit 30A4, which corresponds to one (e.g. 130-4) of two magnet units 130-2 and 130-4 adjacent to the magnet unit 130-1, and a second coil unit 30B2, which corresponds to the other (e.g. 130-2) of the two magnet units 130-2 and 130-4 adjacent to the magnet unit 130-1.

In FIG. 23D, two coil units are disposed so as to correspond to the first magnet unit 130-1, but the disclosure is not limited thereto. In another embodiment, a first coil unit and a second coil unit may correspond to one selected from among the second to fourth magnet units 130-2 to 130-4, another first coil unit may correspond to one of two magnet units adjacent to the selected magnet unit, and another second coil unit may correspond to the other of the two magnetic units.

Figure 24A:
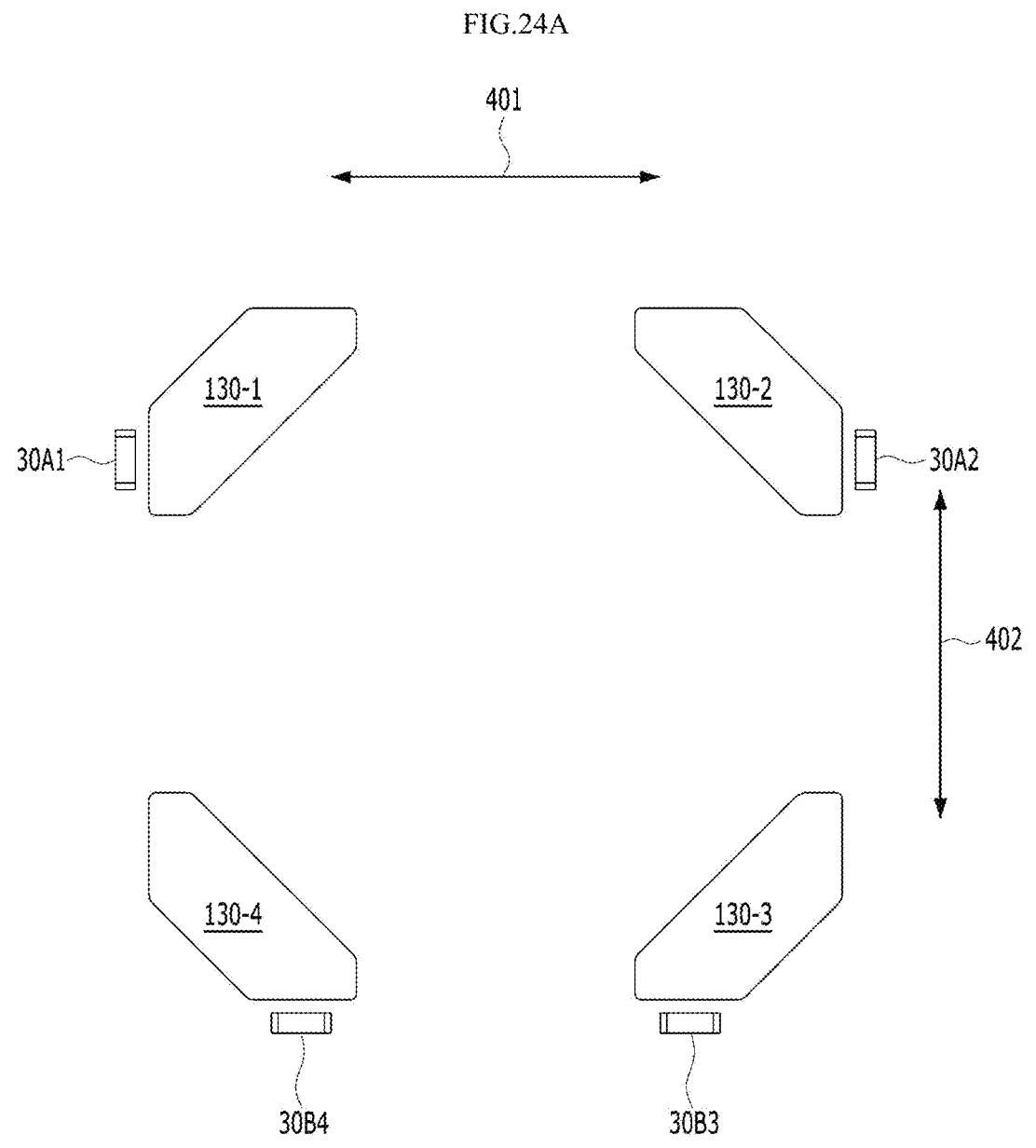

FIG. 24A is a view showing disposition of the magnet units 130-1 to 130-4 and the coil units 30A1, 30A2, 30B3, and 30B4 according to a further embodiment.

Referring to FIG. 24A, the second coil 230A may include first coil units 30A1 and 30A2 (or 30A3 and 30A4), which respectively correspond to two magnet units 130-1 and 130-2 (or 130-3 and 130-4) facing each other in the first horizontal direction 401, and second coil units 30B3 and 30B4 (or 30B1 and 30B2), which respectively correspond to the two remaining magnet units 130-3 and 130-4 (or 130-1 and 130-2) facing each other in the first horizontal direction 401.

In another embodiment, the second coil 230A may include first coil units, which respectively correspond to two magnet units (e.g. 130-2 and 130-3) (or 130-1 and 130-4) facing each other in the second horizontal direction 402, and second coil units, which respectively correspond to the two remaining magnet units (e.g. 130-1 and 130-4)(or 130-2 and 130-3) facing each other in the second horizontal direction 402.

Figure 24B:
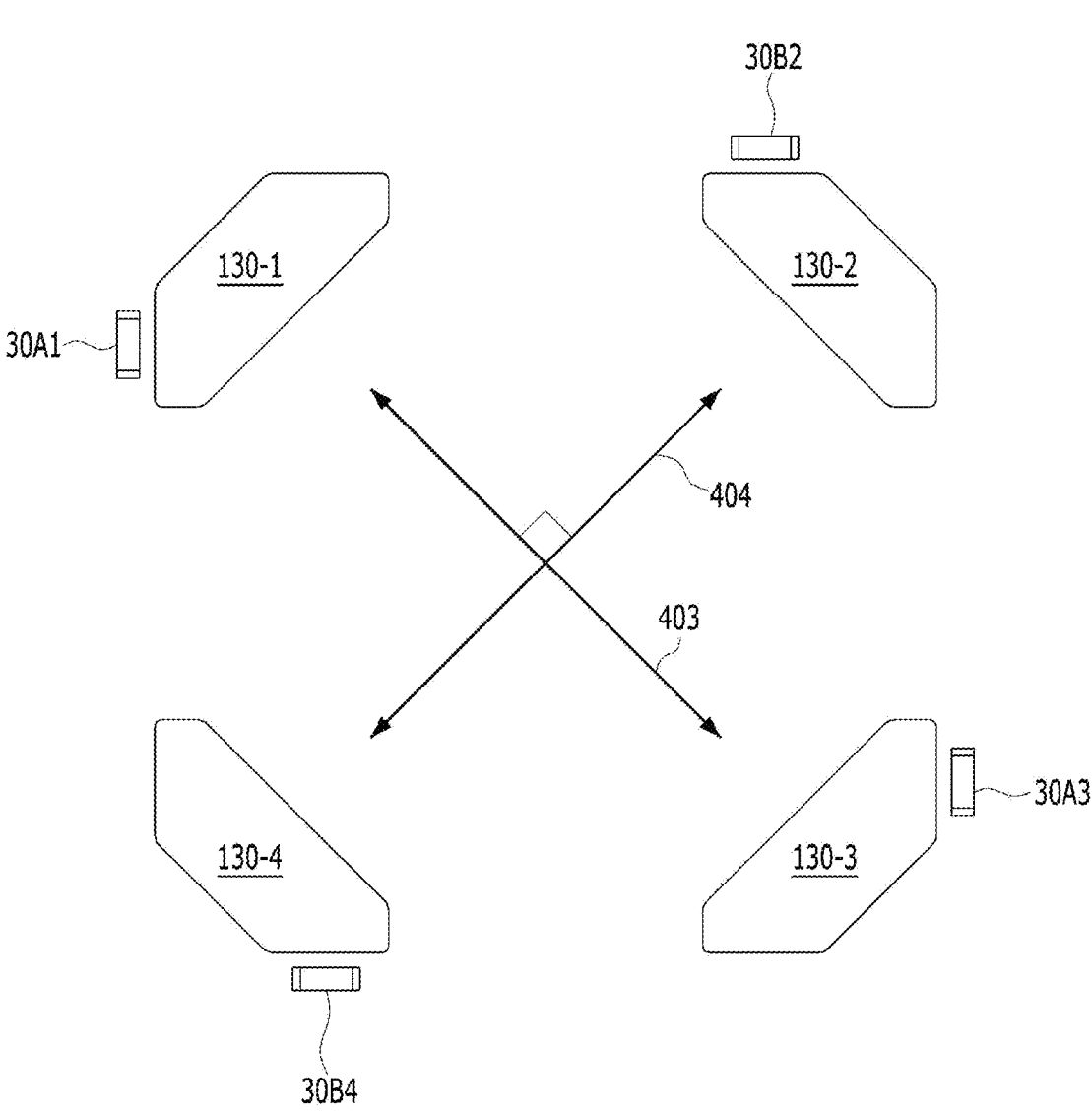

FIG. 24B is a view showing disposition of the magnet units 130-1 to 130-4 and the coil units 30A1, 30B2, 30A3, and 30B4 according to another further embodiment.

Referring to FIG. 24B, the second coil 230A may include first coil units 30A1 and 30A3, which respectively correspond to two magnet units 130-1 and 130-3 facing each other in the first diagonal direction 403, and second coil units 30B2 and 30B4, which respectively correspond to the two remaining magnet units 130-2 and 130-4 facing each other in the second diagonal direction 404.

In another embodiment, the second coil 230A may include first coil units, which respectively correspond to two magnet units 130-2 and 130-4 facing each other in the second diagonal direction 404, and second coil units, which respectively correspond to the two remaining magnet units 130-1 and 130-3 facing each other in the first diagonal direction 403.

In FIGS. 24A and 24B, the second coil 230A may include a total of two first coil units and a total of two second coil units. In addition, for example, in FIGS. 1, 18, 24A, and 24B, the first coil units and the second coil units may be disposed to be rotationally symmetric about the optical axis.

Figure 25A:
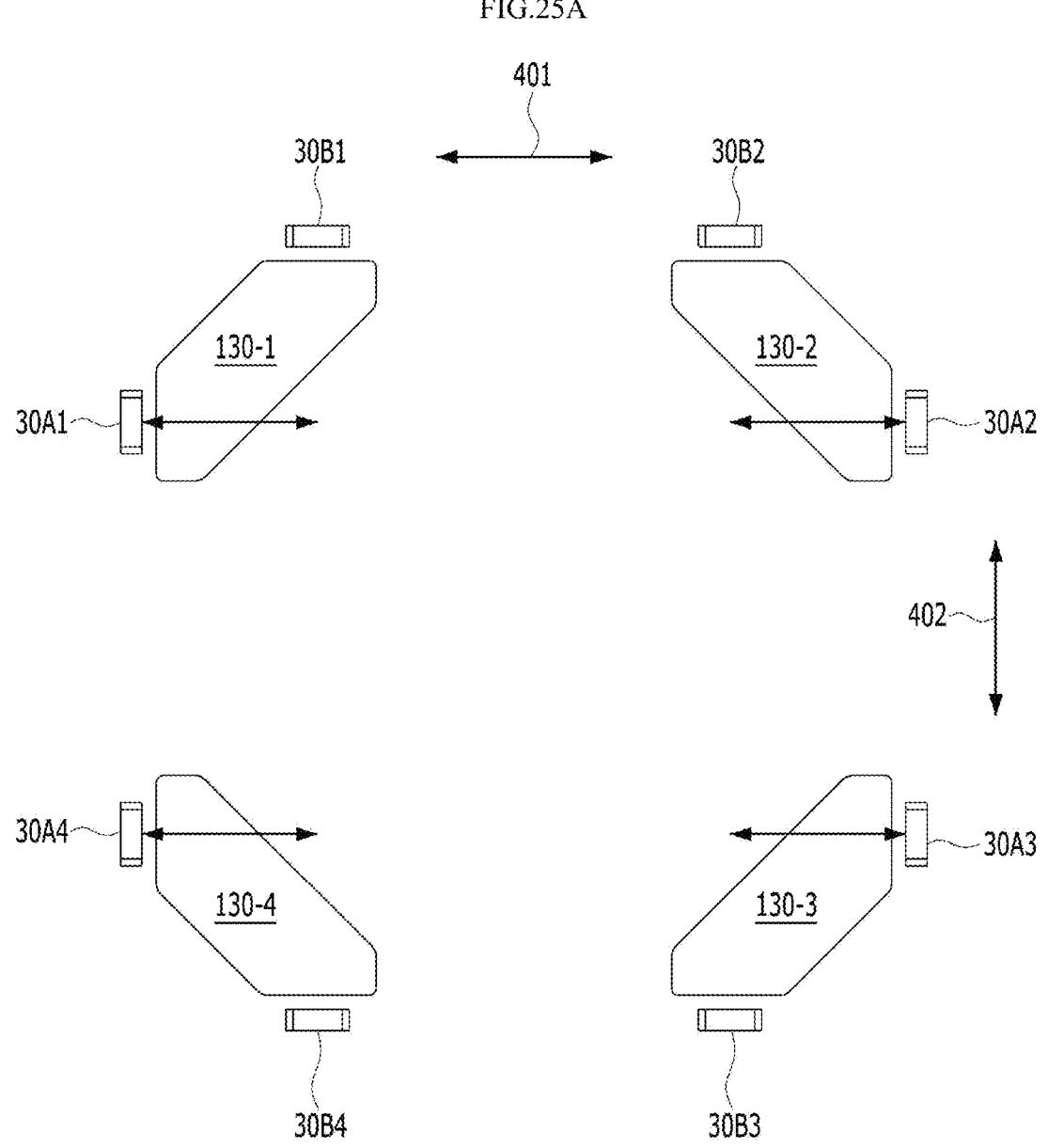
FIG. 25A is a view showing movement of an OIS operation unit in a first horizontal direction due to interaction between a first magnet and a second coil.

FIG. 25A is a view showing movement of the OIS operation unit in the first horizontal direction 401 due to interaction between the first magnet 130 and the second coil 230.

Referring to FIG. 25A, drive signals may be supplied to the first coil units 30A1 to 30A4, and the OIS operation unit may be moved in the first horizontal direction 401 by electromagnetic force due to interaction between the first coil units 30A1 to 30A4 and the first to fourth magnet units 130-1 to 130-4.

Figure 25B:
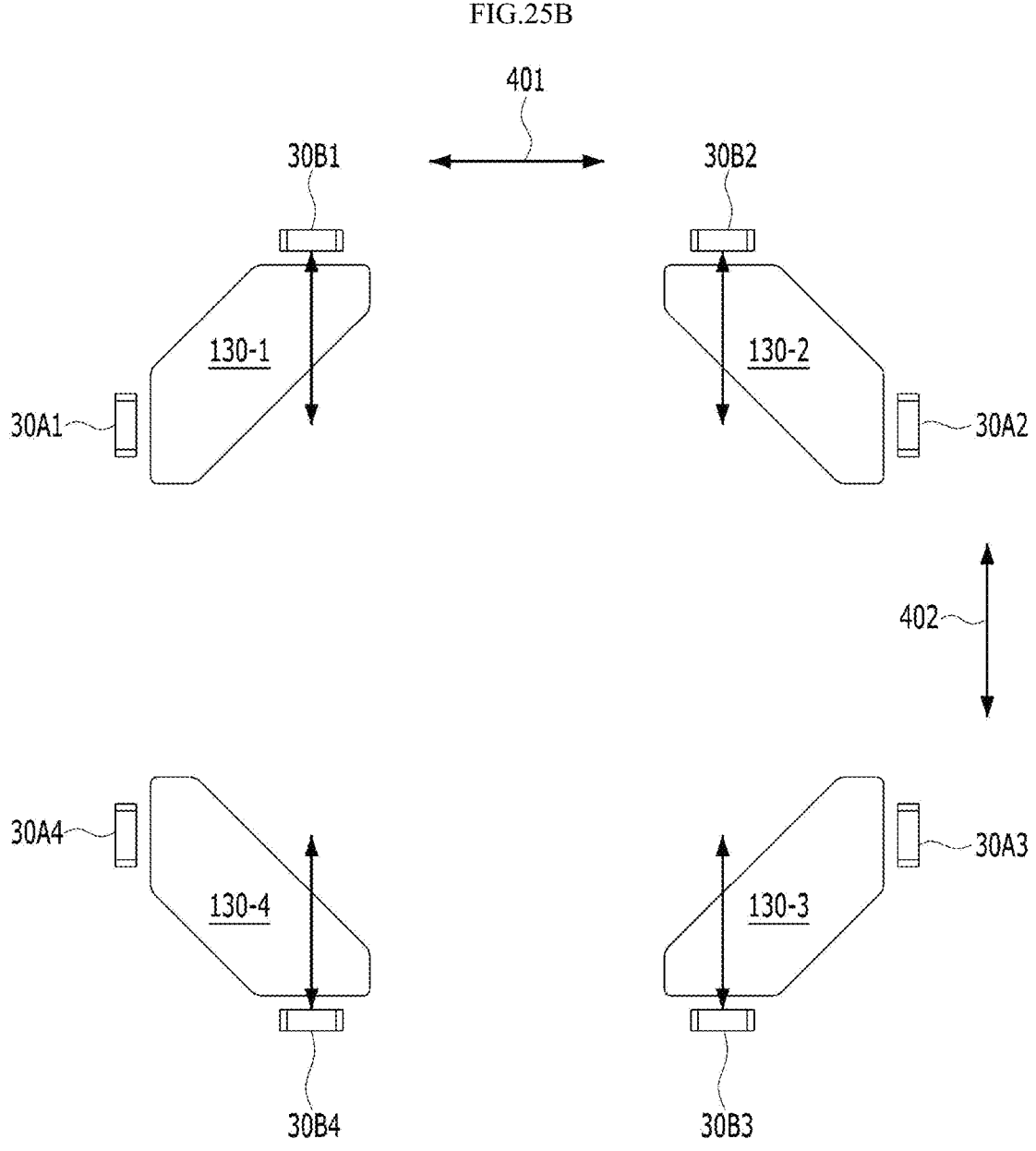
FIG. 25B is a view showing movement of the OIS operation unit in a second horizontal direction due to interaction between the first magnet and the second coil.

FIG. 25B is a view showing movement of the OIS operation unit in the second horizontal direction 402 due to interaction between the first magnet 130 and the second coil 230.

Referring to FIG. 25B, drive signals may be supplied to the second coil units 30B1 to 30B4, and the OIS operation unit may be moved in the second horizontal direction 402 by electromagnetic force due to interaction between the second coil units 30B1 to 30B4 and the first to fourth magnet units 130-1 to 130-4.

In addition, as shown in FIGS. 25A and 25B, drive signals may be simultaneously supplied to the first coil units 30A1 to 30A4 and the second coil units 30B1 to 30B4, and the OIS operation unit may be moved in the first diagonal direction or the second diagonal direction by first electromagnetic force due to interaction between the first coil units 30A1 to 30A4 and the first to fourth magnet units 130-1 to 130-4 and second electromagnetic force due to interaction between the second coil units 30B1 to 30B4 and the first to fourth magnet units 130-1 to 130-4.

Figure 25C:
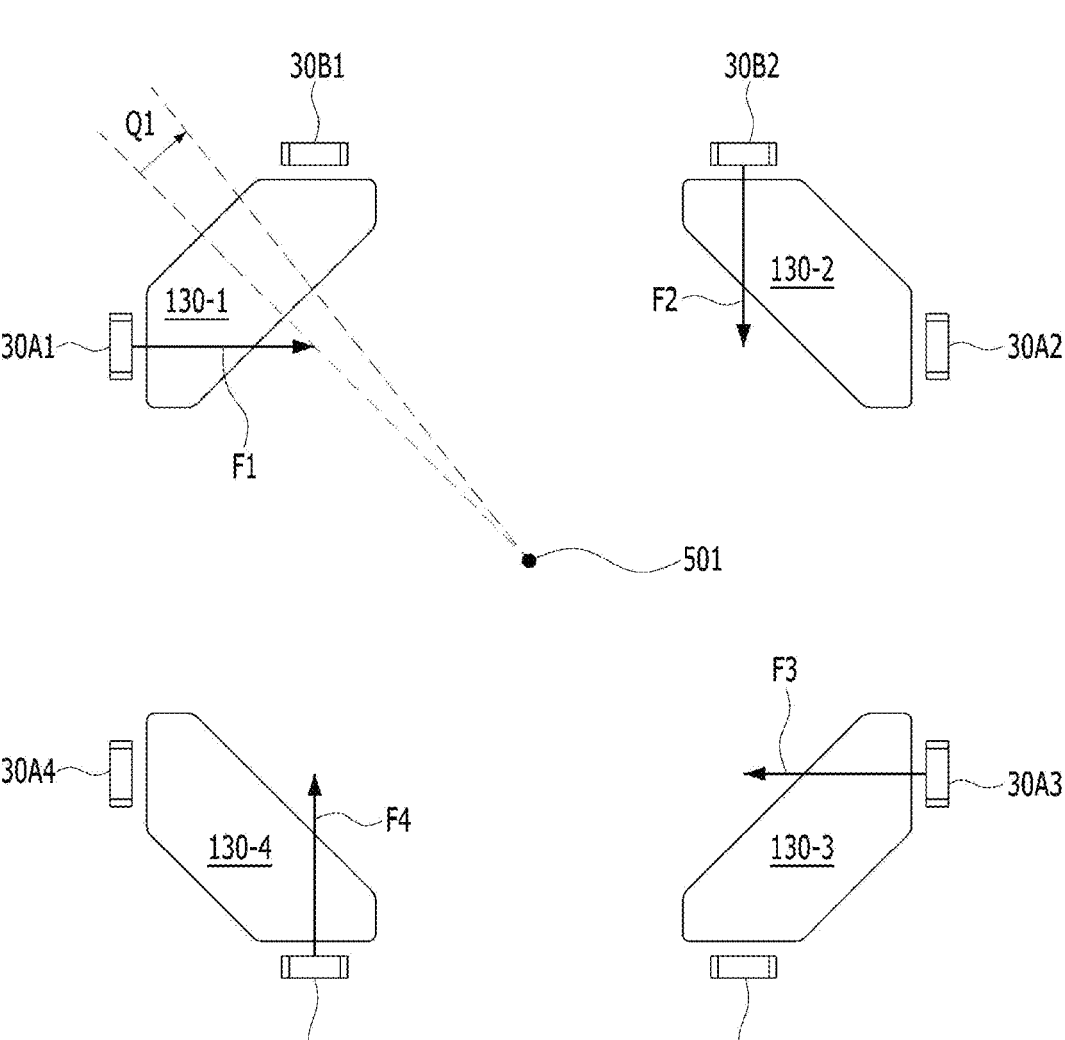
FIG. 25C is a view showing tilting operation of the OIS operation unit in the clockwise direction due to interaction between the first magnet and the second coil.

FIG. 25C is a view showing tilting operation of the OIS operation unit in the clockwise direction due to interaction between the first magnet 130 and the second coil 230.

Referring to FIG. 25C, the OIS operation unit may be tilted or rotated by a first angle θ1 in the clockwise direction about a central axis 501 by first electromagnetic force F1 due to interaction between the first magnet 130-1 and the first coil unit 30A1, second electromagnetic force F2 due to interaction between the second magnet 130-2 and the second coil unit 30B2, third electromagnetic force F3 due to interaction between the third magnet 130-3 and the first coil unit 30A3, and fourth electromagnetic force F4 due to interaction between the fourth magnet 130-4 and the second coil unit 30B4. For example, the central axis 501 may be the optical axis OA or the central axis of the OIS operation unit (e.g. the housing 140A).

Figure 25D:
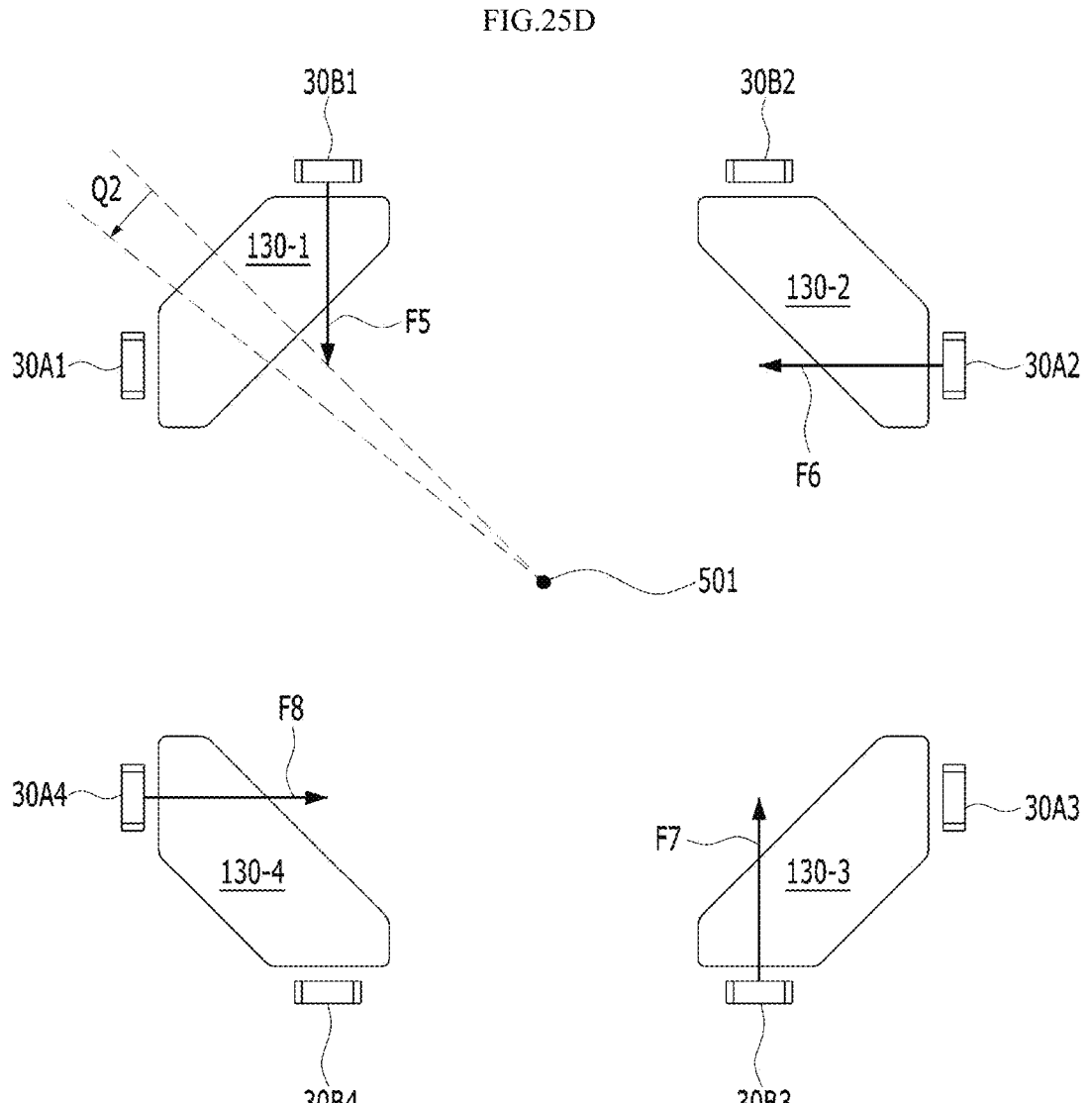
FIG. 25D is a view showing tilting operation of the OIS operation unit in the counterclockwise direction due to interaction between the first magnet and the second coil.

FIG. 25D is a view showing tilting operation of the OIS operation unit in the counterclockwise direction due to interaction between the first magnet 130 and the second coil 230.

Referring to FIG. 25D, the OIS operation unit may be tilted or rotated by a second angle θ2 in the counterclockwise direction about the central axis 501 by fifth electromagnetic force F5 due to interaction between the first magnet 130-1 and the second coil unit 30B1, sixth electromagnetic force F6 due to interaction between the second magnet 130-2 and the first coil unit 30A2, seventh electromagnetic force F7 due to interaction between the third magnet 130-3 and the second coil unit 30B3, and eighth electromagnetic force F8 due to interaction between the fourth magnet 130-4 and the first coil unit 30A4.

In the embodiment shown in FIG. 18, the first and second coil units 30A1 to 30A4 and 30B1 to 30B4 are disposed between the third surface 3E or 3E1 of the first magnet 130 or 130A and the side plate 302 of the cover member 300 and between the fourth surface 3F or 3F1 of the first magnet and the side plate 302 of the cover member 300. Accordingly, the embodiment may reduce the size (e.g. the height) of the lens moving apparatus in the optical-axis direction.

In addition, each of the magnet units 130-1 to 130-4 or 130A-1 to 130A-4 according to the embodiment shown in FIG. 18 is disposed on a corresponding one of the corner portions 142-1 to 142-4 of the housing 140, and includes a portion that decreases in length in the transverse direction (e.g. M1) so as to have a shape suitable for disposition on a corresponding one of the corner portions 142-1 to 142-4. Accordingly, the embodiment may increase the size of the bore 110a in the bobbin 110, in which a lens is mounted, and may enable mounting of a large-aperture lens therein.

In addition, in the embodiment shown in FIG. 18, the first-horizontal-direction coil units 30A1 to 30A4 and the second-horizontal-direction coil units 30B1 to 30B4 may be driven simultaneously, whereby the OIS operation unit may be moved in the first diagonal direction or the second diagonal direction. In addition, in the embodiment shown in FIG. 18, the first-horizontal-direction coil units 30A1 to 30A4 and the second-horizontal-direction coil units 30B1 to 30B4 may be selectively driven, whereby the OIS operation unit may be moved in the first horizontal direction or the second horizontal direction. That is, since both movement in the horizontal direction and movement in the diagonal direction are possible, the embodiment may more accurately perform OIS driving, whereby the performance of the camera device may be improved due to OIS driving.

In addition, in the embodiment shown in FIG. 18, driving of the first-horizontal-direction coil units 30A1 to 30A4 and the second-horizontal-direction coil units 30B1 to 30B4 may be controlled so that the OIS operation unit is tilted or rotated by a predetermined angle about the optical axis.

The lens moving apparatus according to the embodiment may be applied to or included in a camera device, a camera module, or a camera instrument.

Figure 26:
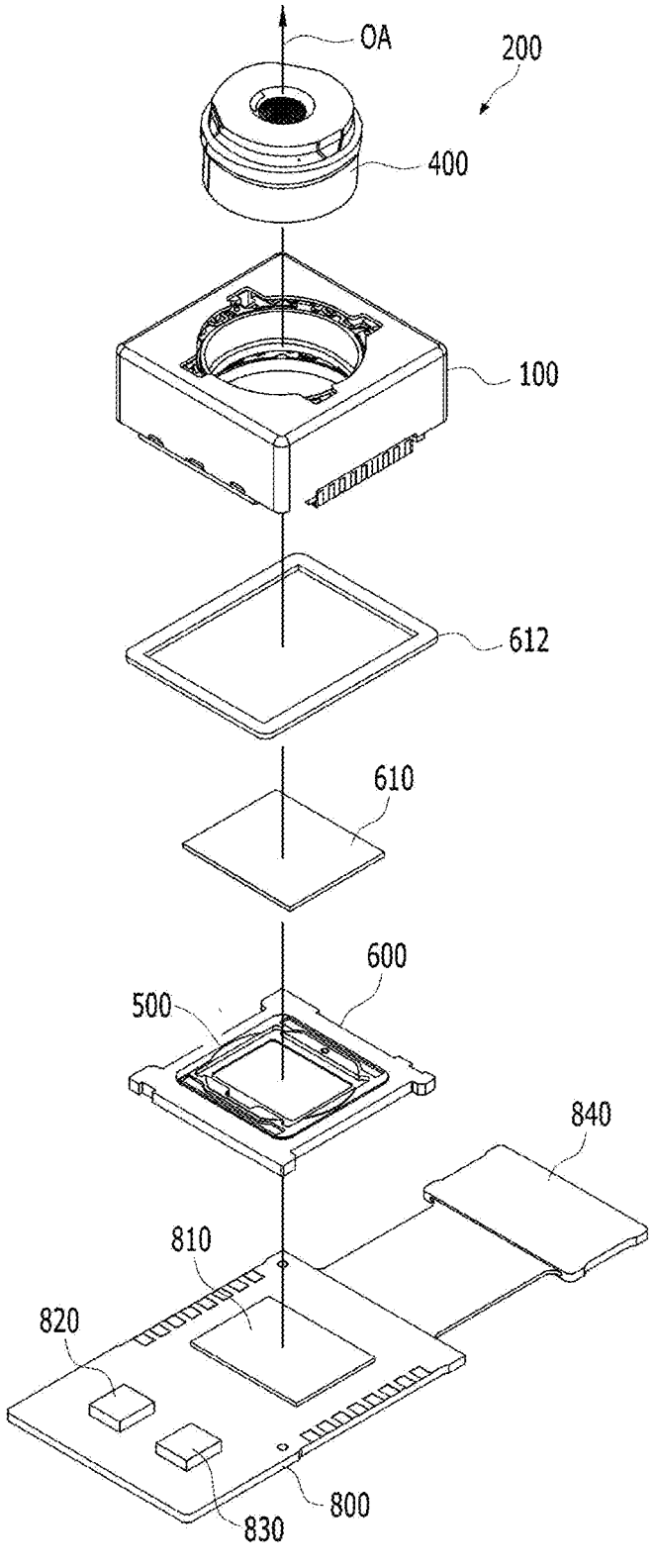
FIG. 26 is an exploded perspective view of a camera device according to an embodiment.

FIG. 26 is an exploded perspective view of a camera device 200 according to an embodiment.

Referring to FIG. 26, the camera device 200 may include a lens module 400, the lens moving apparatus 100, an adhesive member 612, a filter 610, a first holder 600, a second holder 800, an image sensor 810, a motion sensor 820, a controller 830, and a connector 840.

The lens module 400 may be mounted in the bobbin 110 of the lens moving apparatus 100 or 100A. The lens module 400 may include a lens barrel and/or at least one lens.

The first holder 600 may be disposed under the base 210 of the lens moving apparatus 100 or 100A. The filter 610 may be mounted on the first holder 600, and the first holder 600 may include a protruding portion 500 on which the filter 610 is seated.

The adhesive member 612 may couple or attach the base 210 of the lens moving apparatus 100 or 100A to the first holder 600. In addition to the attachment function described above, the adhesive member 710 may serve to inhibit foreign substances from entering the lens moving apparatus 100 or 100A.

The adhesive member 612 may be, for example, epoxy, a thermosetting adhesive, an ultraviolet curable adhesive, or the like.

The filter 610 may serve to inhibit light within a specific frequency band, having passed through the lens module 400, from being introduced into the image sensor 810. The filter 610 may be an infrared cut filter, but the disclosure is not limited thereto. Here, the filter 610 may be disposed parallel to the x-y plane.

The region of the first holder 600 in which the filter 610 is mounted may be provided with a bore to allow the light that has passed through the filter 610 to be introduced into the image sensor 810.

The second holder 800 may be disposed under the first holder 600, and the image sensor 810 may be mounted on the second holder 600. The image sensor 810 is a part into which the light that has passed through the filter 610 is introduced so as to form an image contained in the light.

The second holder 800 may include various circuits, elements, and a controller in order to convert the image, formed on the image sensor 810, into electrical signals and to transmit the electrical signals to an external device.

The second holder 800 may be embodied as a circuit board or a printed circuit board on which the image sensor is mounted, on which a circuit pattern is formed, and to which various elements are coupled. The first holder 600 may alternatively be referred to as a "holder" or a "sensor base", and the second holder 800 may alternatively be referred to as a "board" or a "circuit board".

The image sensor 810 may receive an image contained in the light introduced through the lens moving apparatus 100 or 100A, and may convert the received image into electrical signals.

The filter 610 and the image sensor 810 may be disposed so as to be spaced apart from each other while facing each other in the first direction.

The motion sensor 820 may be mounted on the second holder 800, and may be conductively connected to the controller 830 through the circuit pattern formed on the second holder 800.

The motion sensor 820 outputs rotational angular speed information regarding the movement of the camera device 200. The motion sensor 820 may be embodied as a two-axis, three-axis, four-axis, or five-axis gyro sensor or an angular speed sensor.

The controller 830 may be mounted on the second holder 800, and may be conductively connected to the second position sensor 240 and the second coil 230 or 230A of the lens moving apparatus 100 or 100A. In an example, the second holder 800 may be conductively connected to the circuit board 250 of the lens moving apparatus 100 or 100A, and the controller 830 mounted on the second holder 800 may be conductively connected to the second position sensor 240 and the second coil 230 through the circuit board 250.

In addition, the controller 830 (or the controller 780) may perform feedback autofocus operation for the AF operation unit of the lens moving apparatus 100 or 100A based on output supplied from the first position sensor 170. In addition, the controller 830 (or the controller 780) may perform hand-tremor compensation operation for the OIS operation unit of the lens moving apparatus 100 or 100A based on output supplied from the second position sensor 240.

The connector 840 may be conductively connected to the second holder 800, and may have a port for conductive connection to an external device.

In addition, the lens moving apparatus 100 according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission.

In an example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 27:
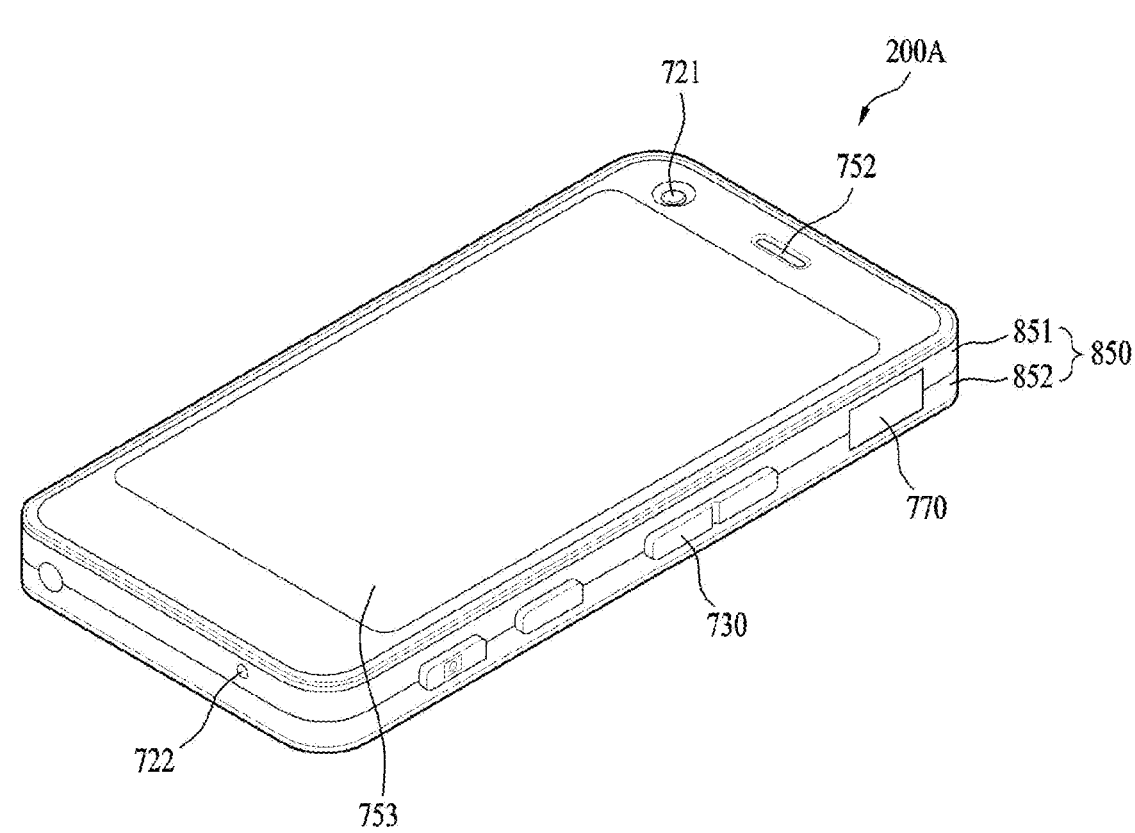
FIG. 27 is a perspective view of an optical instrument according to an embodiment.
Figure 28:
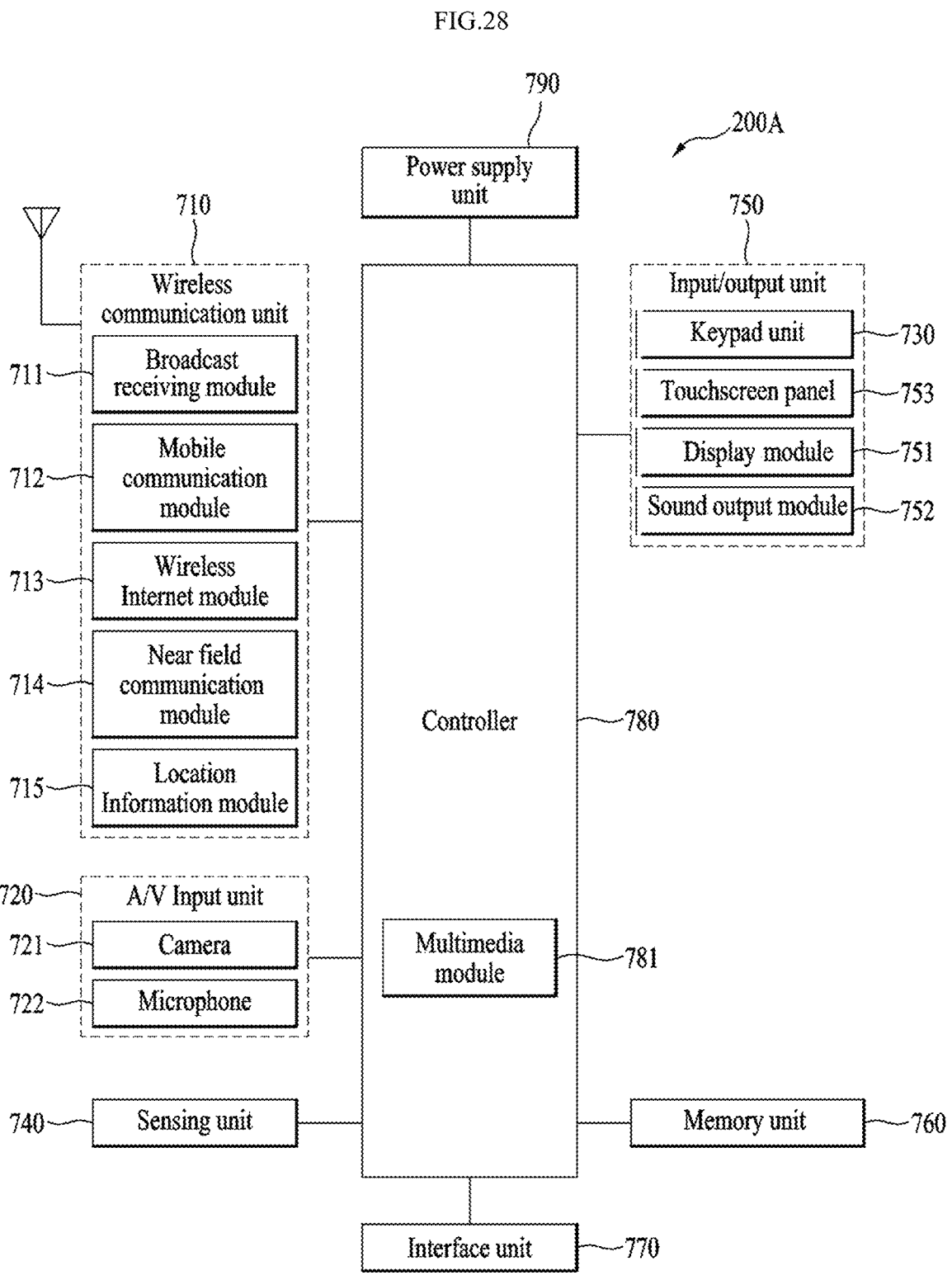
FIG. 28 is a configuration diagram of the optical instrument shown in FIG. 27.

FIG. 27 is a perspective view of an optical instrument 200A (e.g. a portable terminal) according to an embodiment, and FIG. 28 is a configuration diagram of the optical instrument shown in FIG. 27.

Referring to FIGS. 27 and 28, the optical instrument 200A (hereinafter referred to as a "terminal") may include a body 850, a wireless communication unit 710, an A/V input unit 720, a sensor unit 740, an input/output unit 750, a memory unit 760, an interface unit 770, a controller 780, and a power supply unit 790.

The body 850 shown in FIG. 27 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. In an example, the wireless communication unit 710 may include a broadcast receiving module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera device 200 according to the embodiment.

The sensor unit 740 may sense the current state of the terminal 200A, such as the open or closed state of the terminal 200A, the position of the terminal 200A, the presence or absence of a user's touch, the orientation of the terminal 200A, or the acceleration/deceleration of the terminal 200A, and may generate a sensing signal to control the operation of the terminal 200A. In an example, when the terminal 200A is a slide-type phone, whether the slide-type phone is open or closed may be detected. In addition, the sensor unit 740 serves to sense whether power is supplied from the power supply unit 790 or whether the interface unit 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may store programs for the processing and control of the controller 780, and may temporarily store input/output data (e.g. a phone book, messages, audio, still images, pictures, and moving images). In an example, the memory unit 760 may store images captured by the camera 721, for example, pictures or moving images.

The interface unit 770 serves as a passage for connection between the terminal 200A and an external device. The interface unit 770 may receive data or power from the external device, and may transmit the same to respective components inside the terminal 200A, or may transmit data inside the terminal 200A to the external device. In an example, the interface unit 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the terminal 200A. In an example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touchscreen is perceived as characters or images.

In place of the controller 830 of the camera device 200, the controller 780 of the optical instrument 200A may supply drive signals (or power) to the first and second position sensors 170 and 240, may receive outputs of the first and second position sensors 170 or 240, or may transmit and receive a clock signal SCL and a data signal SDA for I2C communication.

The power supply unit 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a lens moving apparatus capable of reducing a height in an optical-axis direction and enabling mounting of a large-aperture lens therein, a camera device, and an optical instrument.

The invention claimed is:

1. A lens moving apparatus comprising:
a housing comprising a side portion and a corner portion;
a bobbin disposed in the housing;
a first coil disposed on the bobbin;
a first magnet disposed on the corner portion of the housing, the first magnet comprising a first surface facing the first coil and a second surface formed opposite the first surface; and
a second coil disposed so as to face the second surface of the first magnet, the second coil being configured to move the housing in a direction perpendicular to an optical axis using interaction with the first magnet.

2. The lens moving apparatus according to claim 1, comprising a cover member comprising an upper plate and a side plate and configured to allow the housing to be disposed therein,
wherein the second coil is disposed between the second surface of the first magnet and the side plate of the cover member.

3. The lens moving apparatus according to claim 1, wherein an area of the second surface is smaller than an area of the first surface, and
wherein the first magnet comprises a portion, and a length of the portion of the first magnet in a transverse direction gradually decreases from the first surface toward the second surface.

4. The lens moving apparatus according to claim 2, comprising a first circuit board disposed between the side plate of the cover member and the housing and conductively connected to the second coil.

5. The lens moving apparatus according to claim 4, wherein the first circuit board comprises:
a seating portion in which the second coil is disposed; and
a fixed portion coupled to the side plate of the cover member.

6. The lens moving apparatus according to claim 5, wherein the seating portion of the first circuit board is spaced apart from the side plate of the cover member.

7. The lens moving apparatus according to claim 4, comprising:
an upper elastic member coupled to an upper portion of the bobbin and an upper portion of the housing;
a second circuit board disposed under the housing; and
a support member comprising one end coupled to the upper elastic member and another end conductively connected to the second circuit board.

8. The lens moving apparatus according to claim 7, wherein at least a portion of the second coil is disposed between the support member and the second surface of the first magnet.

9. The lens moving apparatus according to claim 1, wherein the second coil comprises a cavity facing the second surface of the first magnet.

10. The lens moving apparatus according to claim 7, comprising a base disposed under the second circuit board, wherein the second circuit board is coupled to the base.

11. The lens moving apparatus according to claim 1, wherein the housing comprises a recess formed in the corner portion, and the second coil is disposed in the recess.

12. A lens moving apparatus comprising:

a housing comprising a side portion and a corner portion;

a bobbin disposed in the housing;

a first coil disposed on the bobbin;

a first magnet disposed on the corner portion of the housing and comprising a first surface facing the first coil, a second surface formed opposite the first surface, a third surface located between one side of the first surface and one side of the second surface, and a fourth surface located between the other side of the first surface and the other side of the second surface; and a second coil comprising a first coil unit disposed so as to face one of the third surface and the fourth surface in a first horizontal direction and a second coil unit disposed so as to face the remaining one of the third surface and the fourth surface in a second horizontal direction perpendicular to the first horizontal direction, wherein the second coil is configured to move the housing in a direction perpendicular to an optical axis using interaction with the first magnet.

13. The lens moving apparatus according to claim 12, comprising a cover member comprising an upper plate and a side plate and configured to allow the housing to be disposed therein, and wherein the first coil unit and the second coil unit are disposed between the first magnet and the side plate of the cover member.

14. The lens moving apparatus according to claim 12, wherein the first magnet comprises a portion, and a length of the portion of the first magnet in a transverse direction gradually decreases from the first surface toward the second surface.

15. The lens moving apparatus according to claim 13, comprising a first circuit board disposed between the side plate of the cover member and the housing and conductively connected to the first coil unit and the second coil unit.

16. The lens moving apparatus according to claim 15, wherein the first circuit board is coupled to the side plate of the cover member.

17. The lens moving apparatus according to claim 15, comprising:

an upper elastic member coupled to an upper portion of the bobbin and an upper portion of the housing;

a second circuit board disposed under the housing; and a support member comprising one end coupled to the upper elastic member and another end conductively connected to the second circuit board.

18. The lens moving apparatus according to claim 17, wherein the first circuit board is conductively connected to the second circuit board.

19. The lens moving apparatus according to claim 12, wherein the housing comprises a first recess formed in one side of the corner portion and a second recess formed in another side of the corner portion, and wherein the first coil unit is disposed in the first recess, and the second coil unit is disposed in the second recess.

20. The lens moving apparatus according to claim 12, wherein the first coil unit comprises a cavity facing a portion of the first magnet in the first horizontal direction, and wherein the second coil unit comprises a cavity facing another portion of the first magnet in the second horizontal direction.

* * * * *